US011375161B2

(12) United States Patent
Shimada et al.

(10) Patent No.: US 11,375,161 B2
(45) Date of Patent: *Jun. 28, 2022

(54) WEARABLE CAMERA, WEARABLE CAMERA SYSTEM, AND INFORMATION PROCESSING APPARATUS FOR DETECTING AN ACTION IN CAPTURED VIDEO

(71) Applicant: Panasonic i-PRO Sensing Solutions Co., Ltd., Fukuoka (JP)

(72) Inventors: Isao Shimada, Hyogo (JP); Yasushi Yokomitsu, Fukuoka (JP); Hazuki Kawasaki, Kanagawa (JP); Yasuo Yomogida, Fukuoka (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,693

(22) Filed: Feb. 10, 2020

(65) Prior Publication Data

US 2020/0177849 A1 Jun. 4, 2020

Related U.S. Application Data

(63) Continuation of application No. 16/022,415, filed on Jun. 28, 2018, now Pat. No. 10,602,097.

(30) Foreign Application Priority Data

Jul. 12, 2017 (JP) ................................. 2017-136488

(51) Int. Cl.
*H04N 7/18* (2006.01)
*G06F 3/04817* (2022.01)
(Continued)

(52) U.S. Cl.
CPC ........... *H04N 7/185* (2013.01); *G06F 3/0482* (2013.01); *G06F 3/04817* (2013.01);
(Continued)

(58) Field of Classification Search
CPC ...... H04N 7/185; H04N 7/188; G06F 16/745; G06F 16/738; G06F 16/743; G06F 16/78; G06F 3/04817; G06F 3/0482
(Continued)

(56) References Cited

U.S. PATENT DOCUMENTS 9,204,077 B2 12/2015 Kim et al.
2004/0156616 A1 8/2004 Strub et al.
(Continued)

FOREIGN PATENT DOCUMENTS

JP 2007-049592 A 2/2007
JP 2016-122918 A 7/2016

OTHER PUBLICATIONS

Wang et al, Person of interest detection system using cloud supported computerized eyewear (Year: 2013).*
(Continued)

*Primary Examiner* — Shan E Elahi
(74) *Attorney, Agent, or Firm* — Seed IP Law Group LLP

(57) ABSTRACT

A wearable camera includes a video recording device that records a captured video of a subject on the front side of a user on a recorder, a sensor that acquires information regarding motion of the user, a determiner that determines whether or not at least one default event has occurred on the basis of information regarding motion of the user acquired by the sensor during recording of the captured video of the subject, and a controller that generates event list information in which a detection time point of the default event is correlated with information regarding the default event according to determination that the at least one default event has (Continued)

occurred during recording of the captured video of the subject, and records the event list information on the recorder in correlation with the captured video of the subject.

10 Claims, 40 Drawing Sheets

(51) Int. Cl.
　　*G06F 3/0482*　　　　(2013.01)
　　*G06F 16/74*　　　　(2019.01)
　　*G06F 16/738*　　　　(2019.01)
　　*G06F 16/78*　　　　(2019.01)

(52) U.S. Cl.
　　CPC .......... *G06F 16/738* (2019.01); *G06F 16/743* (2019.01); *G06F 16/745* (2019.01); *G06F 16/78* (2019.01); *H04N 7/188* (2013.01)

(58) Field of Classification Search
　　USPC ........................................................ 348/157
　　See application file for complete search history.

(56)　　　　References Cited

U.S. PATENT DOCUMENTS

| | | |
|---|---|---|
| 2005/0018073 A1 | 1/2005 | Pilu |
| 2009/0251542 A1 | 10/2009 | Cohen et al. |
| 2014/0126882 A1 | 5/2014 | Seto et al. |
| 2014/0160250 A1 | 6/2014 | Pomerantz et al. |
| 2015/0054639 A1* | 2/2015 | Rosen ................ H04M 3/2281 340/439 |
| 2015/0063776 A1 | 3/2015 | Ross et al. |
| 2015/0370320 A1 | 12/2015 | Connor |
| 2016/0026853 A1 | 1/2016 | Wexler et al. |
| 2016/0054639 A1 | 2/2016 | Kono |
| 2016/0062514 A1 | 3/2016 | Jo et al. |
| 2016/0085999 A1* | 3/2016 | Oppenheimer .... G08B 13/2428 726/35 |
| 2016/0112636 A1* | 4/2016 | Yamaguchi .......... H04N 5/2252 348/158 |
| 2016/0182850 A1* | 6/2016 | Thompson ........... H04N 9/8205 348/158 |
| 2016/0191862 A1 | 6/2016 | Yokomitsu et al. |
| 2017/0031355 A1* | 2/2017 | Jung ..................... B64D 47/08 |
| 2017/0048334 A1* | 2/2017 | Shibahara ........... H04L 65/1066 |
| 2017/0070778 A1* | 3/2017 | Zerlan ................. G06F 21/6263 |
| 2017/0076597 A1 | 3/2017 | Beattie, Jr. et al. |
| 2017/0085688 A1* | 3/2017 | Zhou ....................... G06F 3/011 |
| 2017/0133051 A1 | 5/2017 | Mack et al. |
| 2017/0195635 A1 | 7/2017 | Yokomitsu et al. |
| 2017/0276694 A1* | 9/2017 | Uehara ................. G01C 19/56 |
| 2017/0312574 A1* | 11/2017 | Matsuzawa ........... A63B 71/06 |
| 2018/0050800 A1* | 2/2018 | Boykin .............. H04B 7/18506 |
| 2018/0063421 A1 | 3/2018 | Yokomitsu |
| 2018/0353810 A1* | 12/2018 | Kim ....................... A61B 5/681 |

OTHER PUBLICATIONS

Lee et al, Application of wearable devices in crime scene investigation and virtual reality (Year: 2019).*

Rahman et al., "Movee: Video Liveness Verification for Mobile Devices Using Built-In Motion Sensors," *IEEE Transactions on Mobile Computing* 15(5):1197-1210, May 2016.

Yamazoe et al., "A Body-mounted Camera System for Capturing User-view Images without Head-mounted Camera," *Proceedings of the 2005 Ninth IEEE International Symposium on Wearable Computers (ISWC'05)*, 8 pages, 2005.

* cited by examiner

FIG. 5

Atb0

| ACTION | SENSOR USED TO DETECT ACTION, OR DETECTION CONDITION |
|---|---|
| STARTED TO RUN | ACCELERATION SENSOR AND GYRO SENSOR |
| FELL DOWN (SHOT) | ACCELERATION SENSOR AND GYRO SENSOR |
| EXTRACTED GUN FROM HOLSTER | ACCELERATION SENSOR AND GYRO SENSOR |
| LEVELED GUN | ACCELERATION SENSOR, GYRO SENSOR, AND SENSOR ATTACHED TO HOLSTER |
| GOT OFF CAR | ACCELERATION SENSOR (FROM STOPPAGE TO MOVEMENT) |
| INTERVIEW | STOPPAGE USING ACCELERATION SENSOR AND GYRO SENSOR + CONVERSATION |
| URGED STOPPAGE | VOICE RECOGNITION "Freeze" |
| . . | . . |

FIG. 8

| | TIME POINT | THUMBNAIL | ACTION | DETERMINATION CONDITION |
|---|---|---|---|---|
| [1] | 01:00:10pm | SM1  | STARTED RECORDING | REC BUTTON AND RECEPTION TRIGGER FROM ICV |
| [2] | 01:20:32pm | SM2  | ARRIVED AT SITE BY CAR | DOOR OF POLICE VEHICLE WAS OPENED |
| [3] | 01:21:14pm | SM3  | WALKED AND MOVED TO FIELD | ACCELERATION SENSOR AND GYRO SENSOR: CONTINUOUSLY MOVED FOR PREDETERMINED TIME |
| [4] | 01:24:33pm | SM4  | ARRIVED AT FIELD | ACCELERATION SENSOR AND GYRO SENSOR: NO MOVEMENT FOR PREDETERMINED TIME |
| [5] | 01:26:45pm | SM5  | RAN IN PURSUIT OF CRIMINAL | ACCELERATION SENSOR AND GYRO SENSOR: DATA INDICATING RUNNING |
| [6] | 01:30:33pm | SM6  | LEVELED GENERATION | SENSOR DETECTED EXTRACTION FROM HOLSTER ACTIVITY METER ATTACHED TO ARM MEASURED MOTION OF ARM |
| [7] | 01:30:34pm | SM7  | URGED STOPPAGE | VOICE RECOGNITION "Freeze" |
| [8] | 01:30:40pm | SM8  | RAN IN PURSUIT OF CRIMINAL | ACCELERATION SENSOR AND GYRO SENSOR: DATA INDICATING RUNNING |
| [9] | 01:31:05pm | SM9  | LEVELED GENERATION | SENSOR DETECTED EXTRACTION FROM HOLSTER ACTIVITY METER ATTACHED TO ARM MEASURED MOTION OF ARM |
| [10] | 01:31:05pm | SM10  | URGED STOPPAGE | VOICE RECOGNITION "Freeze" |
| [11] | 01:31:07pm | SM11  | SHOT GUN | DETECTED GUNSHOT (VOLUME AND FREQUENCY) ACTIVITY METER ATTACHED TO ARM MEASURED MOTION OF ARM |

Atb2

| ACTION | SENSOR USED TO DETECT ACTION, OR DETECTION CONDITION |
|---|---|
| STARTED TO RUN | ACCELERATION SENSOR AND GYRO SENSOR |
| FELL DOWN (SHOT) | ACCELERATION SENSOR AND GYRO SENSOR |
| EXTRACTED GUN FROM HOLSTER | ACCELERATION SENSOR AND GYRO SENSOR |
| LEVELED GUN | ACCELERATION SENSOR, GYRO SENSOR, AND SENSOR ATTACHED TO HOLSTER |
| GOT OFF CAR | ACCELERATION SENSOR (FROM STOPPAGE TO MOVEMENT) |
| INTERVIEW | STOPPAGE USING ACCELERATION SENSOR AND GYRO SENSOR + CONVERSATION |
| URGED STOPPAGE | VOICE RECOGNITION "Freeze" |
| EXTREME TENSION | HEART RATE SENSOR AND PERSPIRATION SENSOR |
| INCREASE/DECREASE IN HEART RATE | HEART RATE SENSOR |
| PERSPIRATION | PERSPIRATION SENSOR |
| INCREASE/DECREASE IN BODY TEMPERATURE | TEMPERATURE SENSOR |
| .. | .. |

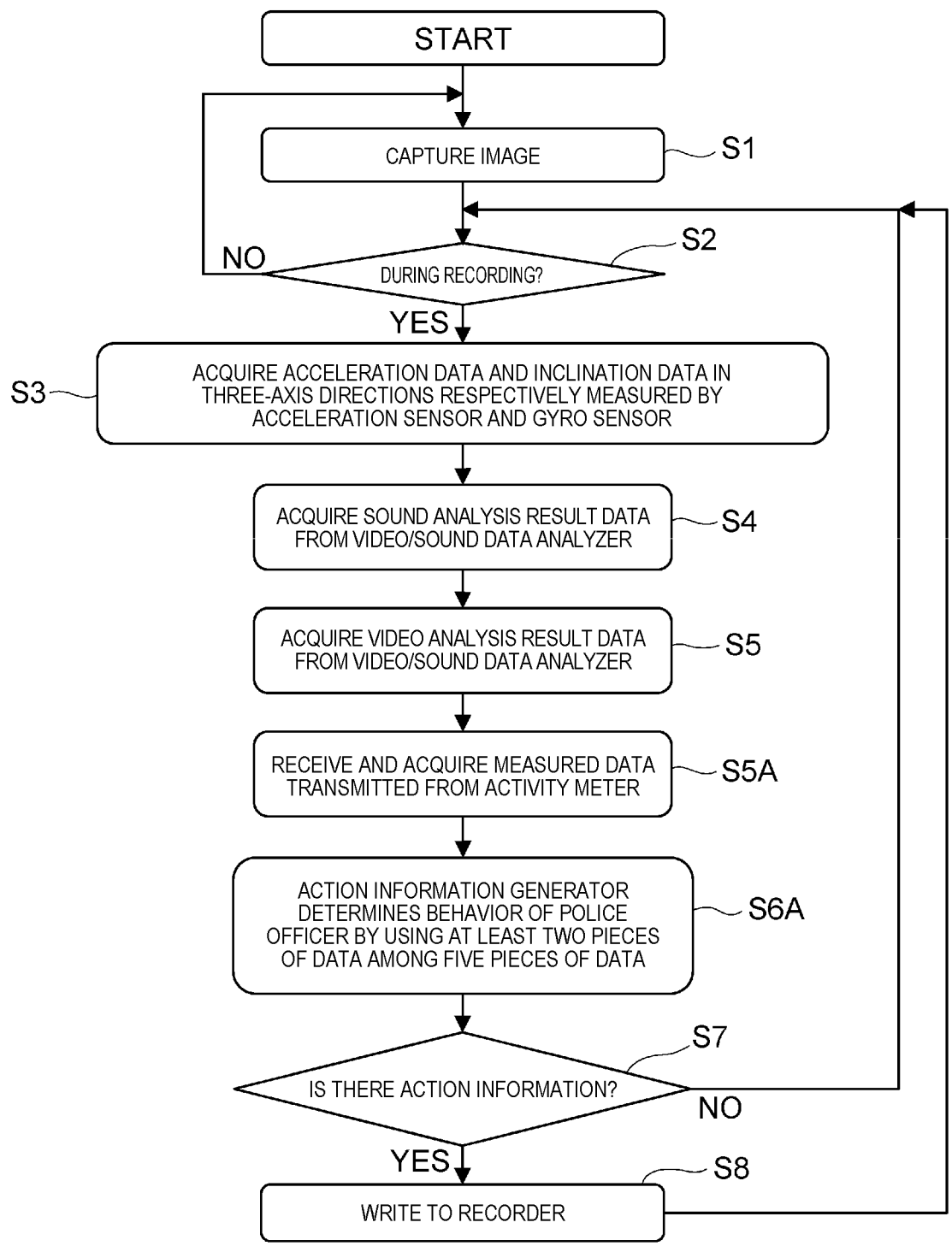

FIG. 20

Atb1a

| ACTION | ACCELERATION DATA | | | INCLINATION DATA | | | SOUND DATA | VIDEO DATA | ACTIVITY AMOUNT |
|---|---|---|---|---|---|---|---|---|---|
| | X | Y | Z | X | Y | Z | | | |
| DANGEROUS FALLING | 5 | 6 | 8 | 4 | 6 | 8 | ... | ... | ... |
| DASHED | 8 | 4 | 3 | 7 | 5 | 4 | ... | ... | ... |
| HIT | 5 | 6 | 3 | 6 | 7 | 6 | ... | ... | ... |
| JOSTLED | 6 | 3 | 4 | 7 | 5 | 4 | ... | ... | ... |
| LEVELED GUN | 2 | 4 | 3 | 6 | 7 | 8 | ... | ... | ... |
| . | | | | | | | | | |
| . | | | | | | | | | |
| . | | | | | | | | | |

REWRITE ACTION INFORMATION NAME INTO "PULLED GUN" FROM "JOSTLED"

Atb1b

| ACTION | ACCELERATION DATA | | | INCLINATION DATA | | | SOUND DATA | VIDEO DATA | ACTIVITY AMOUNT |
|---|---|---|---|---|---|---|---|---|---|
| | X | Y | Z | X | Y | Z | | | |
| DANGEROUS FALLING | 5 | 6 | 8 | 4 | 6 | 8 | ... | ... | ... |
| DASHED | 8 | 4 | 3 | 7 | 5 | 4 | ... | ... | ... |
| HIT | 5 | 6 | 3 | 6 | 7 | 6 | ... | ... | ... |
| PULLED GUN | 6 | 3 | 4 | 7 | 5 | 4 | ... | ... | ... |
| LEVELED GUN | 2 | 4 | 3 | 6 | 7 | 8 | ... | ... | ... |
| . | | | | | | | | | |
| . | | | | | | | | | |
| . | | | | | | | | | |

FIG. 32
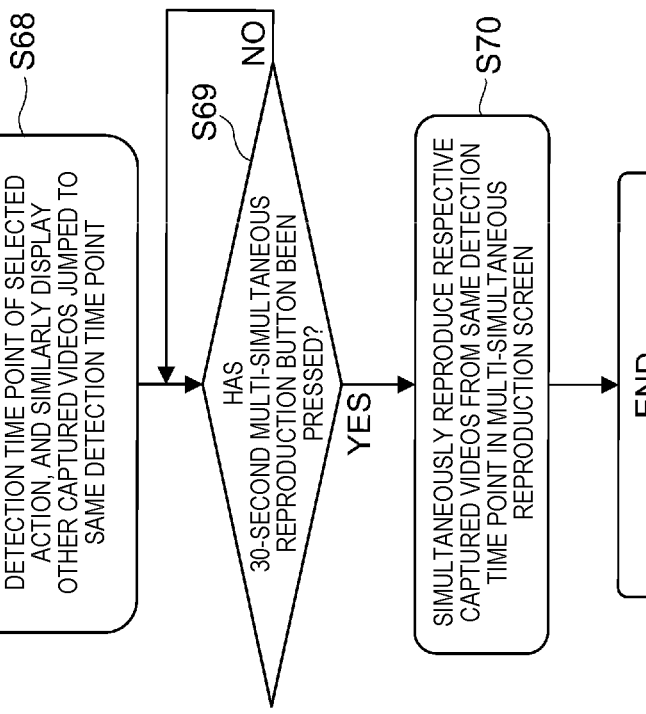
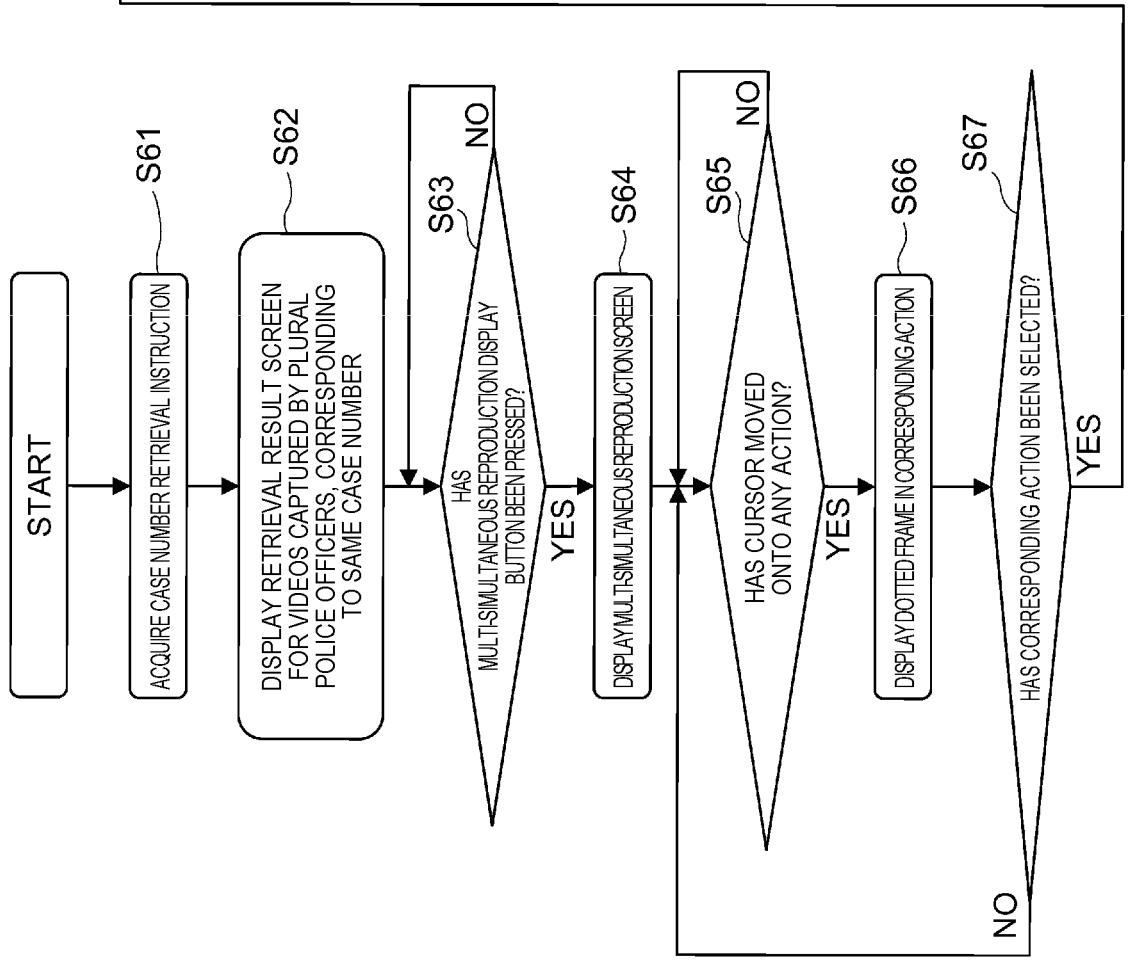

FIG. 33A

CASE TYPE = Firearm (GUN)

| ACTION |
|---|
| DANGEROUS FALLING |
| DASHED |
| HIT |
| PULLED GUN |
| STOP ORDER |
| LEVELED GUN |
| SHOT GUN |
| . |
| . |

↑ CStb1

ALLT1

| TIME POINT | ACTION |
|---|---|
| 03:06:45pm | STARTED RECORDING |
| 03:10:43pm | GOT OFF CAR |
| 03:10:43pm | DASHED (RAN AND PURSUED) |
| 03:13:30pm | STOPPED |
| 03:13:31pm | PULLED GUN |
| 03:13:34pm | LEVELED GUN |
| 03:13:34pm | STOP ORDER (Freeze) |
| 03:13:36pm | STOP ORDER (Freeze) |
| 03:13:59pm | SHOT GUN |
| Not found | DANGEROUS FALLING |
| Not found | HIT |

CASE TYPE = DUI (DRUNKEN DRIVING OR DRIVING UNDER USE OF DRUGS)

| ACTION |
|---|
| STARTED RECORDING |
| GOT OFF CAR |
| STARTED WALKING |
| STARTED INTERVIEW |
| GOT ON CAR |
| . |
| . |
| . |

CStb2

ALLT2

| TIME POINT | ACTION |
|---|---|
| 03:06:45pm | STARTED RECORDING |
| 03:10:43pm | GOT OFF CAR |
| 03:10:43pm | STARTED WALKING |
| 03:11:20pm | STOPPED |
| 03:11:21pm | STARTED INTERVIEW |
| 03:13:31pm | STARTED WALKING |
| 03:14:05pm | GOT ON CAR |

FIG. 36A

ALLT3

| TIME POINT | ACTION |
|---|---|
| 02:58:29pm | STARTED RECORDING |
| 03:05:55pm | GOT OFF CAR |
| 03:05:34pm – 03:06:10pm | WALKED |
| 03:06:10pm – 03:09:30pm | DASHED (RAN AND PURSUED) |
| 03:06:35pm | SUPPORT REQUEST |
| 03:09:30pm | STOPPED |
| 03:09:30pm | STOP ORDER (Freeze) |
| 03:09:30pm | LEVELED GUN |
| 03:10:35 – 03:13:55pm | DASHED (RAN AND PURSUED) |
| 03:13:55pm | STOPPED |
| 03:13:57pm | LEVELED GUN |
| 03:13:57pm | STOP ORDER (Freeze) |
| 03:13:59pm | SHOT |

FIG. 36B

ALLT4

| TIME POINT | ACTION |
|---|---|
| 03:06:45pm | STARTED RECORDING |
| 03:10:43pm | GOT OFF CAR |
| 03:10:43pm – 03:13:30pm | DASHED (RAN AND PURSUED) |
| 03:13:30pm | STOPPED |
| 03:13:31pm | LEVELED GUN |
| 03:13:31pm | URGED STOPPAGE |
| 03:13:45pm | STOP ORDER (Freeze) |
| 03:13:59pm | SHOT |

FIG. 37A

| TIME POINT | POLICE OFFICER | ACTION |
|---|---|---|
| 02:58:29pm | A | STARTED RECORDING |
| 03:05:55pm | A | GOT OFF CAR |
| 03:05:34pm | A | WALKED |
| 03:06:10pm | A | DASHED (RAN AND PURSUED) |
| 03:06:35pm | A | SUPPORT REQUEST |
| 03:06:45pm | B | STARTED RECORDING |
| 03:09:30pm | A | STOPPED |
| 03:09:30pm | A | STOP ORDER (Freeze) |
| 03:09:30pm | A | LEVELED GUN |
| 03:10:35pm | A | DASHED (RAN AND PURSUED) |
| 03:10:43pm | B | GOT OFF CAR |
| 03:10:43pm | B | DASHED (RAN AND PURSUED) |
| 03:13:30pm | B | STOPPED |
| 03:13:31pm | B | LEVELED GUN |
| 03:13:31pm | B | URGED STOPPAGE |
| 03:13:45pm | B | STOP ORDER (Freeze) |
| 03:13:55pm | B | STOPPED |
| 03:13:57pm | A | LEVELED GUN |
| 03:13:57pm | A | STOP ORDER (Freeze) |
| 03:13:59pm | A | SHOT GUN |
| 03:13:59pm | B | SHOT GUN |

ALLT5 → (points to 03:10:35pm row)

WEARABLE CAMERA, WEARABLE CAMERA SYSTEM, AND INFORMATION PROCESSING APPARATUS FOR DETECTING AN ACTION IN CAPTURED VIDEO

BACKGROUND

1. Technical Field

The present disclosure relates to a wearable camera, a wearable camera system, and an information recording method, capable of generating and recording information regarding a user's behavior in a captured video.

2. Description of the Related Art

In recent years, in order to efficiently support business of a police officer or a security guard, examination of an operation such as a police officer or a security guard wearing or carrying a wearable camera and recording captured videos on patrol has progressed.

As the related art for improving convenience of handling video data captured by a wearable camera, for example, a wearable camera disclosed in Japanese Patent Unexamined Publication No. 2016-122918 has been proposed. In the wearable camera disclosed in Japanese Patent Unexamined Publication No. 2016-122918, in a case where there is input from an attribute information assignment switch, video data captured by a capture is assigned with attribute information corresponding to setting information in an attribute selection switch, and is stored in a storage.

According to Japanese Patent Unexamined Publication No. 2016-122918, attribute information related to the content of video data can be easily assigned through a user's simple operation, and thus it can be said that the technique disclosed in Japanese Patent Unexamined Publication No. 2016-122918 has high usefulness.

However, in the configuration disclosed in Japanese Patent Unexamined Publication No. 2016-122918, it is not taken into consideration that a wearable camera determines each of various behaviors (for example, a plurality of types of behaviors performed from the start of patrol to the end thereof) performed by a user (for example, a police officer) wearing or carrying the wearable camera. Therefore, in the related art such as Japanese Patent Unexamined Publication No. 2016-122918, relevance between the content of a behavior performed by a user (for example, a police officer) wearing or carrying a wearable camera and a captured video during business cannot be recorded.

For example, in a case where a user (for example, a police officer) wearing or carrying a wearable camera returns to a police department from patrol, the user may create a case report in which behaviors performed on patrol are written in detail in a time series. In the above-described configuration of the related art, each of behaviors performed by a police officer during recording of captured videos cannot be determined. Thus, the police officer returns to a police department, and inevitably reproduces and watches captured videos recorded by the wearable camera. For example, as an appendix of the case report, the police officer is required to create a list on which behaviors performed in a time series on patrol are written. Therefore, a large amount of creation man-hours are necessary, and creation efficiency deteriorates.

SUMMARY

The present disclosure has been made in consideration of the circumstances of the related art, and an object thereof is to provide a wearable camera, a wearable camera system, and an information recording method, in which, even if a user does not independently reproduce or watch a recorded captured video, each of various behaviors of the user performed in a time series is determined from a captured video recorded by the wearable camera, and is recorded as information, and business of the user is efficiently supported.

According to the present disclosure, there is provided a wearable camera which is able to be worn or carried by a user, including a video recording device that records a captured video of a subject on the front side of the user on a recorder; a sensor that acquires information regarding motion of the user; a determiner that determines whether or not at least one default event has occurred on the basis of information regarding motion of the user acquired by the sensor during recording of the captured video of the subject; and a controller that generates event list information in which a detection time point of the default event is correlated with information regarding the default event according to determination that the at least one default event has occurred during recording of the captured video of the subject, and records the event list information on the recorder in correlation with the captured video of the subject.

According to the present disclosure, there is provided an information recording method using a wearable camera which is able to be worn or carried by a user, the method including a step of recording a captured video of a subject on the front side of the user on a recorder; a step of acquiring information regarding motion of the user; a step of determining whether or not at least one default event has occurred on the basis of information regarding motion of the user acquired during recording of the captured video of the subject; and a step of generating event list information in which a detection time point of the default event is correlated with information regarding the default event according to determination that the at least one default event has occurred during recording of the captured video of the subject, and recording the event list information on the recorder in correlation with the captured video of the subject.

According to the present disclosure, there is provided a wearable camera system including a wearable camera that is able to be worn or carried by a user; and a server that is communicably connected to the wearable camera, in which the wearable camera records a captured video of a subject on the front side of the user on a recorder, acquires information regarding motion of the user during recording of the captured video of the subject, and transmits the acquired information regarding motion of the user to the server, in which the server receives the information regarding motion of the user transmitted from the wearable camera, determines whether or not at least one default event has occurred on the basis of the received information regarding motion of the user, and transmits an instruction for generating event list information in which a detection time point of the default event is correlated with information regarding the default event to the wearable camera according to determination that the at least one default event has occurred, and in which the wearable camera receives the instruction for generating the event list information transmitted from the server, and generates the event list information in response to the received instruction for generating the event list information, and records the generated event list information on the recorder in correlation with the captured video of the subject.

According to the present disclosure, there is provided a wearable camera system including a wearable camera that is able to be worn or carried by a user; and a server that is communicably connected to the wearable camera, in which the wearable camera records a captured video of a subject on the front side of the user on a recorder, acquires information regarding motion of the user, determines whether or not at least one default event has occurred on the basis of information regarding motion of the user acquired during recording of the captured video of the subject, generates event list information in which a detection time point of the default event is correlated with information regarding the default event according to determination that the at least one default event has occurred during recording of the captured video of the subject, and records the event list information on the recorder in correlation with the captured video of the subject, transmits the captured video of the subject recorded on the recorder and the event list information to the server in correlation with each other, and in which the server receives the captured video of the subject and the event list information transmitted from the wearable camera, and records the captured video of the subject recorded on the recorder and the event list information on a second recorder in correlation with each other.

According to the present disclosure, there is provided an information recording method using a wearable camera system including a wearable camera that is able to be worn or carried by a user; and a server that is communicably connected to the wearable camera, in which the wearable camera records a captured video of a subject on the front side of the user on a recorder, acquires information regarding motion of the user during recording of the captured video of the subject, and transmits the acquired information regarding motion of the user to the server, in which the server receives the information regarding motion of the user transmitted from the wearable camera, determines whether or not at least one default event has occurred on the basis of the received information regarding motion of the user, and transmits an instruction for generating event list information in which a detection time point of the default event is correlated with information regarding the default event to the wearable camera according to determination that the at least one default event has occurred, and in which the wearable camera receives the instruction for generating the event list information transmitted from the server, and generates the event list information in response to the received instruction for generating the event list information, and records the generated event list information on the recorder in correlation with the captured video of the subject.

According to the present disclosure, there is provided an information processing apparatus including a third recorder on which captured videos in wearable cameras respectively worn or carried by a plurality of users, and event list information including each detection time point of a plurality of types of default events detected during recording of the captured videos and information regarding each of the events are recorded in correlation with the wearable cameras; a retrieval processor that retrieves captured videos of an incident gaining attention from the captured videos recorded on the third recorder in response to entry of a retrieval condition; and a display controller that displays a retrieval result screen including a list of a plurality of the captured videos extracted through the retrieval and a predetermined icon on a monitor, in which the display controller displays a video reproduction screen including the captured videos correlated with each of the wearable cameras and the event list information corresponding to the captured videos on the monitor in response to a selection operation on the predetermined icon.

According to the present disclosure, there is provided an information processing method using an information processing apparatus including a third recorder on which captured videos in wearable cameras respectively worn or carried by a plurality of users, and event list information including each detection time point of a plurality of types of default events detected during recording of the captured videos and information regarding each of the events are recorded in correlation with the wearable cameras, the method including a step of retrieving captured videos of an incident gaining attention from the captured videos recorded on the third recorder in response to entry of a retrieval condition; a step of displaying a retrieval result screen including a list of a plurality of the captured videos extracted through the retrieval and a predetermined icon on a monitor; and a step of displaying a video reproduction screen including the captured videos correlated with each of the wearable cameras and the event list information corresponding to the captured videos on the monitor in response to a selection operation on the predetermined icon.

According to the present disclosure, even if a user does not independently reproduce or watch a recorded captured video, each of various behaviors of the user performed in a time series can be determined from a captured video recorded by the wearable camera, so as to be recorded as information, and thus business of the user can be efficiently supported.

BRIEF DESCRIPTION OF THE DRAWINGS

FIG. 5 is a diagram illustrating an example of an action table regarding detected actions;

FIG. 8 is a diagram illustrating examples of action indexes;

FIG. 15 is a diagram illustrating an example of another action table regarding detected actions;

FIG. 16 is a flowchart illustrating another detailed example of an action index generation operation procedure in the wearable camera of Exemplary Embodiment 1;

FIG. 20 is an explanatory diagram illustrating an example in which learning of measured data is started on the basis of rewriting of an action information name in an action table;

FIG. 32 is a flowchart illustrating a detailed example of a display operation procedure corresponding to a captured video retrieval instruction in the back end client of Exemplary Embodiment 4;

FIG. 33A is a diagram illustrating a first example of a case basis event history list corresponding to a case basis unique event list in a modification example of Exemplary Embodiment 4;

FIG. 36A is a diagram illustrating an example of a case basis event history list of a police officer A with an identification number "HP2345";

FIG. 36B is a diagram illustrating an example of a case basis event history list of a police officer B with an identification number "HP3456";

FIG. 37A is a diagram illustrating an example of a case basis event history list into which the policemen A and B with the identification numbers "HP2345" and "HP3456" are merged.

DETAILED DESCRIPTION

History of Reaching Exemplary Embodiment 1

Figure 1:
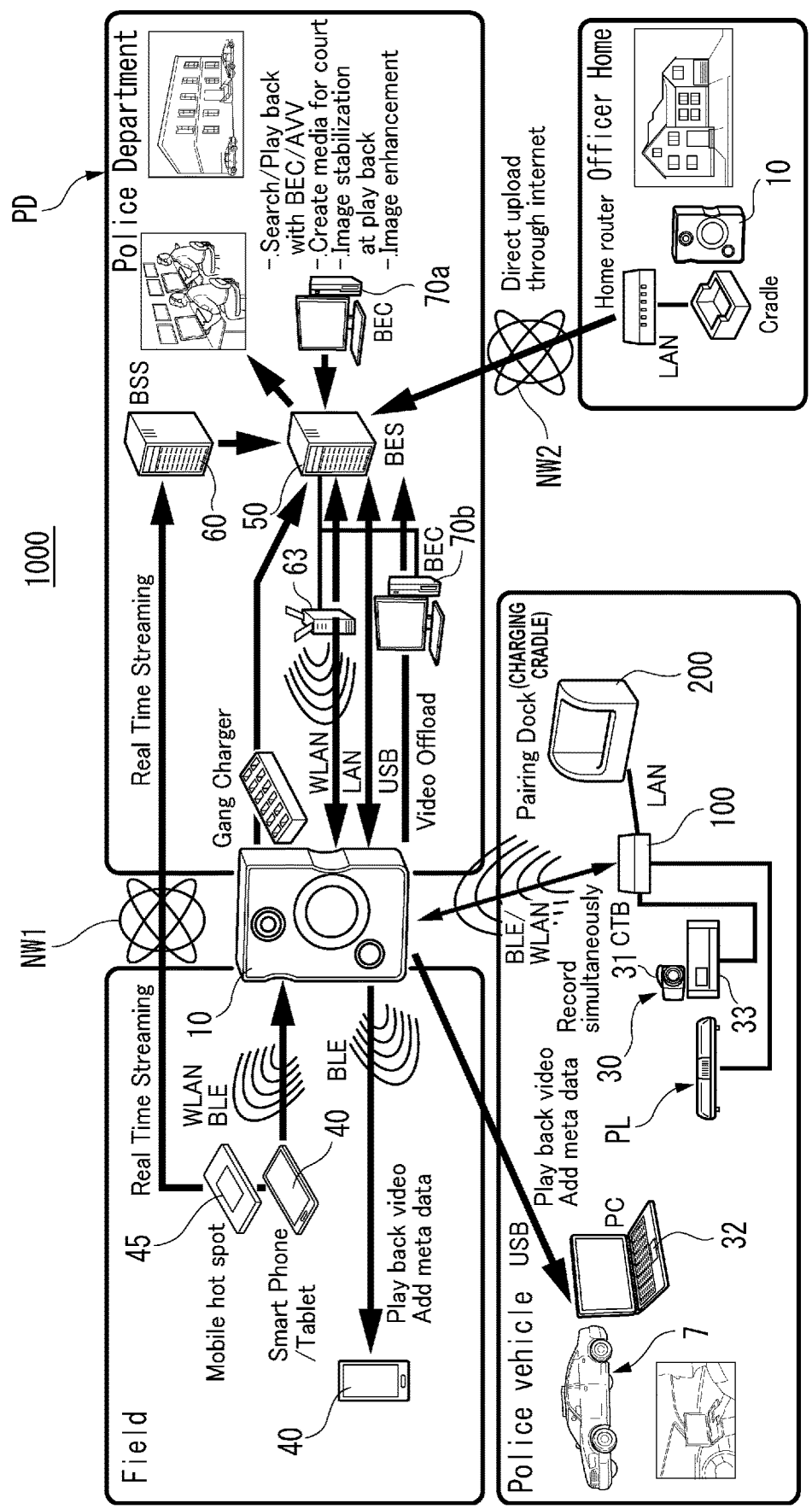
FIG. 1 is a schematic diagram illustrating a configuration example of a wearable camera system of each exemplary embodiment.

In the configuration disclosed in Japanese Patent Unexamined Publication No. 2016-122918, it is not taken into consideration that a wearable camera determines each of various behaviors (for example, a plurality of types of behaviors performed from the start of patrol to the end thereof) performed by a user (for example, a police officer) wearing or carrying the wearable camera. Therefore, in the related art such as Japanese Patent Unexamined Publication No. 2016-122918, relevance between the content of a behavior performed by a user (for example, a police officer) wearing or carrying a wearable camera and a captured video during business cannot be recorded.

For example, in a case where a user (for example, a police officer) wearing or carrying a wearable camera returns to a police department from patrol, the user may create a case report in which behaviors performed on patrol are written in detail in a time series. In the above-described configuration of the related art, each of behaviors performed by a police officer during recording of captured videos cannot be determined. Thus, the police officer returns to a police department, and inevitably reproduces and watches captured videos recorded by the wearable camera. For example, as an appendix of the case report, the police officer is required to create a list on which behaviors performed in a time series on patrol are written. Therefore, a large amount of creation man-hours are necessary, and creation efficiency deteriorates.

Therefore, in Exemplary Embodiment 1, in light of the circumstances, a description will be made of examples of a wearable camera, a wearable camera system, and an information recording method, in which, even if a user does not independently reproduce or watch captured videos which have been recorded, each of various behaviors performed by the user in a time series is determined to be recorded as information, and thus the user's business is efficiently supported.

Hereinafter, with reference to the accompanying drawings as appropriate, a detailed description of each exemplary embodiment in which a wearable camera, a wearable camera system, and an information recording method according to the present disclosure are specifically disclosed. However, a detailed description more than necessary will be omitted in some cases. For example, a detailed description of the well-known content or a repeated description of the same configuration will be omitted in some cases. This is for avoiding unnecessary redundancy of the following description and enabling a person skilled in the art to easily understand the present disclosure. The accompanying drawings and the following description are provided for a person skilled in the art to sufficiently understand the present disclosure, and are not intended to limit the spirit disclosed in the claims.

In the following respective exemplary embodiments, a police officer will be exemplified as a user of a wearable camera according to the present disclosure. However, a user of a wearable camera according to the present disclosure is not limited to a police officer, and may be a security guard, and may be a common citizen instead of a police officer or a security guard.

Exemplary Embodiment 1

FIG. 1 is a schematic diagram illustrating a configuration example of wearable camera system 1000 of each exemplary embodiment. Wearable camera system 1000 illustrated in FIG. 1 includes wearable camera 10 which can be worn or carried by a police officer; various apparatuses disposed in police department PD; various apparatuses used in a field by a police officer; various apparatuses used or mounted in police vehicle 7 (for example, a patrol car; the same applies hereinafter); and various apparatuses used in an officer home.

Wearable camera 10 may be included in any of the various apparatuses disposed in police department PD, the various apparatuses used in a field by a police officer, the various apparatuses used or mounted in police vehicle 7, and the various apparatuses used in the officer home.

The various apparatuses disposed in police department PD includes, for example, at least back end server (BES) 50, back end streaming server (BSS) 60, back end clients (BECs) 70a and 70b, wireless local area network (LAN) access point 63, and a gang charger which can collectively charge a plurality of wearable cameras as an example of a charging device, but are not limited thereto.

The various apparatuses used in a field by a police officer include, for example, at least smart phone 40 (which may also be a tablet terminal) which can be carried by a police officer, and wireless LAN access point 45 which can be carried by a police officer, but are not limited thereto. Smart phone 40 and wireless LAN access point 45 are carried, for example, within a pocket of a uniform worn by a police officer.

The various apparatuses used or mounted in police vehicle 7 include, for example, at least in-car camera system (in-car video: ICV) 30, in-car PC 32, common trigger box (CTB) 100 as an example of an in-car communication apparatus, a charging cradle as an example of a charging device (pairing dock), and a rotary warning light PL, but are not limited thereto.

The various apparatuses used in the officer home include, for example, at least a cradle for charging wearable camera 10 and a home router, but are not limited thereto.

In-car camera system 30 includes one or a plurality of in-car cameras 31, in-car PC 32, and in-car recorder 33, and images and records a case encountered during traveling with police vehicle 7 or a situation on patrol as videos. One or plurality of in-car cameras 31 include, for example, one or a plurality of cameras among a camera provided to image the front side of police vehicle 7, and cameras respectively provided to image the left side, the right side, and the rear side of police vehicle 7. In-car PC 32 controls operations of in-car cameras 31 and in-car recorder 33 in response to an operation performed by police officer 3. In-car recorder 33 records data regarding videos captured by each of the plurality of in-car cameras 31 in a time series. In a case where in-car PC 32 is connected to wearable camera 10 via the Universal Serial Bus (USB), in-car PC 32 charges wearable camera 10, acquires data regarding videos captured by wearable camera 10 via the USB, and reproduces the videos in a default application installed in in-car PC 32, or assigns attribute information to the videos in the application in response to the police officer's operation.

In-car camera system 30 is connected to common trigger box 100 in a wired manner (for example, LAN communication), and performs an operation (for example, starting or stopping of recording of data regarding videos captured by in-car cameras 31) corresponding to a command from common trigger box 100. In-car camera system 30 is communicably connected to wearable camera 10 via common trigger box 100, and starts recording with in-car recorder 33 at the same timing as a timing at which wearable camera 10 starts imaging. Conversely, in-car recorder 33 may start recording at the same timing as a timing at which wearable camera 10 starts imaging. In-car camera system 30 may record videos captured by wearable camera 10 in in-car recorder 33.

Wearable camera 10 is mounted or held on a uniform of a police officer as an example of a user. Wearable camera 10 images a situation as a subject on the front side of the police officer, and transmits video data obtained through the imaging to in-car camera system 30 via common trigger box 100, or wearable camera 10 and in-car recorder 33 simultaneously start imaging. Wearable camera 10 directly transmits the video data to back end server 50 via wireless LAN access point 63, or streams the video data to back end streaming server 60 via smart phone 40 or wireless LAN access point 45 and network NW1 (for example, a mobile communication network or the Internet). In police department PD, wearable camera 10 may send the captured video data to back end client 70b connected thereto via the USB, or to back end server 50 connected thereto via a LAN in police department PD. Wearable camera 10 may be manually mounted on a charging surface of the gang charger so as to transmit the captured video data to back end server 50.

An imaging target subject of wearable camera 10 or in-car cameras 31 includes not only a person, but also a building, a square, a scene of a case field, a crowd (so-called onlookers) gathering near the field, and an atmosphere around an imaging position. In the following description, the field refers to a location where a decisive moment about a case (for example, arson, murder, injury, or robbery) was witnessed. Police officer 3 may carry smart phone 40 or wireless LAN access point 45 as an example of a wireless terminal which can perform communication with wearable camera 10.

Smart phone 40, which has a telephone function and a wireless communication function (for example, a dithering function), is used for emergency contact from police department PD or emergency contact to police department PD, and relays data from wearable camera 10 to back end streaming server 60 in police department PD. In response to the police officer's operation, smart phone 40 reproduces captured video data obtained by wearable camera 10 or edits the captured video data by assigning attribute information (metadata) thereto.

Wireless LAN access point 45 relays data from wearable camera 10 to back end streaming server 60 in police department PD. Wireless communication (for example, Bluetooth (registered trademark) Low Energy (BLE)) or a wireless LAN (WLAN, for example, WiFi (registered trademark)) is used between wearable camera 10 and smart phone 40 or wireless LAN access point 45. In a case of high speed communication such as wearable camera 10 streaming data to back end streaming server 60 via smart phone 40 or wireless LAN access point 45, wireless communication using a fast wireless LAN in which a transmission speed is higher than that of BLE is employed. On the other hand, in a case of low speed communication such as data such as a case number of a captured video obtained by wearable camera 10 being edited in smart phone 40, wireless communication using BLE is employed.

Back end server 50 is configured to include a computer and a storage, and manages evidence videos of a case. Back end server 50 has, for example, a video analysis function such as a face recognition function of recognizing a face in image frames forming videos captured by wearable camera 10 or in-car cameras 31 or an editing function of editing at least some of the videos through image processing in response to a request corresponding to an operation performed by a user (for example, police officer 3 or a specialist for analysis in police department PD) using back end clients 70a and 70b. Back end server 50 has, for example, a reproduction function of reproducing videos captured by wearable camera 10 or in-car cameras 31 in response to a request corresponding to an operation performed by a user (for example, police officer 3 or a specialist for analysis in police department PD) using back end clients 70a and 70b.

Back end streaming server 60 receives video data streamed from wearable camera 10, and transmits the video data to back end server 50.

Each of back end clients 70a and 70b is formed of, for example, a PC, and has a browser or a dedicated application which accesses a suspicious person database (DB) (not illustrated) in back end server 50, retrieves information regarding a case related to a criminal or the like, and can display a retrieval result on a display device (a liquid crystal display (LCD) provided in each of back end clients 70a and 70b). For example, a person wanted or a past criminal is registered in advance in correlation with information (for example, a case number) for identifying a case in suspicious person DB. Back end clients 70a and 70b may access voice DB of back end server 50 and retrieve voice information regarding a case related to a criminal or the like. Back end clients 70 may be provided not only inside police department PD but also outside police department PD. Back end clients 70 may be thin client PCs or rich client PCs.

Wireless LAN access point 63 is connected to wearable camera 10 via a wireless LAN (WLAN), and relays video data transmitted from wearable camera 10 to back end server 50.

The gang charger allows wearable camera 10 worn or carried by each of a plurality of police officers to be mounted on a predetermined charging surface, and charges a battery of each mounted wearable camera 10. The gang charger has a function of performing wired communication with wearable camera 10 during charging, and transmitting video data stored in wearable camera 10 to back end server 50. Alternatively, wearable camera 10 may directly perform communication with back end server 50 through a LAN interface (not illustrated) via the gang charger. The gang charger is connected to back end client 70b via a Universal Serial Bus (USB) cable in a wired manner.

Common trigger box 100 is connected to rotary warning light PL, a siren (not illustrated), in-car camera system 30, and the charging cradle in a wired manner (for example, LAN communication), and can be connected to wearable camera 10 via the charging cradle when wearable camera 10 is connected to the charging cradle. Common trigger box 100 sends a control signal for recording starting or recording stopping by using BLE or a wireless LAN (WLAN) between an apparatus (hereinafter, referred to as a "CTB connected apparatus" in some cases) connected to common trigger box 100 in a wired or wireless manner and wearable camera 10, and thus controls execution of recording starting or recording stopping synchronized between wearable camera 10 and the CTB connected apparatus. The CTB connected apparatus is, for example, the above-described rotary warning light PL, siren (not illustrated), in-car camera system 30 or charging cradle.

In a case where common trigger box 100 is connected to, for example, in-car camera system 30 in a wired manner (for example, LAN communication), common trigger box 100 sends a control signal for recording starting or recording stopping to in-car camera system 30. Consequently, in-car camera system 30 may start recording of data regarding videos captured by in-car cameras 31 on in-car recorder 33 or may stop the recording as an operation corresponding to the control signal from common trigger box 100. If an operation starting signal is acquired from a police vehicle mounted vehicle such as rotary warning light PL or the siren, common trigger box 100 detects the start of use of the police vehicle mounted apparatus, and sends a control signal for recording starting or recording stopping to wearable camera 10 or in-car camera system 30 connected to common trigger box 100. Consequently, wearable camera 10 or in-car camera system 30 may start recording of data regarding videos obtained through imaging due to, for example, rotation starting of rotary warning light PL or sound outputting of the siren, or may stop the recording, as an operation corresponding to the control signal from common trigger box 100.

In a case where common trigger box connected apparatuses are only in-car recorder 33 and wearable camera 10, if one (for example, in-car recorder 33) sends a notification that recording is started or stopped to common trigger box 100, common trigger box 100 sends a control signal for recording starting or stopping to the other apparatus (for example, wearable camera 10). Consequently, common trigger box 100 can cause both of in-car recorder 33 and wearable camera 10 to start or stop recording substantially simultaneously.

The charging cradle is disposed, for example, at a default position (for example, near a center console) of police vehicle 7, and is connected to common trigger box 100 in a wired manner (for example, Power over Ethernet (registered trademark) (PoE) using a LAN cable). The charging cradle has the charging surface for mounting wearable camera 10. In a case where the charging cradle is connected to common trigger box 100 in a wired manner (for example, PoE using a LAN cable), and is connected to wearable camera 10 due to wearable camera 10 being mounted on the charging surface, the charging cradle can charge the battery of wearable camera 10 on the basis of a current supplied from common trigger box 100.

It is assumed that a police officer mounts wearable camera 10 on a cradle corresponding to wearable camera 10 when returning to the officer home or on break. In this case, wearable camera 10 can transmit data regarding videos captured by wearable camera 10 to back end server 50 via the home router which is connected to the cradle in a wired manner (for example, LAN communication) and network NW2.

Figure 2:
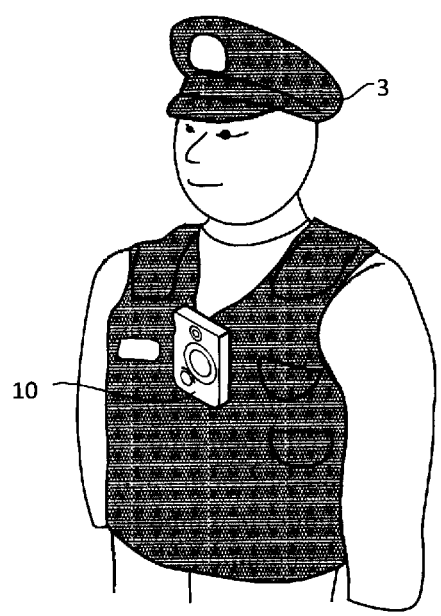
FIG. 2 is a diagram illustrating an example of the upper half of the body of a police officer wearing a wearable camera of each exemplary embodiment.

FIG. 2 is a diagram illustrating an example of the upper half of the body of police officer 3 wearing wearable camera 10 of each exemplary embodiment. Wearable camera 10 is mounted or held on a front part of a uniform of police officer 3 so as to image the front side of police officer 3. Wearable camera 10 may be fixed to the front part of the uniform in a state of being suspended from the neck with a string, for example. Wearable camera 10 may be fixed to the front part of the uniform as a result of an attachment tool (for example, an attachment clip) attached to a rear surface of casing 10z (refer to FIG. 3) of wearable camera 10 being engaged with an attachment tool attached to the front part of the uniform.

Figure 3:
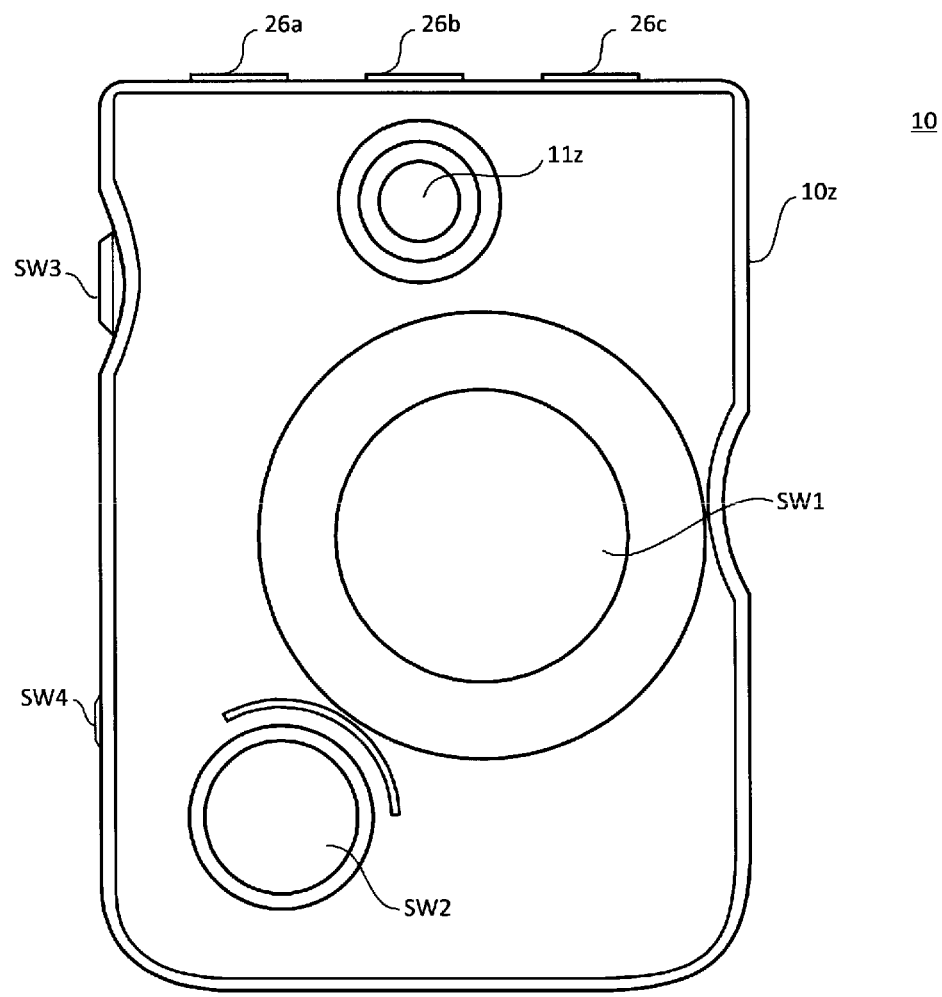
FIG. 3 is a front view illustrating an example of a front surface of a casing of the wearable camera of each exemplary embodiment.

FIG. 3 is a front view illustrating an example of a front surface of casing 10z of wearable camera 10 of each exemplary embodiment. Recording switch SW1, snapshot switch SW2, and imaging lens 11z are disposed on the front surface of casing 10z. Processor 19 detects an operation on each of recording switch SW1 and snapshot switch SW2, and performs a process on a switch input corresponding to the operation.

Recording switch SW1 is pressed for a short period of time and thus gives an instruction for recording starting, and is pressed for a long period of time (for example, an operation in which a pressing state is continued for three seconds) and thus gives an instruction for recording stopping. Processor 19 may execute recording starting or may execute recording stopping in response to such an instruction. Snapshot switch SW2 gives an instruction for recording a still image captured by capture 11, for example, when being pressed. Processor 19 may record a still image in response to such an instruction. Imaging lens 11z forms an optical image captured by wearable camera 10 on an imaging surface of capture 11 (refer to FIG. 4).

Communication mode switch SW3 and attribute information assignment switch SW4 are disposed on a side surface of casing 10z. Processor 19 detects an operation on each of communication mode switch SW3 and attribute information assignment switch SW4, and performs a process on a switch input corresponding to the operation.

Attribute information assignment switch SW4 is a pressing type button switch which is operated in order to assign attribute information to video data. In a case where attribute information assignment switch SW4 is pressed, processor 19 assigns attribute information to cutout data including a face image which is cut out from a captured image obtained by capture 11.

Communication mode switch SW3 is, for example, a slide switch for inputting an operation instruction for setting a communication mode between wearable camera 10 and an external apparatus. Processor 19 detects a state of communication mode switch SW3, and operates BLE communicator 21A or WLAN communicator 21B according to a communication mode corresponding to setting of communication mode switch SW3.

The communication mode includes, for example, an access point mode, a station mode, and an OFF mode. The access point mode is a mode in which wearable camera 10, which operates as an access point of a wireless LAN, is wirelessly connected to, for example, smart phone 40 carried by police officer 3, and thus wearable camera 10 and smart phone 40 perform communication with each other. In the access point mode, smart phone 40 may be connected to wearable camera 10 so as to perform display of the current live images in wearable camera 10, reproduction of recorded images, display of captured still images, and the like. The station mode is a mode in which, in a case of being connected to an external apparatus by using a wireless LAN, communication is performed by using the external apparatus as an access point. For example, smart phone 40 may be set as an external apparatus by using the dithering function of smart phone 40. In the station mode, wearable camera 10 may transmit (upload) various settings, recorded images held in wearable camera 10, and the like, to in-car camera system 30, or back end clients 70 or back end server 50 in police department PD.

For example, three LEDs 26a, 26b and 26c are disposed on an upper surface of casing 10z. LED 26a displays a state of power on/off of wearable camera 10 and a state of battery 25 (refer to FIG. 4). LED 26b displays a state of an imaging operation of wearable camera 10. LED 26c displays a state of a communication mode of wearable camera 10.

Figure 4:
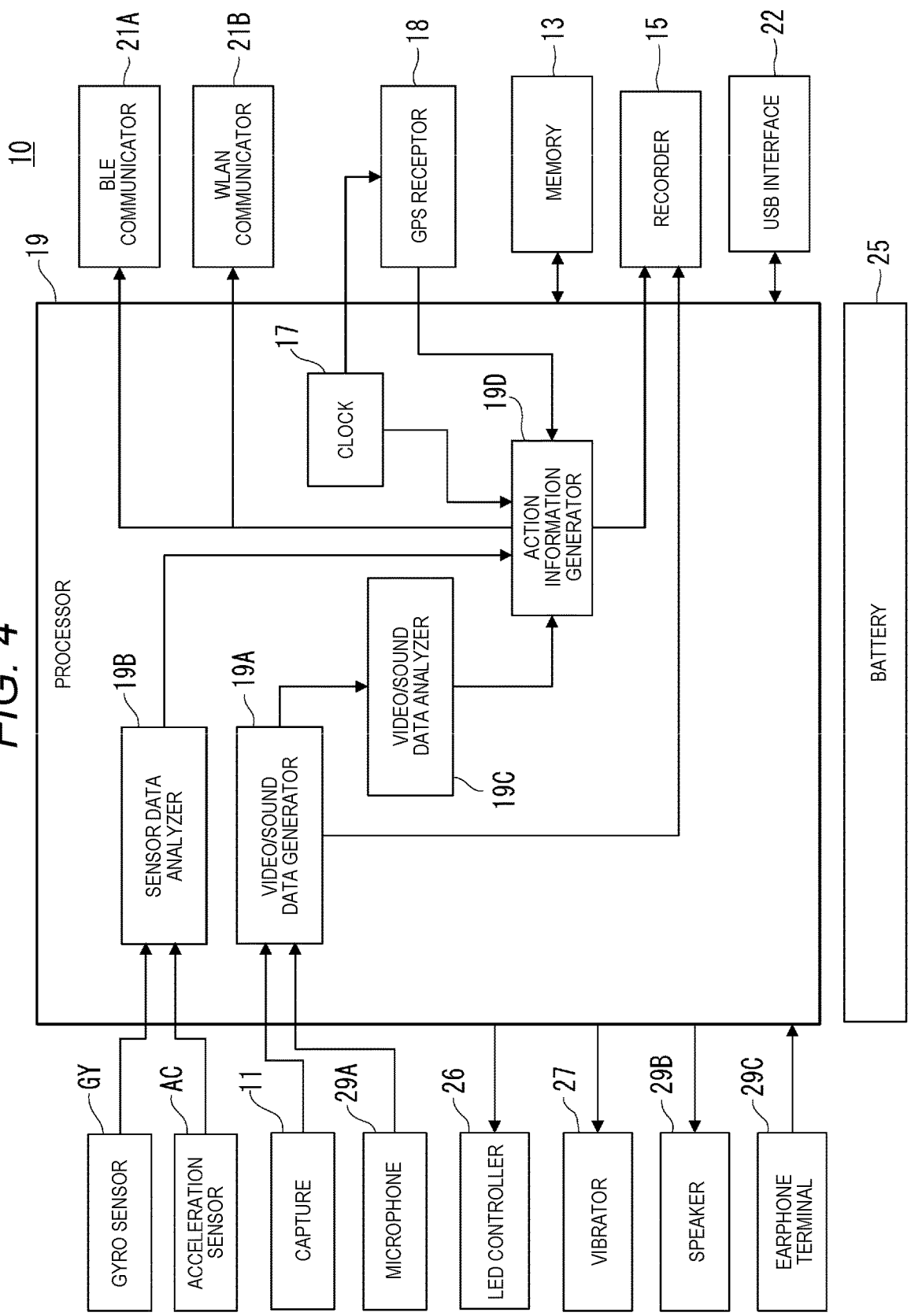
FIG. 4 is a block diagram illustrating a detailed example of an internal configuration of a wearable camera of Exemplary Embodiment 1 in detail.

FIG. 4 is a block diagram illustrating a detailed example of an internal configuration of wearable camera 10 of Exemplary Embodiment 1. Wearable camera 10 includes capture 11, memory 13, recorder 15, global positioning system (GPS) receptor 18, and processor 19.

Wearable camera 10 includes BLE communicator 21A, WLAN communicator 21B, and USB interface 22. Wearable camera 10 includes battery 25, LED controller 26, vibrator 27, microphone 29A, speaker 29B, and earphone terminal 29C. Wearable camera 10 includes acceleration sensor AC and gyro sensor GY.

Capture 11 is configured to include imaging lens 11z (refer to FIG. 3), and a solid-state imaging element such as a charge coupled device (CCD) type image sensor or a complementary metal oxide semiconductor (CMOS) type image sensor. While a power source of wearable camera 10 is turned on, capture 11 normally outputs data regarding a captured image of a subject obtained on the basis of imaging in the solid-state imaging element, to processor 19. The captured image data is input to video/sound data generator 19A of processor 19.

Memory 13 is formed by using, for example, a random access memory (RAM) and a read only memory (ROM), and temporarily stores a program or data required to perform an operation of wearable camera 10 and further information or data generated during the operation. The RAM is, for example, a work memory used during an operation of processor 19. The ROM stores, for example, a program and data used to control processor 19 in advance. Memory 13 stores, for example, identification information (for example, a serial number) for identifying wearable camera 10, and various pieces of setting information.

Recorder 15 is formed by using a semiconductor memory (for example, a flash memory) built into wearable camera 10 or an external storage medium such as a memory card (for example, an SD card) not built into wearable camera 10. Recorder 15 records an action index AL1 (refer to FIG. 9) generated by action information generator 19D of processor 19 or data regarding action map MP1 in correlation with a captured video or voice data corresponding to action index AL1 or action map MP1. Recorder 15 normally pre-buffers and holds captured video data corresponding to a predetermined time, and continuously accumulates captured video data corresponding to a predetermined time (for example, thirty seconds) before the current time. If a recording starting instruction is received from processor 19, recorder 15 starts to record captured video data, and continuously records the captured video data until a recording stopping instruction is received from processor 19. In a case where recorder 15 is formed of a memory card, recorder 15 is detachably attached to casing 10z of wearable camera 10.

GPS receptor 18 receives satellite signals transmitted from a plurality of GPS signal transmitters (for example, four navigation satellites), each including a signal transmission time and a position coordinate thereof. GPS receptor 18 (position information acquisition) calculates the current position coordinate of wearable camera 10 and reception times of the satellite signals by using the plurality of satellite signals. This calculation may be performed by processor 19 to which an output from GPS receptor 18 is input instead of GPS receptor 18. Information regarding a reception time may be used to correct a system time (that is, an output from clock 17) of wearable camera 10. The system time is used for recording of an imaging time of a captured image (including a still image and a moving image) or as times of detecting various actions (refer to FIG. 5) as default events.

Processor 19 functions as a controller of wearable camera 10, and performs a control process of integrating operations of the respective constituent elements of wearable camera 10 as a whole, a process of transmitting and receiving data to and from the respective constituent elements of wearable camera 10, a data calculation (computation) process, and a data storage process. Processor 19 is operated according to the program and the data stored in memory 13. During an operation, processor 19 acquires the current time information from clock 17 and acquires the current position information from GPS receptor 18 by using memory 13.

Processor 19 is formed by using, for example, a central processing unit (CPU), a micro processing unit (MPU), a digital signal processor (DSP), or a field programmable gate array (FPGA). Processor 19 is configured to include clock 17, video/sound data generator 19A, sensor data analyzer 19B, video/sound data analyzer 19C, and action information generator 19D, as software functional configurations.

Clock 17 counts information regarding the current time (that is, a system time of wearable camera 10), and outputs the counted information to GPS receptor 18 and action information generator 19D.

While the power source of wearable camera 10 is turned on, video/sound data generator 19A normally receives captured image data which is output from capture 11. Video/sound data generator 19A converts the captured image data output from capture 11 into data with a data format such that the data can be recorded (stored) in recorder 15. In other words, video/sound data generator 19A (video recording device) generates data regarding captured videos of a subject on the front side of a user (for example, police officer 3), and records the data on recorder 15. Video/sound data generator 19A outputs data regarding captured videos of a subject on the front side of a user (for example, police officer 3) to video/sound data analyzer 19C.

While the power source of wearable camera 10 is turned on, video/sound data generator 19A normally receives sound data which is output from the microphone 29A. Video/sound data generator 19A converts the sound data output from microphone 29A into data with a data format such that the data can be recorded (stored) on recorder 15. In other words, video/sound data generator 19A (sound recorder) generates sound data around a user (for example, police officer 3), and records the sound data on recorder 15. Video/sound data generator 19A outputs sound data around a user (for example, police officer 3) to video/sound data analyzer 19C.

While the power source of wearable camera 10 is turned on, sensor data analyzer 19B normally receives acceleration data in three-axis (an x axis, a y axis, and a z axis) directions of an orthogonal coordinate system, measured by acceleration sensor AC or inclination data in three-axis (an x axis, a y axis, and a z axis) directions of an orthogonal coordinate system, measured by gyro sensor GY. Sensor data analyzer 19B outputs the acceleration data and the inclination data from acceleration sensor AC and gyro sensor GY to action information generator 19D.

Video/sound data analyzer 19C performs a predetermined analysis process on the data regarding the captured videos of the subject on the front side of the user (for example, police officer 3) or the sound data around the user (for example, police officer 3) sent from video/sound data generator 19A, and outputs an analysis result to action information generator 19D. Video/sound data analyzer 19C analyzes whether or not police officer 3 takes out and levels a gun at a criminal of a serious case in front of police officer 3 by using, for example, the data regarding the captured videos of the subject on the front side of the user (for example, police officer 3). Video/sound data analyzer 19C analyzes whether or not the user (for example, police officer 3) said a default phrase (for example, "freeze") for urging a suspicious person such as a suspect in front thereof or in pursuit to stop by using, for example, the sound data around the user (for example, police officer 3).

Action information generator 19D acquires the current time information output from clock 17, the current position information of wearable camera 10 output from GPS receptor 18, and the acceleration data and the inclination data in the three-axis (the x axis, the y axis, and the z axis) directions of the orthogonal coordinate system, sent from sensor data analyzer 19B. Action information generator 19D acquires data regarding the analysis result sent from video/sound data analyzer 19C.

Action information generator 19D (determiner) determines whether or not at least one default event has occurred on the basis of one or both of the acceleration data acquired (specifically, measured) by acceleration sensor AC and the inclination data acquired (specifically, measured) by gyro sensor GY during recording of captured videos of a subject. A specific example of the default event will be described later with reference to FIG. 5. In the present exemplary embodiment, the default event indicates behaviors (hereinafter, for convenience, referred to as "actions" in some cases) of a user (for example, police officer 3) performed in a time series during business (for example, on patrol or in pursuit of a suspicious person such as a criminal), or symptoms of the user (for example, police officer 3) appearing in a time series.

FIG. 5 is a diagram illustrating an example of action table Atb0 regarding detected actions. In action table Atb0, for example, the content of each default event (for example, an action) stored in memory 13 or recorder 15 is correlated with a sensor used for detection of each default event (for example, an action), or a detection condition. In the present exemplary embodiment, detected events (for example, actions) are not limited to events listed in FIG. 5. Action information generator 19D refers to action table Atb0, and determines whether or not the above-described default event has occurred on the basis of measured data (specifically, one or both of acceleration data and inclination data) in a sensor used for detection of the default event or whether or not a detection condition has been established.

For example, in a case of detecting whether or not police officer 3 started to run as an action, one or both of acceleration data measured by acceleration sensor AC and inclination data measured by gyro sensor GY are referred to.

For example, in a case of detecting whether or not police officer 3 fell down or was shot as an action, one or both of acceleration data measured by acceleration sensor AC and inclination data measured by gyro sensor GY are referred to.

For example, in a case of detecting whether or not police officer 3 took a gun from a holster as an action, one or both of acceleration data measured by acceleration sensor AC and inclination data measured by gyro sensor GY are referred to.

For example, in a case of detecting whether or not police officer 3 held the gun at the ready as an action, all of acceleration data measured by acceleration sensor AC, inclination data measured by gyro sensor GY, and data measured by a sensor (not illustrated) attached to the holster are referred to. Although not illustrated in FIG. 5, in a case of detecting whether or not police officer 3 held the gun at the ready as an action, a video analysis result in video/sound data analyzer 19C may be referred to along with or instead of acceleration data measured by acceleration sensor AC, inclination data measured by gyro sensor GY, and data measured by a sensor (not illustrated) attached to the holster.

For example, in a case of detecting whether or not police officer 3 got off a vehicle (for example, police vehicle 7) as an action, acceleration data measured by acceleration sensor AC is referred to.

For example, in a case of detecting whether or not police officer 3 conducts an interview as an action, it is referred to whether or not police officer 3 stops on the basis of acceleration data measured by acceleration sensor AC and inclination data measured by gyro sensor GY, and whether or not police officer 3 has a conversation as a sound analysis result in video/sound data analyzer 19C.

For example, in a case of detecting whether or not police officer 3 urged stoppage as an action, it is referred to whether or not "freeze" is recognized as voices as a sound analysis result in video/sound data analyzer 19C.

In a case where it is determined that at least one default event has occurred, action information generator 19D generates event list information (for example, action index AL1; refer to FIG. 8) in which a detection time point of the default event is correlated with information regarding the default event. Action information generator 19D records action index AL1 on recorder 15 in correlation with captured videos recorded on recorder 15 by video/sound data generator 19A. Action index AL1 will be described later with reference to FIG. 8.

In a case where it is determined that at least one default event has occurred, action information generator 19D acquires captured video data of a subject from video/sound data generator 19A, and generates a thumbnail image corresponding to a detection time point of the default event. Action information generator 19D records action index AL1 including the generated thumbnail image on recorder 15.

In a case where it is determined that at least one default event has occurred, action information generator 19D acquires position information of wearable camera 10 corresponding to a detection time point of the default event. Action information generator 19D reads, for example, map data MP0 stored in recorder 15, generates action map MP1 in which the position information is superimposed on map data MP0, and records action map MP1 on recorder 15.

BLE communicator 21A (communicator) performs wireless communication with smart phone 40 or the like by using a communication form of Bluetooth (registered trademark) Low Energy (BLE) which is a communication standard related to short-range radio communication. BLE is the name of the version 4.0 of Bluetooth (registered trademark). In BLE, communication is possible at low power consumption, but a communication speed is low as 100 kbps.

In a case where smart phone 40 operates as an access point by using the dithering function, WLAN communicator 21B (communicator) is connected to smart phone 40 or wireless LAN access point 63 in police department PD via a wireless LAN (that is, a WLAN). WLAN communicator 21B performs wireless communication (for example, WiFi (registered trademark) communication) with an apparatus as a connection destination of the wireless LAN. The wireless LAN enables high speed communication as a communication speed of several tens to several hundreds of Mbps compared with BLE, but is connected to a wireless LAN access point at all times, so that power consumption increases.

Wearable camera 10 may have a configuration (not illustrated) of a communicator for performing wireless communication using short-range radio communication such as Near Field Communication (NFC), a wide area mobile line network (for example, Long Term Evolution (LTE)), or the Fifth Generation Mobile Communications System (5G), in addition to BLE communication or WLAN communication.

USB interface 22 is a serial bus, and enables wired connection to, for example, in-car camera system 30 or back end clients 70 in police department PD.

Battery 25 is formed of, for example, a rechargeable secondary battery, and supplies source power to the respective constituent elements of wearable camera 10.

LED controller 26 controls, for example, lighting or unlighting operations of three LEDs 26a, 26b and 26c according to an operation state of wearable camera 10.

Vibrator 27 vibrates in a predetermined vibration pattern on the basis of an instruction from processor 19 according to an operation state of wearable camera 10. A single type or a plurality of types of vibration patterns may be used.

Microphone 29A (sound collector) collects sounds around wearable camera 10 (in other words, police officer 3), and outputs sound data of the collected sounds to processor 19. The sound data is input to video/sound data generator 19A of processor 19. Microphone 29A may be a built-in microphone accommodated in casing 10z of wearable camera 10, and may be a wireless microphone which is wirelessly connected to wearable camera 10. In a case of the wireless microphone, police officer 3 attaches the microphone to any location, and can increase sound collection property.

Speaker 29B (sound output) outputs a sound signal sent from processor 19 as sounds. Speaker 29B outputs a sound signal for outputting a predetermined sound by reading a default sound stored in advance in memory 13 (for example, the read only memory (ROM)) or combining a plurality of types of sounds.

Earphone terminal 29C is a connector connected to an earphone (not illustrated), and outputs a sound signal which is output as a sound from speaker 29B, to the earphone during connection to the earphone.

Although not illustrated in FIG. 4, recording switch SW1, snapshot switch SW2, communication mode switch SW3, attribute information assignment switch SW4, LEDs 26a, 26b and 26c are connected to processor 19 via a GPIO which is a parallel interface via which signals are input and output. Vibrator 27, microphone 29A, speaker 29B, and earphone terminal 29C are illustrated to be directly connected to processor 19 in FIG. 4, but may be similarly connected thereto via the GPIO which is a parallel interface.

Gyro sensor GY (sensor) detects and measures angular velocities (that is, rotation angles or inclinations of wearable camera 10 or police officer 3 per unit time wearing wearable camera 10) in the three-axis (the x axis, the y axis, and the z axis) directions of the orthogonal coordinate system of wearable camera 10. In other words, gyro sensor GY may acquire information regarding motion of police officer 3 wearing wearable camera 10. For example, gyro sensor GY detects that police officer 3 wearing or carrying wearable camera 10 fell down (man down). A detection result in gyro sensor GY is input to processor 19 via an I2C (not illustrated). Wearable camera 10 can detect behaviors (for example, that police officer 3 fell to the ground, was shot and fell to the ground, and was attacked by a weapon and fell to the ground) regarding rotations of police officer 3 wearing or carrying wearable camera 10 with high accuracy by using gyro sensor GY. Inclination data in the three-axis directions measured by gyro sensor GY is referred to when it is determined whether or not various actions illustrated in FIG. 5 were detected.

Acceleration sensor AC (sensor) detects and measures accelerations in the three-axis (the x axis, the y axis, and the z axis) directions of the orthogonal coordinate system of wearable camera 10. In other words, acceleration sensor AC may acquire information regarding motion of police officer 3 wearing wearable camera 10. For example, acceleration sensor AC detects that police officer 3 wearing or carrying wearable camera 10 fell down (man down), police officer 3 started to run, and police officer 3 took a shooting posture with the possessed gun. A detection result in acceleration sensor AC is input to processor 19 via an I2C (not illustrated). Wearable camera 10 can detect behaviors regarding motion or a body posture of police officer 3 wearing or holding wearable camera 10 with high accuracy by using acceleration sensor AC. Inclination data in the three-axis directions measured by acceleration sensor AC is referred to when it is determined whether or not various actions illustrated in FIG. 5 were detected.

Although not illustrated in FIG. 4, gyro sensor GY and acceleration sensor AC are connected to processor 19 via a communication interface such as an inter-integrated circuit (I2C).

Figure 6:
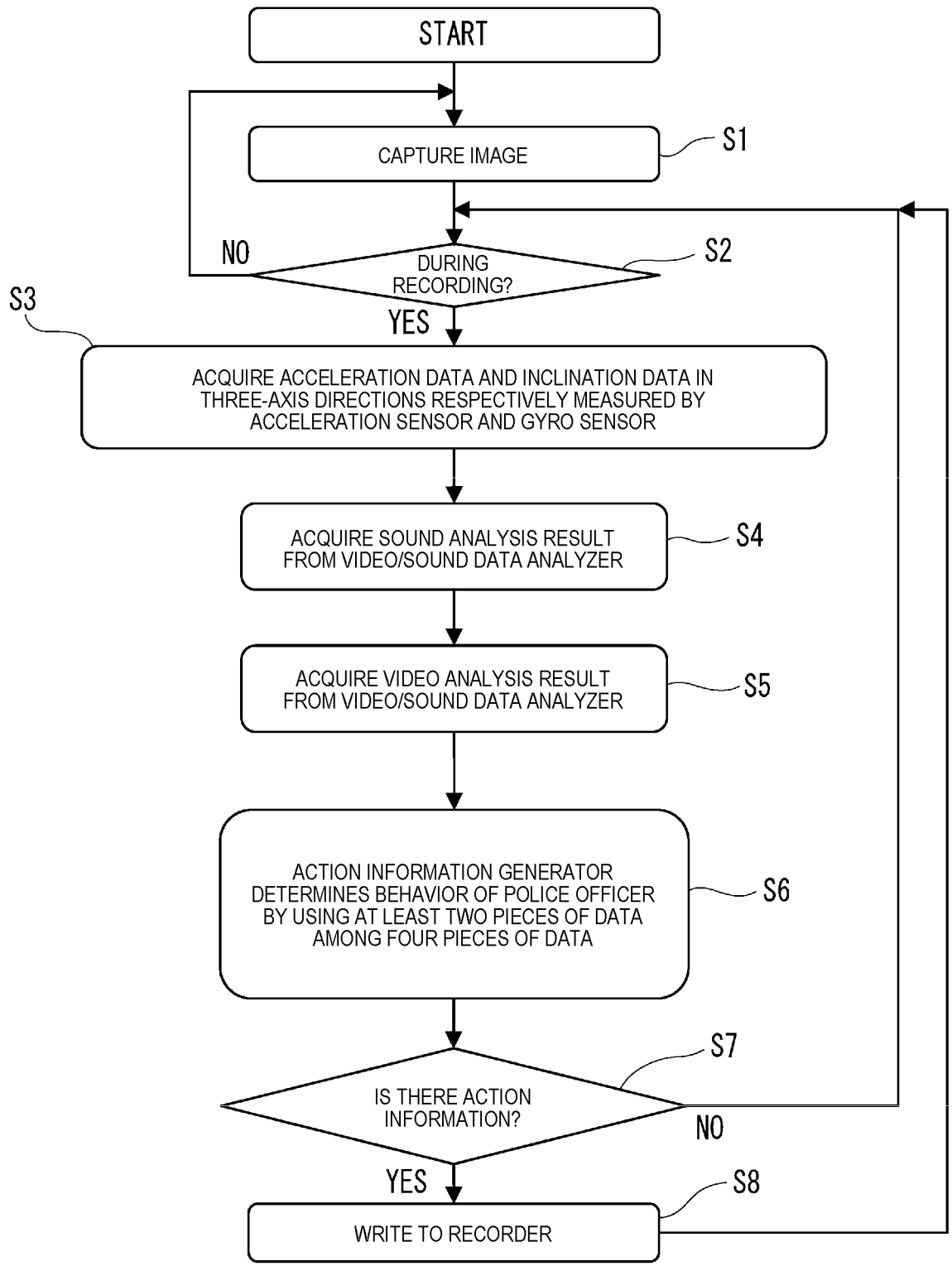
FIG. 6 is a flowchart illustrating a detailed example of an action index generation operation procedure in the wearable camera of Exemplary Embodiment 1.

FIG. 6 is a flowchart illustrating a detailed example of a generation operation procedure for action index AL1 in wearable camera 10 of Exemplary Embodiment 1. FIG. 6 will be described assuming that the power source of wearable camera 10 is in an ON state.

In FIG. 6, since the power source is turned on, wearable camera 10 images a subject on the front side of police officer 3 with capture 11 (S1). After step S1, wearable camera 10 determines whether or not data regarding captured videos obtained in step S1 is being recorded (S2). In a case where the data is not being recorded (S2: NO), the process in wearable camera 10 returns to step S1.

On the other hand, for example, in a case where recording switch SW1 is pressed for a short period of time, processor 19 of wearable camera 10 determines that the data regarding captured videos is being recorded (S2: YES), and performs a process in step S3. In other words, in wearable camera 10, processor 19 acquires acceleration data and inclination data in the three-axis directions of the orthogonal coordinate system measured by acceleration sensor AC and gyro sensor GY (S3).

In wearable camera 10, action information generator 19D acquires data regarding a sound analysis result delivered from video/sound data analyzer 19C (S4). In wearable camera 10, action information generator 19D acquires data regarding a video analysis result delivered from video/sound data analyzer 19C (S5). An order of the processes in steps S3 to S5 may be any order.

In wearable camera 10, action information generator 19D refers to action table Atb1 (refer to FIG. 7), and determines an action of police officer 3 by using at least two types of measured data among the four types of measured data (that is, the acceleration data and the inclination data in the three-axis directions of the orthogonal coordinate system, the sound analysis result data, and the video analysis result data) acquired in the respective processes in steps S3 to S5 (S6). Wearable camera 10 determines whether or not there is a default event (for example, an action corresponding to action information defined in action table Atb1 (which will be described later)) among behaviors of police officer 3 as a result of the determination in step S6 (S7). In a case where it is determined that there is no default event (for example, an action corresponding to action information defined in action table Atb1 (which will be described later)) among behaviors of police officer 3 (S7: NO), the process in wearable camera 10 returns to step S2.

On the other hand, in a case where it is determined that there is a default event (for example, an action corresponding to action information defined in action table Atb1 (which will be described later)) among behaviors of police officer 3 (S7: YES), wearable camera 10 generates action index AL1 in which a detection time point of the default event is correlated with information regarding the default event according to the determination in action information generator 19D. As illustrated in FIG. 8, action index AL1 may indicate the whole of detection time points of a plurality of events detected in a time series and information regarding the events, and may indicate a detection time point of a single event and information regarding the event. Wearable camera 10 records action index AL1 on recorder 15 in correlation with captured videos recorded on recorder 15 by video/sound data generator 19A (S8). After step S8, the process in wearable camera 10 returns to step S2.

Figure 7:
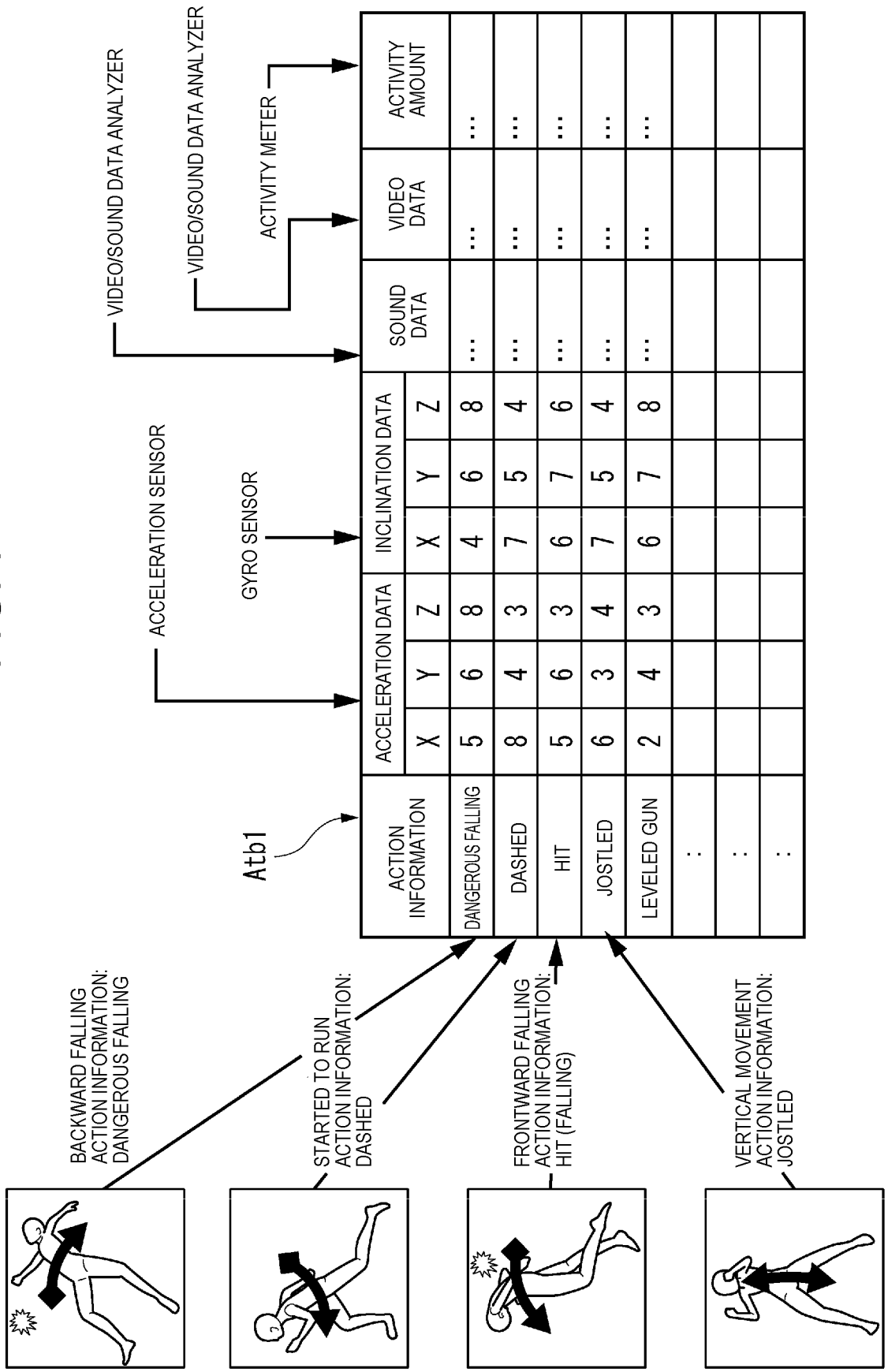
FIG. 7 is an explanatory diagram illustrating an example of a relationship among detected actions, various pieces of measured data, and an action table.

Here, details of the determination process in step S6 will be described with reference to FIG. 7. FIG. 7 is an explanatory diagram illustrating relationship examples among detected actions, various pieces of measured data, and action table Atb1.

In step S6, action information generator 19D reads and acquires action table Atb1 from recorder 15. Action table Atb1 indicates, for example, a correspondence relationship between various pieces of measured data used to detect a default event (action) and the name of an actually detected event (action) when detection of the default event is determined. Action table Atb1 may be recorded on recorder 15, and may be recorded on memory 13. Herein, the various pieces of measured data include acceleration data measured by acceleration sensor AC, inclination data measured by gyro sensor GY, sound analysis result data generated by video/sound data analyzer 19C, video analysis result data generated by video/sound data analyzer 19C, and activity amount data measured by an activity meter (which will be described later).

Action information generator 19D refers to action table Atb1, and determines whether or not a behavior of police officer 3 was performed by using at least two types of measured data among the four types of measured data acquired in the respective processes in steps S3 to S5.

For example, in a case where acceleration data and inclination data of the same extent as acceleration data (5,6,8) and inclination data (4,6,8) in the three-axis (the x axis, the y axis, and the z axis) directions of the orthogonal coordinate system are obtained, for example, action information generator 19D determines that a default event (action) "dangerous falling" occurred assuming that police officer 3 fell backward.

For example, in a case where acceleration data and inclination data of the same extent as acceleration data (8,4,3) and inclination data (7,5,4) in the three-axis (the x axis, the y axis, and the z axis) directions of the orthogonal coordinate system are obtained, for example, action information generator 19D determines that a default event (action) "dash" occurred assuming that police officer 3 started to run.

For example, in a case where acceleration data and inclination data of the same extent as acceleration data (5,6,3) and inclination data (6,7,6) in the three-axis (the x axis, the y axis, and the z axis) directions of the orthogonal coordinate system are obtained, for example, action information generator 19D determines that a default event (action) "hit (falling)" occurred assuming that police officer 3 fell frontward.

For example, in a case where acceleration data and inclination data of the same extent as acceleration data (6,3,4) and inclination data (2,3,4) in the three-axis (the x axis, the y axis, and the z axis) directions of the orthogonal coordinate system are obtained, for example, action information generator 19D determines that a default event (action) "jostling" occurred assuming that police officer 3 moved vertically.

For example, in a case where acceleration data and inclination data of the same extent as acceleration data (2,4,3) and inclination data (6,7,8) in the three-axis (the x axis, the y axis, and the z axis) directions of the orthogonal coordinate system are obtained, for example, action information generator 19D determines that a default event (action) "gun leveling" occurred assuming that police officer 3 leveled the gun. The event "gun leveling" may be determined by referring to data measured by the sensor (not illustrated) attached to the holster as described with reference to FIG. 5.

FIG. 8 is a diagram illustrating an example of action index AL1. Action index AL1 is a time-series behavior table of police officer 3, indicating an order of events (actions) over time of police officer 3 detected by wearable camera 10, and a summary or the content of each action. FIG. 8 illustrates action index AL1 in which, with respect to a total of eleven events (actions), detection time points of the events (actions), thumbnail images SM1 to SM11 corresponding to the detection time points of the respective actions, the pieces of content of the respective actions, and determination conditions of the respective actions are correlated with each other.

A detailed description will be made of action index AL1 in FIG. 8. First, in an index (a time point of 01:00:10 p.m.) of a first row, wearable camera 10 has determined that recording of captured videos typified by thumbnail image SM1 was started on the basis of pressing of a REC button (that is, recording switch SW1) performed by police officer 3 and reception of a trigger from the ICV (that is, reception of a recording starting instruction from in-car camera system 30).

Next, in an index (a time point of 01:20:32 p.m.) of a second row, wearable camera 10 has detected that the door of police vehicle 7 which police officer 3 was aboard was opened, for example, on the basis of a video analysis result, and has determined that police officer 3 arrived at a site including a field by car (that is, police vehicle 7). Thumbnail image SM2 is generated on the basis of a captured video at a point where it was detected that police officer 3 arrived at the site, and indicates a situation of the site.

Next, in an index (a time point of 01:21:14 p.m.) of a third row, wearable camera 10 has detected that police officer 3 was continuously moving for a predetermined time or more on the basis of measured data in each of acceleration sensor AC and gyro sensor GY, and has determined that police officer 3 walked and moved to the field. Thumbnail image SM3 is generated on the basis of a captured video at a point at which it was detected that police officer 3 walked and moved to the field, and indicates a situation at a point at which police officer 3 was walking to the field.

Next, in an index (a time point of 01:24:33 p.m.) of a fourth row, wearable camera 10 has detected that police officer 3 did not moved for a predetermined time or more on the basis of measured data in each of acceleration sensor AC and gyro sensor GY, and has determined that police officer arrived at the field. Thumbnail image SM4 is generated on the basis of a captured video at a point at which it was detected that police officer 3 arrived at the field, and indicates a situation of the field.

Next, in an index (a time point of 01:26:45 p.m.) of a fifth row, wearable camera 10 has detected that police officer 3 was running on the basis of measured data in each of acceleration sensor AC and gyro sensor GY, and has determined that police officer 3 was running in pursuit of a criminal. Thumbnail image SM5 is generated on the basis of a captured video at a point at which it was detected that police officer 3 was running in pursuit of the criminal, and indicates a situation of pursuing the criminal.

Next, in an index (a time point of 01:30:33 p.m.) of a sixth row, wearable camera 10 has determined that police officer 3 took the gun from the holster and leveled the gun on the basis of data measured by the sensor (not illustrated) attached to the holster and data indicating motion of the arms detected by the activity meter (which will be described later) attached to the arm of police officer 3. Thumbnail image SM6 is generated, for example, on the basis of a captured video at a point at which it was detected that police officer 3 leveled the gun at the criminal, and indicates a situation at a point at which police officer 3 faced the criminal.

Next, in an index (a time point of 01:30:34 p.m.) of a seventh row, wearable camera 10 has determined that police officer 3 said "freeze" and urged the criminal to stop on the basis of sound analysis result data. Thumbnail image SM7 is generated, for example, on the basis of a captured video at a point at which it was detected that police officer 3 urged the criminal to stop, and indicates a situation at a point at which police officer 3 faced the criminal.

Next, in an index (a time point of 01:30:40 p.m.) of an eighth row, wearable camera 10 has detected that police officer 3 was running on the basis of measured data in each of acceleration sensor AC and gyro sensor GY, and has determined that police officer 3 was running in pursuit of a criminal. Thumbnail image SM8 is generated on the basis of a captured video at a point at which it was detected that police officer 3 was running in pursuit of the criminal, and indicates a situation of pursuing the criminal.

Next, in an index (a time point of 01:31:05 p.m.) of a ninth row, wearable camera 10 has determined that police officer 3 took the gun from the holster and leveled the gun on the basis of data measured by the sensor (not illustrated) attached to the holster and data indicating motion of the arms detected by an activity meter (which will be described later) attached to the arm of police officer 3. Thumbnail image SM9 is generated, for example, on the basis of a captured video at a point at which it was detected that police officer 3 leveled the gun at the criminal, and indicates a situation at a point at which police officer 3 faced the criminal.

Next, in an index (a time point of 01:31:05 p.m.) of a tenth row, wearable camera 10 has determined that police officer 3 said "freeze" and urged the criminal to stop on the basis of sound analysis result data. Thumbnail image SM10 is generated, for example, on the basis of a captured video at a point at which it was detected that police officer 3 urged the criminal to stop, and indicates a situation at a point at which police officer 3 faced the criminal.

Finally, in an index (a time point of 01:31:07 p.m.) of an eleventh row, wearable camera 10 has determined that police officer 3 shot the gun on the basis of data regarding an analysis result of sounds (for example, a volume and a frequency) and data indicating motion of the arms detected by the activity meter (which will be described later) attached to the arm of police officer 3. Thumbnail image SM11 is generated, for example, on the basis of a captured video at a point at which it was detected that police officer 3 shot the gun, and indicates a situation at a point at which police officer 3 faced the criminal.

As mentioned above, wearable camera 10 of the present exemplary embodiment generates action index AL1 illustrated in FIG. 8 and records action index AL1 on recorder 15. Therefore, time-series behaviors (actions) detected during business of police officer 3 can be understood in detail, and, thus, for example, police officer 3 can prove justification of the behaviors to an opponent (for example, a superior officer of police officer 3, an executive of police department PD, or a third party). Particularly, in a case where a suspect or a criminal in pursuit wad dead, justification of a behavior (for example, using the gun) of police officer 3 may be required to be shown by an evidence. For example, an explanation or a report on detailed information such as a map of a field, pictures of the field, and the number of times of urging a suspect or a criminal to stop is required. Thus, it is necessary to create a report for explaining behaviors of police officer 3 in pursuit in detail and objectively. According to wearable camera 10 of the present exemplary embodiment, action index AL1 is attached as an appendix of the case report, and thus it is possible to efficiently create the case report.

Figure 9:
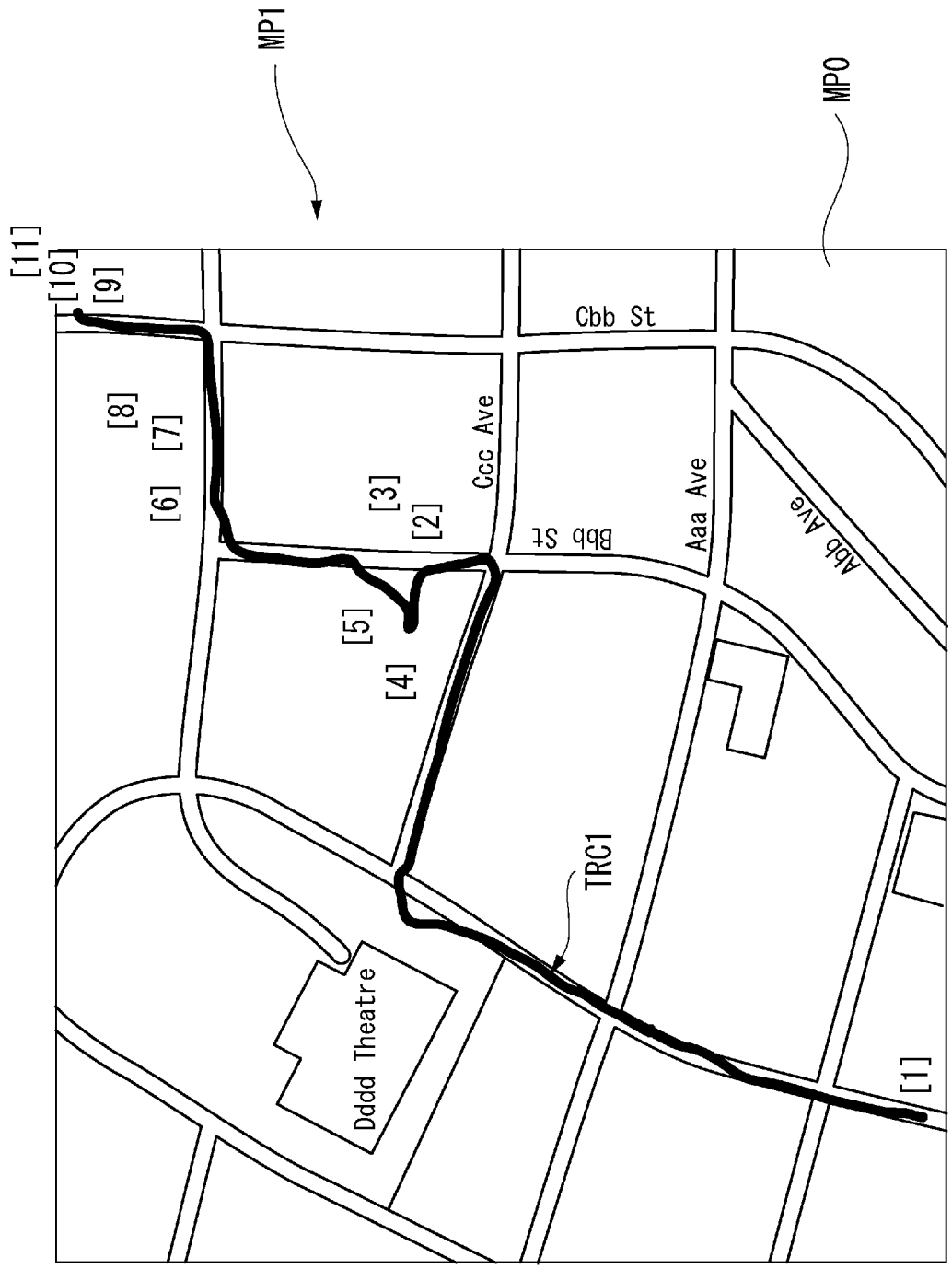
FIG. 9 is a diagram illustrating an example of an action map in which information regarding positions where actions are detected in a time series is displayed to be superimposed on map data.

FIG. 9 is a diagram illustrating an example of action map MP1 in which information regarding positions where actions are detected in a time series is displayed to be superimposed on map data MP0. Action map MP1 is generated to correspond to action index AL1 illustrated in FIG. 8.

Action map MP1 in FIG. 9 will be described in detail. [1] in action map MP1 indicates position information of wearable camera 10 corresponding to the detection time point in the index of the first row of action index AL1 in FIG. 8. Hereinafter, similarly, [2], [3], [4]. [5], [6], [7], [8], [9], [10], and [11] in action map MP1 respectively indicate position information of wearable camera 10 corresponding to the detection time points in the indexes of the second row, the third row, the fourth row, the fifth row, the sixth row, the seventh row, the eighth row, the ninth row, the tenth row, and the eleventh row of action index AL1 in FIG. 8. In action map MP1, trajectory TRC1 connecting the positions where the respective events (actions) in action index AL1 were detected is also displayed. Trajectory TRC1 is generated by action information generator 19D to which position information from GPS receptor 18 is input at any time.

According to action map MP1, wearable camera 10 can generate map data in which respective pieces of position information of when a series of behaviors (actions) of police officer 3 in a time series corresponding to action index AL1 can be intuitively understood in detail in comparison with map data MP0. Police officer 3 viewing action map MP1 can also check, for example, an escape route of a suspect or a criminal in pursuit, and can thus find the tendency in escape of the suspect or the criminal.

Figure 10:
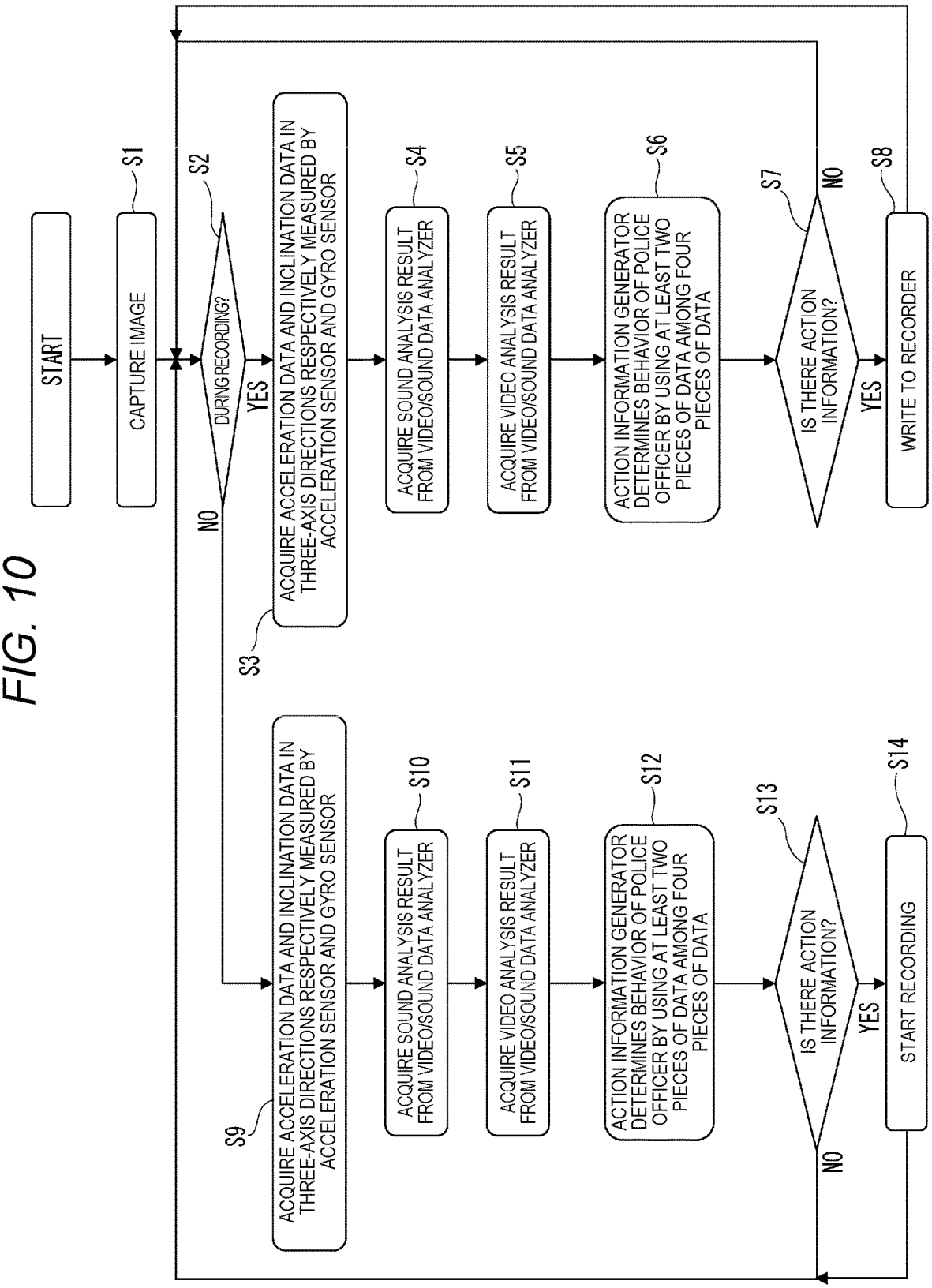
FIG. 10 is a flowchart illustrating a detailed example of an operation procedure for generation of an action index or recording of captured videos in the wearable camera of Exemplary Embodiment 1.

FIG. 10 is a flowchart illustrating a detailed example of an operation procedure for generation of action index AL1 or recording of captured videos in wearable camera 10 of Exemplary Embodiment 1. In description of FIG. 10, the same content as that of the description of FIG. 6 will be made briefly or omitted, and different content will be described. In the same manner as in FIG. 6, FIG. 10 will be described assuming that the power source of wearable camera 10 is in an ON state.

In FIG. 10, after step S1, wearable camera 10 determines whether or not data regarding captured videos obtained in step S1 is being recorded (S2). In a case where the data is not being recorded (S2: NO), the process in wearable camera 10 proceeds to step S9.

In other words, in wearable camera 10, processor 19 acquires acceleration data and inclination data in the three-axis directions of the orthogonal coordinate system measured by acceleration sensor AC and gyro sensor GY (S9).

In wearable camera 10, action information generator 19D acquires data regarding a sound analysis result delivered from video/sound data analyzer 19C (S10). In wearable camera 10, action information generator 19D acquires data regarding a video analysis result delivered from video/sound data analyzer 19C (S11). An order of the processes in steps S9 to S11 may be any order.

In wearable camera 10, action information generator 19D refers to action table Atb1 (refer to FIG. 7), and determines an action of police officer 3 by using at least two types of measured data among the four types of measured data (that is, the acceleration data and the inclination data in the three-axis directions of the orthogonal coordinate system, the sound analysis result data, and the video analysis result data) acquired in the respective processes in steps S3 to S5 (S12). Wearable camera 10 determines whether or not there is a default event (for example, an action corresponding to action information defined in action table Atb1) among behaviors of police officer 3 as a result of the determination in step S12 (S13). In a case where it is determined that there is no default event (for example, an action corresponding to action information defined in action table Atb1) among behaviors of police officer 3 (S13: NO), the process in wearable camera 10 returns to step S2.

On the other hand, in a case where it is determined that there is a default event (for example, an action corresponding to action information defined in action table Atb1) among behaviors of police officer 3 (S13: YES), wearable camera 10 starts to record captured videos obtained in step S1 on recorder 15 according to the determination in action information generator 19D (S14). After step S14, the process in wearable camera 10 returns to step S2. Consequently, for example, even in a case where police officer 3 does not independently operate recording switch SW1, or even in a case of a situation in which it is hard for police officer 3 to independently operate recording switch SW1, wearable camera 10 can prevent omission of recording of captured videos of a subject on the front side of police officer 3, and can thus appropriately store evidence videos during business of police officer 3.

As mentioned above, wearable camera 10 of the present exemplary embodiment can be worn or carried by police officer 3, records captured videos of a subject on the front side of police officer 3 on recorder 15, and acquires information (for example, acceleration data or inclination data in the three-axis directions of the orthogonal coordinate system) regarding motion of police officer 3. Wearable camera 10 determines whether or not at least one default event (for example, the actions illustrated in FIG. 5) has occurred on the basis of the information regarding motion of police officer 3 acquired (specifically, measured) during recording of captured videos of the subject. Wearable camera 10 generates event list information (for example, action index AL1) in which a detection time point of the default event is correlated with information regarding the default event according to determination that at least one default event (for example, the actions illustrated in FIG. 5) has occurred during recording of captured videos of the subject, and records the event list information on recorder 15 in correlation with the captured videos of the subject.

Consequently, even if police officer 3 does not independently reproduce and watch captured videos recorded during business of police officer 3 afterward, wearable camera 10 can determine each of various behaviors of police officer 3 performed in a time series from captured videos recorded by wearable camera 10 and can record the determined behaviors as information. Therefore, police officer 3 attaches, for example, action index AL1 to an appendix material of a case report in which details of behaviors of police officer 3 performed in a time series during business are collected, and can thus considerably reduce creation man-hours of the case report. In other words, wearable camera 10 can record action index AL1 and can thus efficiently support business of police officer 3.

Wearable camera 10 generates a thumbnail image corresponding to a detection time point of at least one default event (for example, the actions illustrated in FIG. 5) by using a captured video of a subject, and records action index AL1 including the generated thumbnail image on recorder 15. Consequently, wearable camera 10 enables a person viewing a screen on which action index AL1 is output and displayed to accurately understand general situations of a subject at detection time points of behaviors (actions) of police officer 3 in a time series.

Wearable camera 10 acquires position information of the wearable camera in GPS receptor 18. Wearable camera 10 acquires position information of wearable camera 10 corresponding to a detection time point of at least one default event, generates action map MP1 (event map information) in which the acquired position information is superimposed on map data MP0, and records action map MP1 on recorder 15. Consequently, wearable camera 10 can generate map data in which respective pieces of position information of when a series of behaviors (actions) of police officer 3 in a time series corresponding to action index AL1 can be intuitively understood in detail in comparison with map data MP0.

Wearable camera 10 collects sounds around police officer 3 in microphone 29A. Wearable camera 10 determines whether or not at least one default event occurred on the basis of information (for example, acceleration data or inclination data in the three-axis directions of the orthogonal coordinate system) regarding motion of police officer 3 acquired (specifically, measured) during recording of captured videos of a subject and sounds collected by microphone 29A. Consequently, wearable camera 10 can accurately detect a behavior (a behavior of urging a suspect or a criminal in pursuit to stop) which is hard to detect on the basis of only information regarding motion of police officer 3, and can thus leave (store) a justifiable behavior as action index AL1.

Next, a description will be made of an example in which action index AL1 is generated on the basis of cooperation between wearable camera 10 and back end server 50.

Figure 11:
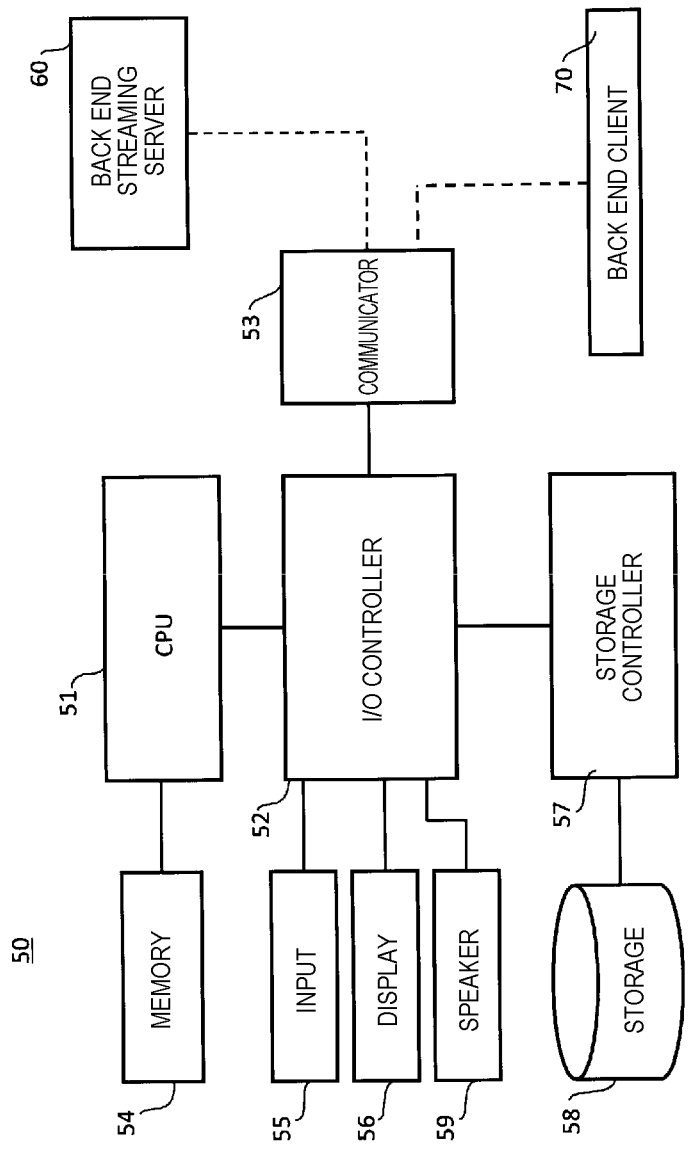
FIG. 11 is a block diagram illustrating a detailed example of an internal configuration of a back end server of Exemplary Embodiment 1.

FIG. 11 is a block diagram illustrating a detailed example of an internal configuration of back end server 50 of Exemplary Embodiment 1. Back end server 50 (server apparatus) includes CPU 51, I/O controller 52, communicator 53, memory 54, input 55, display 56, speaker 59, storage controller 57, and storage 58.

CPU 51 functions as a controller of back end server 50, performs a control process of integrating operations of the respective constituent elements of back end server 50 as a whole, a process of transmitting and receiving data to and from the respective constituent elements of back end server 50, a data calculation (computation) process, and a data storage process. CPU 51 is operated according to a program and data stored in memory 54. CPU 51 uses memory 54 during an operation thereof. Although not illustrated in FIG. 11, CPU 51 includes the same configuration as action information generator 19D of processor 19 illustrated in FIG. 4. In other words, CPU 51 can perform the same operation as that of action information generator 19D.

I/O controller 52 performs control on input and output of data between CPU 51 and the respective constituent elements (for example, communicator 53, input 55, display 56, and storage controller 57) of back end server 50, and relays data from CPU 51 and data to CPU 51. I/O controller 52 may be formed integrally with CPU 51.

Communicator 53 performs wired or wireless communication with, for example, in-car recorder 33, in-car PC 32, smart phone 40, wearable camera 10 which can be worn or held by police officer 3, back end streaming server 60, or back end clients 70a and 70b.

Memory 54 is formed by using, for example, a RAM, a ROM, and a nonvolatile or volatile semiconductor memory, functions as a work memory during an operation of CPU 51, and stores a predetermined program and data for operating CPU 51. The same data of action table Atb1 as action table Atb1 (refer to FIG. 7) stored in memory 13 or recorder 15 of wearable camera 10 is recorded on memory 54.

Input 55 is a user interface (UI) which receives an input operation performed by police officer 3 or a person in charge in police department PD, and notifies CPU 51 of the input operation via I/O controller 52, and is a pointing device such as a mouse or a keyboard. Input 55 may be formed by using a touch panel or a touch pad which is disposed to correspond to, for example, a screen of display 56, and in which an operation can be performed with the finger of a person in charge or a stylus pen. Back end server 50 may be operated from back end clients 70a and 70b connected thereto via a network in police department PD.

Display 56 (monitor) is formed by using, for example, a liquid crystal display (LCD) or an organic EL display, and displays various pieces of information. For example, in a case where videos captured or recorded by wearable camera 10 are input according to an input operation performed by police officer 3 or a person in charge, display 56 displays the videos on a screen under an instruction of CPU 51. For example, in a case where videos captured or recorded by in-car cameras 31 are input according to an input operation performed by police officer 3 or a person in charge, display 56 displays the videos on a screen under an instruction of CPU 51. In a case where an operation is performed from back end clients 70a and 70b connected to display 56 via the network in police department PD, various pieces of information are displayed on back end clients 70a and 70b.

For example, in a case where sounds collected by wearable camera 10 are input according to an input operation performed by police officer 3 or a person in charge, speaker 59 outputs the sounds under an instruction of CPU 51. In a case where an operation is performed from back end clients 70a and 70b connected to speaker 59 via the network in police department PD, sounds are output to speakers connected to back end clients 70a and 70b.

In a case where CPU 51 requests back end streaming server 60 to transmit accumulated captured video data, storage controller 57 controls an operation of storing received video data in storage 58 in response to the request. Storage 58 is a storage device such as a solid state drive (SSD) or a hard disk drive (HDD) controlled by storage controller 57, and accumulates captured video data transmitted from wearable camera 10 via I/O controller 52 in response to an instruction from CPU 51.

Figure 12:
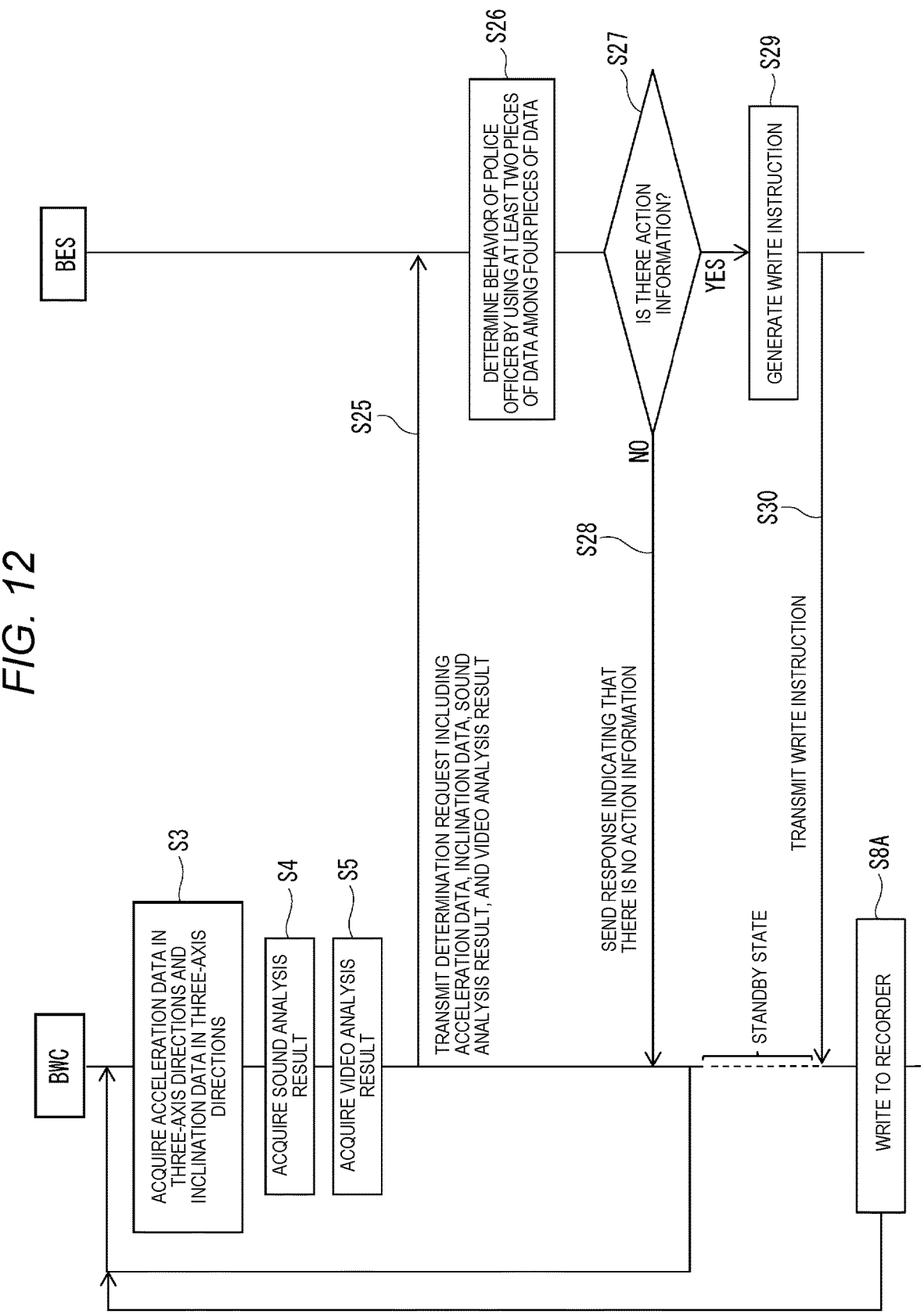
FIG. 12 is a sequence diagram illustrating a detailed example of an action index generation operation procedure, based on cooperation between the wearable camera and the back end server of Exemplary Embodiment 1.

FIG. 12 is a sequence drawing illustrating a detailed example of a generation operation procedure for action index ALL based on cooperation between wearable camera 10 and back end server 50 in Exemplary Embodiment 1. In description of FIG. 12, the same content as that of the description of FIG. 6 will be made briefly or omitted, and different content will be described. FIG. 12 will be described assuming that wearable camera 10 and back end server 50 are connected to each other so as to perform communication via a wireless LAN.

In FIG. 12, after step S5, wearable camera 10 transmits a determination request including the four types of measured data (that is, the acceleration data and the inclination data in the three-axis directions of the orthogonal coordinate system, the sound analysis result data, and the video analysis result data) acquired in the respective processes in steps S3 to S5, to back end server 50 (S25).

In step S25, back end server 50 receives the determination request including the four types of measured data (that is, the acceleration data and the inclination data in the three-axis directions of the orthogonal coordinate system, the sound analysis result data, and the video analysis result data) transmitted from wearable camera 10. In back end server 50, CPU 51 refers to action table Atb1 (refer to FIG. 7) recorded on memory 54, and determines an action of police officer 3 by using at least two types of measured data among the four types of measured data (that is, the acceleration data and the inclination data in the three-axis directions of the orthogonal coordinate system, the sound analysis result data, and the video analysis result data) received in step S25 (S26).

Back end server 50 determines whether or not there is a default event (for example, an action corresponding to action information defined in action table Atb1) among behaviors of police officer 3 as a result of the determination in step S26 (S27). In a case where it is determined that there is no default event (for example, an action corresponding to action information defined in action table Atb1) among behaviors of police officer 3 (S27: NO), back end server 50 transmits a response indicating that there is no action information defined in action table Atb1 to wearable camera 10 (S28). In a case where the response transmitted from back end server 50 is received in step S28, wearable camera 10 performs the processes from step S3 again. In other words, wearable camera 10 is in a waiting state until a write instruction is received from back end server 50 in step S30 which will be described later, and repeatedly performs the processes from step S3.

On the other hand, in a case where it is determined that there is a default event (for example, an action corresponding to action information defined in action table Atb1) among behaviors of police officer 3 (S27: YES), back end server 50 generates a write instruction for writing action index AL1 in which a detection time point of the default event is correlated with information regarding the default event according to the determination in CPU 51 (S29). Back end server 50 transmits the write instruction generated in step S29 to wearable camera 10 (S30). In a case where the write instruction transmitted from back end server 50 in step S30 is received, wearable camera 10 generates action index AL1 in which a detection time point of the default event detected by back end server 50 is correlated with information regarding the default event on the basis of the write instruction, and records action index AL1 on recorder 15 (S8A). After step S8A, the process in wearable camera 10 returns to step S3, and the processes from step S3 are repeatedly performed.

As mentioned above, according to cooperation between wearable camera 10 and back end server 50 in wearable camera system 1000 of the present exemplary embodiment, wearable camera 10 records captured videos of a subject on the front side of police officer 3 on recorder 15, acquires information regarding motion of police officer 3 during recording of the captured videos of the subject, and transmits the acquired information regarding motion of police officer 3 to back end server 50. Back end server 50 receives the information regarding motion of police officer 3 transmitted from wearable camera 10, and determines whether or not at least one default event has occurred on the basis of the received information regarding motion of police officer 3. Back end server 50 transmits a write instruction (generation instruction) for action index AL1 in which a detection time point of the default event is correlated with information regarding the default event to the wearable camera 10 according to determination that at least one default event has occurred. Wearable camera 10 receives the write instruction for action index AL1 transmitted from back end server 50, generates action index AL1 in response to the write instruction, and records action index AL1 on recorder 15 in correlation with the captured videos of the subject.

Consequently, in wearable camera system 1000, even if police officer 3 does not independently reproduce and watch captured videos recorded during business of police officer 3 afterward, back end server 50 can highly accurately determine each of various behaviors of police officer 3 performed in a time series from captured videos recorded by wearable camera 10 and can record the determined behaviors in wearable camera 10 as information. Therefore, police officer 3 attaches, for example, action index AL1 to an appendix material of a case report in which details of behaviors of police officer 3 performed in a time series during business are collected, and can thus considerably reduce creation man-hours of the case report. In other words, wearable camera 10 can record action index AL1 and can thus efficiently support business of police officer 3. Back end server 50 determines a behavior of police officer 3 by using at least two types of measured data among the four types of measured data (that is, the acceleration data and the inclination data in the three-axis directions of the orthogonal coordinate system, the sound analysis result data, and the video analysis result data). Therefore, the configuration of action information generator 19D can be omitted in processor 19 of wearable camera 10, so that a configuration of wearable camera 10 can be simplified, and thus an increase in cost can be suppressed.

In wearable camera system 1000, wearable camera 10 may transmit captured videos recorded on recorder 15 and action index AL1 correlated with each other to back end server 50. Back end server 50 receives the captured videos recorded on recorder 15 and action index AL1 transmitted from wearable camera 10, and records the captured videos recorded on recorder 15 and action index AL1 on storage 58 (second recorder) in correlation with each other. Consequently, in wearable camera system 1000, action index AL1 generated by wearable camera 10 can be stored in back end server 50, and action index AL1 generated by wearable camera 10 can be backed up. Since back end server 50 can register (accumulate) action index AL1 in correlation with identification information of wearable camera 10, a person in police department PD can integrally manage action index AL1 for each wearable camera 10 or action index AL1 stored in storage 58, and can thus provide a function of retrieving a captured video related to a behavior (action) of police officer 3 which will be described later.

Next, a description will be made of an example in which action index AL1 is generated on the basis of cooperation between wearable camera 10 and activity meter 200 as an external sensor. Activity meter 200 is attached to a part of the body of police officer 3 (user) and is used, and acquires information regarding an activity amount of police officer 3. The information regarding an activity amount of police officer 3 is, for example, biological information typified by information regarding motion of police officer 3, a body temperature, and a heart rate.

Figure 13A:
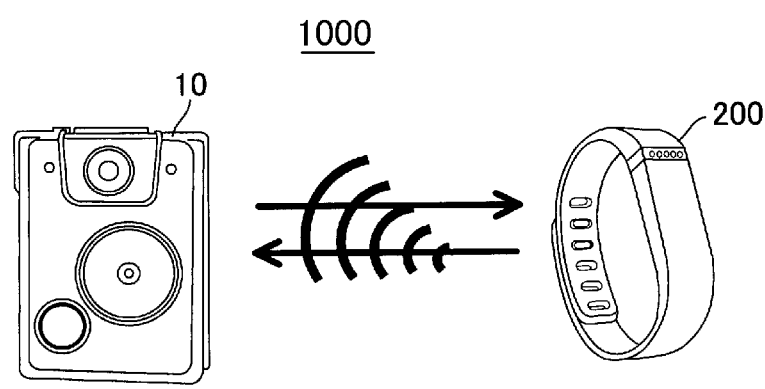
FIG. 13A is a diagram illustrating an example in which the wearable camera and an activity meter directly perform short-range radio communication with each other in the wearable camera system.
Figure 13B:
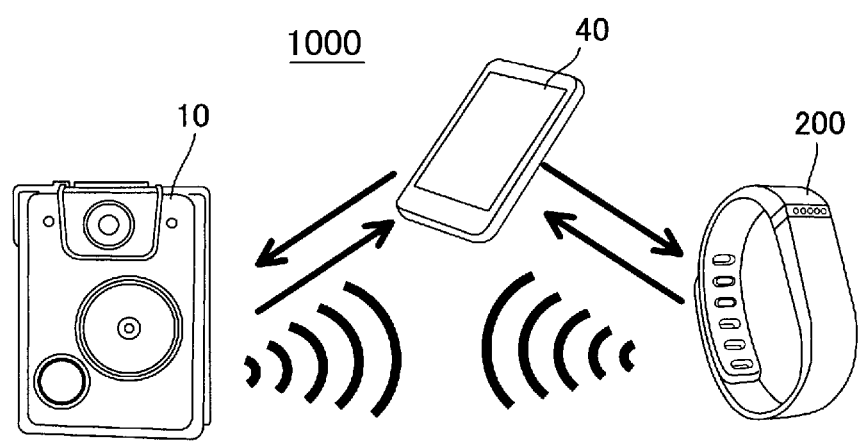
FIG. 13B is a diagram illustrating an example in which the wearable camera and the activity meter perform short-range radio communication with each other via a smart phone in the wearable camera system.

FIG. 13A is a diagram illustrating an example in which wearable camera 10 and activity meter 200 perform direct short-range radio communication with each other in wearable camera system 1000. FIG. 13B is a diagram illustrating an example in which wearable camera 10 and activity meter 200 perform short-range radio communication with each other via smart phone 40 in wearable camera system 1000.

Wearable camera system 1000 in FIG. 13A is configured to include wearable camera 10 and activity meter 200. Activity meter 200 includes sensors acquiring various pieces of information (activity amount information) regarding human activities such as motion, a heart rate, a perspiration, a body temperature, and the like of police officer 3. Activity meter 200 is mounted on, for example, a user's wrist, and measures an activity amount. Details of activity meter 200 will be described later. Wearable camera 10 and activity meter 200 perform communication with each other, and transmit and receive information acquired in activity meter 200. Communication between wearable camera 10 and activity meter 200 may employ, for example, either one of BLE communication and wireless LAN communication.

Wearable camera system 1000 in FIG. 13B is configured to include wearable camera 10, activity meter 200, and smart phone 40. Smart phone 40 can perform communication with wearable camera 10 and activity meter 200, and wearable camera 10 and activity meter 200 perform communication with each other via smart phone 40, and transmit and receive information acquired in activity meter 200. Communication between wearable camera 10, smart phone 40, and activity meter 200 may employ, for example, either one of BLE communication and wireless LAN communication.

Figure 14:
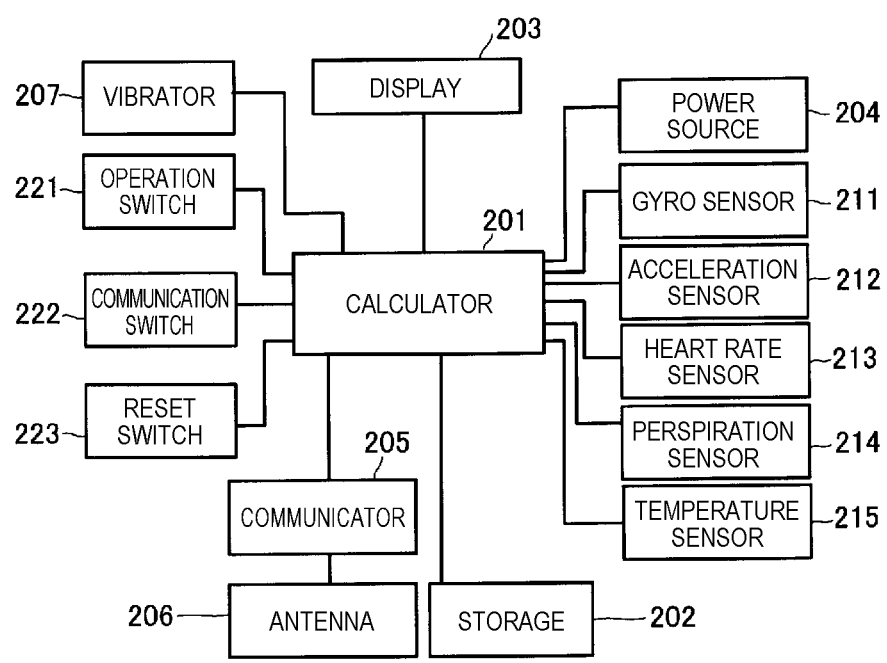
FIG. 14 is a block diagram illustrating a detailed example of an internal configuration of the activity meter.

FIG. 14 is a block diagram illustrating a detailed example of an internal configuration of activity meter 200. Activity meter 200 includes calculator 201, storage 202, display 203, power source 204, communicator 205, antenna 206, and vibrator 207. Activity meter 200 includes gyro sensor 211, acceleration sensor 212, heart rate sensor 213, perspiration sensor 214, and temperature sensor 215 as external sensors measuring an activity amount of police officer 3. Activity meter 200 may include at least one of the above-described various sensors. Activity meter 200 includes operation switch 221, communication switch 222, and reset switch 223.

Calculator 201 has a processing device such as a microprocessor, and performs a calculation process of a measured value on the basis of an output signal indicating a predetermined physical quantity, output from a sensor. Calculator 201 calculates an activity amount such as a default action, a heart rate, a perspiration, or a body temperature of police officer 3 (user) on the basis of the measured value acquired from the sensor. Storage 202 is formed of, for example, a semiconductor memory such as a flash ROM, and stores a program for operating calculator 201, and acquired data such as a measured value or an activity amount. Display 203 is formed of, for example, a display device such as an LED or an LCD, and displays an operation state of activity meter 200, an acquired activity amount, and the like with brightness and darkness of light, text, images, and the like. Power source 204 is formed of, for example, a rechargeable secondary battery, and supplies source power to the respective constituent elements of activity meter 200.

Communicator 205 includes, for example, a communication circuit performing wireless communication such as BLE communication, and transmits and receives information regarding an activity amount to and from wearable camera 10 or wearable camera 10 and smart phone 40. Antenna 206 transmits and receives radio signals during communication using communicator 205. Vibrator 207 vibrates at a predetermined timing on the basis of an instruction from calculator 201, and sends a notification to police officer 3 (user).

Gyro sensor 211 measures angular velocities in the three-axis directions of the orthogonal coordinate system of activity meter 200. Acceleration sensor 212 measures accelerations in the three-axis directions of the orthogonal coordinate system of activity meter 200. Calculator 201 calculates activity amount information regarding an action of a user (for example, police officer 3) wearing activity meter 200 on the basis of outputs from gyro sensor 211 and acceleration sensor 212. Heart rate sensor 213 has, for example, a light emitting element and a light receiving element, and measures a heart rate of a user (for example, police officer 3) wearing activity meter 200 by irradiating blood vessels in a human body with light, receiving reflected light thereof, and measuring pulses on the basis of a change in an amount of received light. Calculator 201 calculates activity amount information regarding a heart rate on the basis of outputs from heart rate sensor 213. Perspiration sensor 214 measures a perspiration of a user (for example, police officer 3) wearing activity meter 200, for example, on the basis of humidity or the like around a skin. Calculator 201 calculates activity amount information regarding a perspiration such as the presence or absence of a perspiration or a perspiration amount on the basis of outputs from heart rate sensor 213. Temperature sensor 215 measures a body temperature of a user (for example, police officer 3) wearing activity meter 200. Calculator 201 calculates activity amount information regarding a body temperature such as a body temperature increase.

Operation switch 221 is, for example, a pressing type button switch for inputting an operation instruction such as switching of the display content of activity meter 200 and switching of an operation mode. Communication switch 222 is, for example, a pressing type button switch for inputting a communication instruction such as communication starting or communication stopping. Reset switch 223 is, for example, a pressing type button switch for inputting a reset instruction in order to reset an acquired measured in activity meter 200 or to reset various settings of activity meter 200.

FIG. 15 is a diagram illustrating an example of another action table Atb2 regarding detected actions. In the same manner as in action table Atb0 illustrated in FIG. 5, in action table Atb2, for example, the content of each default event (for example, an action) stored in memory 13 or recorder 15 is correlated with a sensor used for detection of each default event (for example, an action), or a detection condition. In FIG. 15, "extreme tension", "increase/decrease in a heart rate", a "perspiration", and a "body temperature" which can be detected in relation to measured data in activity meter 200 are added to the content of action table Atb0 illustrated in FIG. 5. The same content as that of the description of FIG. 5 will be omitted, and different content will be described.

For example, in a case where it is detected whether or not police officer 3 is in a state of extreme tension as an action, one or both of pieces of data measured by heart rate sensor 213 and perspiration sensor 214 of activity meter 200 are referred to.

For example, in a case where it is detected whether or not a heart rate of police officer 3 increases or decreases as an action, data measured by heart rate sensor 213 of activity meter 200 is referred to.

For example, in a case where it is detected whether or not police officer 3 perspires as an action, data measured by perspiration sensor 214 of activity meter 200 is referred to.

For example, in a case where it is detected whether or not a body temperature of police officer 3 increases or decreases as an action, data measured by temperature sensor 215 of activity meter 200 is referred to.

FIG. 16 is a flowchart illustrating another detailed example of a generation operation procedure for action index AL1 in wearable camera 10 of Exemplary Embodiment 1. In description of FIG. 16, the same content as that of the description of FIG. 6 will be made briefly or omitted, and different content will be described. FIG. 16 will be described assuming that the power sources of wearable camera 10 and activity meter 200 are in an ON state.

In FIG. 16, after step S5, wearable camera 10 receives and acquires measured data transmitted from activity meter 200 attached to a part of the body of police officer 3 (user) (S5A). An order of the processes in steps S3 to S5 and S5A may be any order. In wearable camera 10, after step S5A, action information generator 19D refers to action table Atb1 (refer to FIG. 7), and determines an action of police officer 3 by using at least two types of measured data among the five types of measured data (that is, the acceleration data and the inclination data in the three-axis directions of the orthogonal coordinate system, the sound analysis result data, the video analysis result data, and the measured data in activity meter 200) acquired in the respective processes in steps S3 to S5 and S5A (S6A). The processes from step S6A are the same as those in FIG. 6, and thus description thereof will be omitted.

Figure 17:
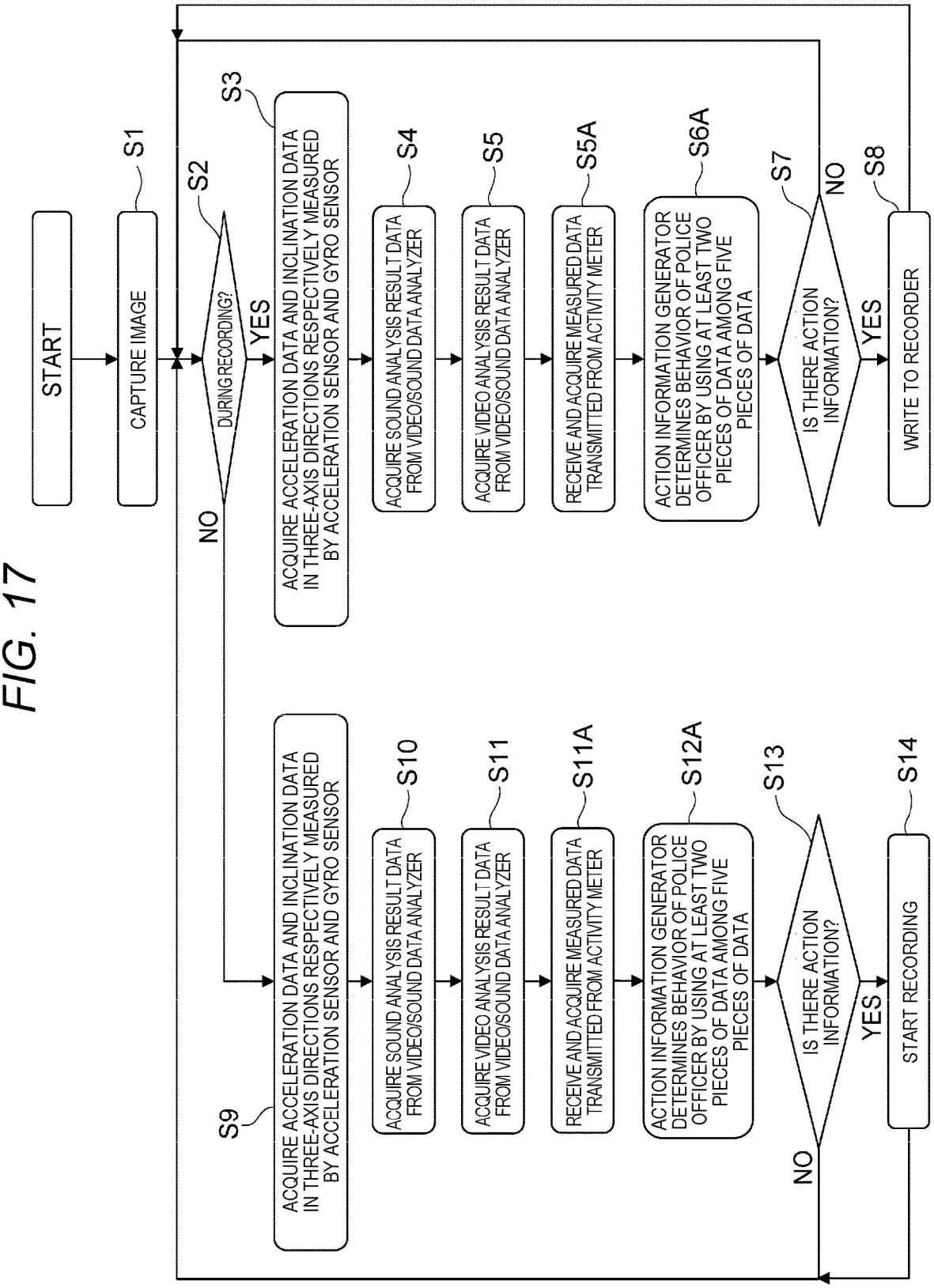
FIG. 17 is a flowchart illustrating another detailed example of generation or an action index or recording of a captured video in the wearable camera of Exemplary Embodiment 1.

FIG. 17 is a flowchart illustrating another detailed example of an operation procedure for generation of action index AL1 or recording of captured videos in wearable camera 10 of Exemplary Embodiment 1. In description of FIG. 17, the same content as that of the description of FIG. 10 will be made briefly or omitted, and different content will be described. In the same manner as in FIG. 10, FIG. 17 will be described assuming that the power sources of wearable camera 10 and activity meter 200 are in an ON state.

In FIG. 17, after step S5, wearable camera 10 receives and acquires measured data transmitted from activity meter 200 attached to a part of the body of police officer 3 (user) (S5A). An order of the processes in steps S3 to S5 and S5A may be any order. In wearable camera 10, after step S5A, action information generator 19D refers to action table Atb1 (refer to FIG. 7), and determines an action of police officer 3 by using at least two types of measured data among the five types of measured data (that is, the acceleration data and the inclination data in the three-axis directions of the orthogonal coordinate system, the sound analysis result data, the video analysis result data, and the measured data in activity meter 200) acquired in the respective processes in steps S3 to S5 and S5A (S6A). The processes from step S6A are the same as those in FIG. 10, and thus description thereof will be omitted.

After step S11, wearable camera 10 receives and acquires measured data transmitted from activity meter 200 attached to a part of the body of police officer 3 (user) (S11A). An order of the processes in steps S9 to S11 and S11A may be any order. In wearable camera 10, after step S11A, action information generator 19D refers to action table Atb1 (refer to FIG. 7), and determines an action of police officer 3 by using at least two types of measured data among the five types of measured data (that is, the acceleration data and the inclination data in the three-axis directions of the orthogonal coordinate system, the sound analysis result data, the video analysis result data, and the measured data in activity meter 200) acquired in the respective processes in steps S9 to S11 and S11A (S12A). The processes from step S12A are the same as those in FIG. 10, and thus description thereof will be omitted.

Consequently, for example, even in a case where police officer 3 does not independently operate recording switch SW1, or even in a case of a situation in which it is hard for police officer 3 to independently operate recording switch SW1, wearable camera 10 can prevent omission of recording of captured videos of a subject on the front side of police officer 3 by taking into consideration measured data in activity meter 200, and can thus appropriately store evidence videos during business of police officer 3.

As mentioned above, in wearable camera 10 of the present exemplary embodiment, BLE communicator 21A or WLAN communicator 21B performs communication with activity meter 200 (external sensor) acquiring information regarding an activity amount of police officer 3 (user). Wearable camera 10 determines whether or not at least one default event has occurred on the basis of the information regarding motion of police officer 3 acquired (specifically, measured) during recording of captured videos of a subject and information regarding an activity amount of police officer 3 received from activity meter 200.

Consequently, wearable camera 10 can accurately determine the presence or absence of a symptom indicating a certain abnormal change in the body of police officer 3 in addition to actions of police officer 3 performed during business, and can thus generate action index AL1 finely indicating behaviors of police officer 3 performed in a time series or generated symptoms during business.

Next, a description will be made of an operation example after action index AL1 and captured videos generated by different wearable cameras 10 are recorded on back end server 50 of police department PD for backup. Here, a case is assumed in which, for example, a professional in police department PD who is different from police officer 3 who has been to a case field checks an evidence video attached to documents submitted to an institution such as a court or a public prosecutor's office, the professional retrieves and watches videos related to necessary behaviors during business of police officer 3. However, an operation example is not limited to the above-described assumed example.

Figure 18:
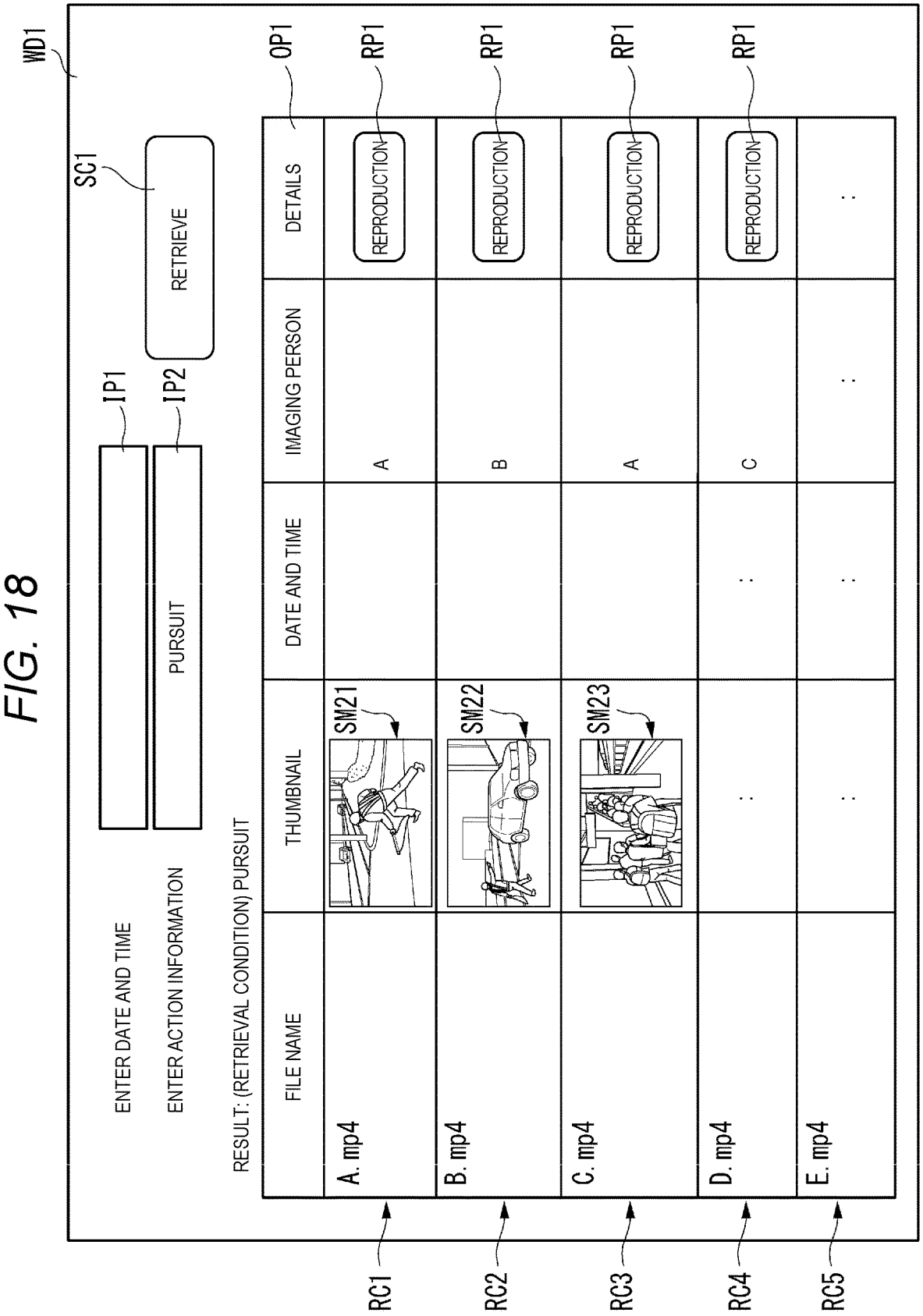
FIG. 18 is a diagram illustrating an example of a retrieval result screen displaying an entry field for an action information retrieval condition and a retrieval result.

FIG. 18 is a diagram illustrating an example of retrieval result screen WD1 displaying an entry field for an action information retrieval condition and a retrieval result. Retrieval result screen WD1 illustrated in FIG. 18 is an example of a screen displayed on display 56 as a processing result in a dedicated application (for example, a retrieval application (specifically, CPU 51) for action index AL1) which is installed in advance to be executable in back end server 50.

Retrieval result screen WD1 illustrated in FIG. 18 includes date and time entry field IP1, action information entry field IP2, retrieval button SC1, and retrieval result list OP1. The date and time which is a retrieval target is entered into date and time entry field IP1 through an operation performed by a user (for example, the above-described professional) in the retrieval application for action index AL1. Action information which is a retrieval target is entered into action information entry field IP2 through an operation performed by a user (for example, the above-described professional) in the retrieval application for action index AL1. In the example illustrated in FIG. 18, "pursuit" is entered as action information. In other words, action index AL1 is retrieved in which it is determined (detected) that police officer 3 wearing or holding wearable camera 10 has performed "pursuit" as a behavior during business. In a case where retrieval button SC1 is pressed, the retrieval application (specifically, CPU 51) for action index AL1 refers to storage 58 on which action index AL1 and captured video data are recorded in correlation with each other, and retrieves action index AL1 in which it is determined (detected) that police officer 3 wearing or holding wearable camera 10 has performed "pursuit" as a behavior during business.

For example, extracted records RC1, RC2, RC3, RC4, and RC5 of five action indexes are displayed in retrieval result list OP1. In each of records RC1 to RC5, a file name of captured video data, a thumbnail image, the date and time (not illustrated in FIG. 18), information regarding an imaging person (that is, a police officer wearing or holding wearable camera 10), and a reproduction button for the captured video data are correlated with each other. In a case where there is a retrieval target action or symptom (refer to FIG. 15) in captured videos corresponding to a file name, a thumbnail image is an image (for example, a still image, or a moving image in an animation form) generated on the basis of a captured video of when the action or the symptom was detected. In a case where there is no retrieval target action or symptom (refer to FIG. 15) in captured videos corresponding to a file name, a thumbnail image is, for example, a thumbnail image generated on the basis of a captured video at a point at which an action or a symptom was initially detected.

According to record RC1 of retrieval result list OP1, in captured video data with the file name "A.mp4", thumbnail image SM21 at a point at which the behavior "pursuit" was detected is displayed, and it can be seen that a wearer (police officer) of wearable camera 10 at that time is A.

Similarly, according to record RC2 of retrieval result list OP1, in captured video data with the file name "B.mp4", thumbnail image SM22 at a point at which the behavior "pursuit" was detected is displayed, and it can be seen that a wearer (police officer) of wearable camera 10 at that time is B.

Similarly, according to record RC3 of retrieval result list OP1, in captured video data with the file name "c.mp4", thumbnail image SM23 at a point at which the behavior "pursuit" was detected is displayed, and it can be seen that a wearer (police officer) of wearable camera 10 at that time is A.

Figure 19:
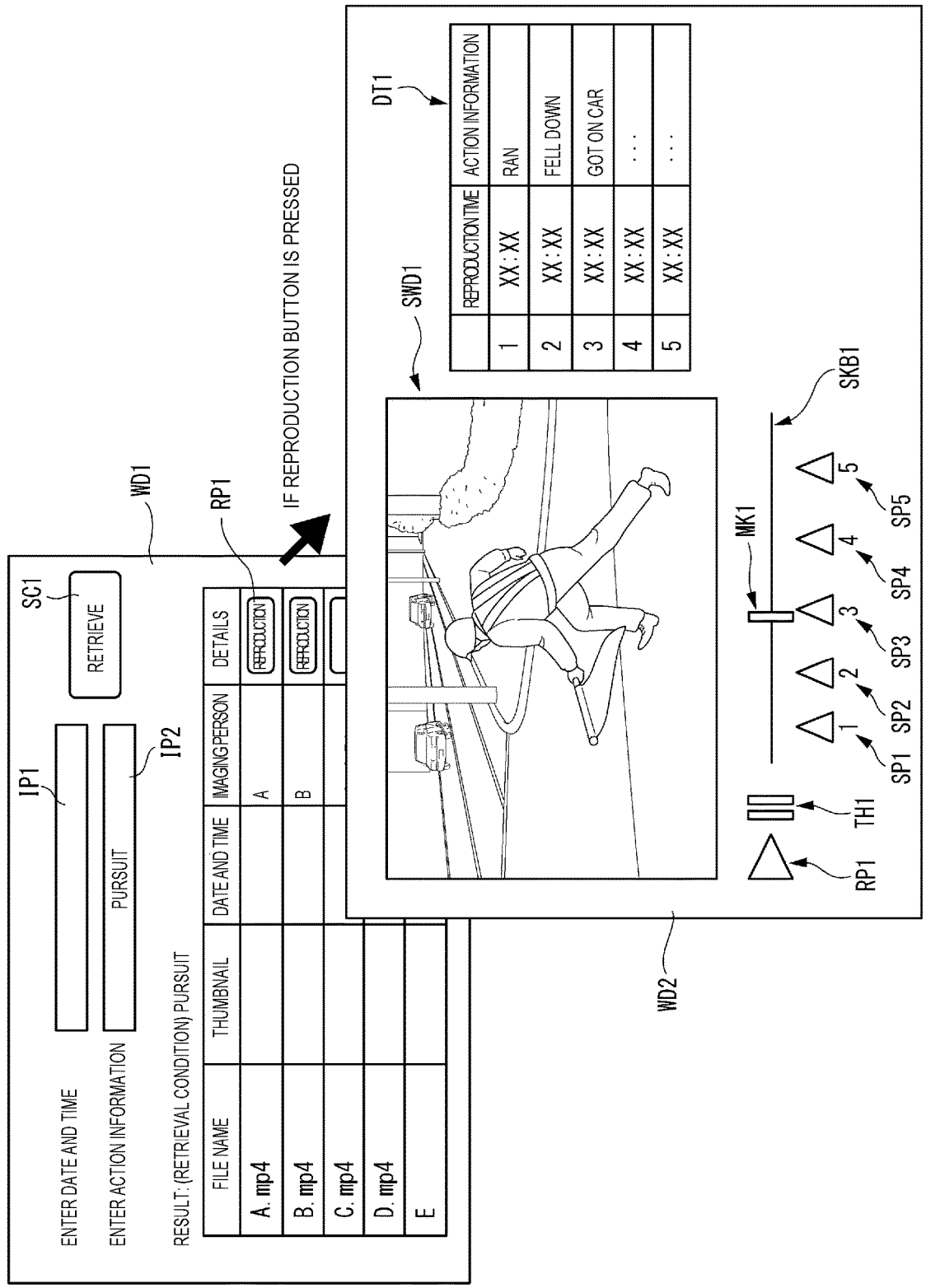
FIG. 19 is an explanatory diagram illustrating an example in which a watching screen for a captured video is displayed on the basis of pressing of a reproduction button corresponding to a certain record.

FIG. 19 is an explanatory diagram illustrating an example in which watching screen WD2 for a captured video is displayed on the basis of pressing of reproduction button RP1 corresponding to a certain record. Watching screen WD2 illustrated in FIG. 19 is displayed on display 56 by the retrieval application (specifically, CPU 51) for action index AL1 as a result of pressing reproduction button RP1 corresponding to a certain record (for example, record RC1) in retrieval result screen WD1 illustrated in FIG. 18.

Watching screen WD2 illustrated in FIG. 19 includes watching region SWD1, reproduction button RP2, pause button TH1, seek bar SKB1, marker MK1, and one or more detection markers (a total of five detection markers SP1, SP2, SP3, SP4, and SP5 in the example illustrated in FIG. 19). Moving images of a pressing target captured video are reproduced in watching region SWD1 by a dedicated application (for example, a watching application (specifically, CPU 51) for a video or the like) installed in advance in back end server 50 on the basis of pressing of reproduction button RP1 in retrieval result screen WD1. Reproduction button RP2 is used to control reproduction of moving images in watching region SWD1 in the watching application. Pause button TH1 is used to control pause of reproduction of moving images in watching region SWD1 in the watching application. Seek bar SKB1 indicates a reproduction situation of moving images in watching region SWD1. Marker MK1 indicates a reproduction point of moving images in watching region SWD1. Detection markers SP1 to SP5 indicate points at which an action or a symptom (refer to FIG. 15) was detected in a recording period of captured videos corresponding to the moving images.

Watching screen WD2 illustrated in FIG. 19 includes correlation table DT1 in which a reproduction time (reproduction time point) corresponding to each detection time point of actions or symptoms (refer to FIG. 15) detected in a period in which captured videos in watching region SWD1 were recorded by wearable camera 10 is correlated with each piece of action information. In the following description, a correlation table (for example, correlation table DT1) is assumed to be generated by back end server 50 or back end clients 70 on the basis of action index AL1 (event list information) generated by wearable camera 10, and is an example of the event list information in the same manner as action index AL1. Consequently, a user (for example, the above-described professional) viewing watching screen WD2 can easily and directly grasp a captured video of when an action or a symptom which the user is concerned about was detected in watching region SWD1 in addition to an action or a symptom (refer to FIG. 15) desired to be checked by the user, and thus it is possible to considerably increase work efficiency of a professional.

As mentioned above, in wearable camera system 1000 of the present exemplary embodiment, back end server 50 extracts at least one captured video in which a default event which is a retrieval operation target is detected from storage 58 (second recorder) in response to a retrieval operation for information regarding a default event (for example, an action or a symptom), and displays retrieval result screen WD1 on which thumbnail images SM21, SM22 and SM23 corresponding to the extracted captured videos are displayed, on display 56. Consequently, a user of back end server 50 can easily grasp general situations in which an action or a symptom desired to be examined by the user was detected using the thumbnail image, and thus it is possible to improve work efficiency of the user.

Back end server 50 displays retrieval result screen WD1 including reproduction button RP1 for at least one extracted captured video on display 56, and displays watching screen WD2 for a captured video which is a designation operation target on display 56 in response to a designation operation using reproduction button RP1. Consequently, a user of back end server 50 can easily watch the whole content of captured videos of which details are desired to be checked by the user on watching screen WD2 on the basis of, for example, thumbnail images, and thus it is possible to improve convenience.

Back end server 50 displays watching screen WD2 including detection markers SP1, SP2, SP3, SP4 and SP5 (second reproduction buttons) corresponding to a reproduction button (second reproduction button) for a captured video corresponding to a detection time point of at least one event (for example, an action or a symptom) detected from a captured video which is a designation operation target, on display 56. In a case where it is detected that any detection marker (for example, detection marker SP1) has been designated, and reproduction button RP1 has been pressed, back end server 50 reads and reproduces captured video data at a time point (in other words, a time point at which action information "ran" in correlation table DT1 was detected) of designated detection marker SP1. Consequently, a user of back end server 50 can easily switch to and watch moving images regarding an action or a system detected from moving images reproduced in watching screen WD2, and can thus smoothly perform work of checking, for example, an action index and a moving image.

Modification Example of Exemplary Embodiment 1

Next, as a modification example of Exemplary Embodiment 1, a description will be made of an example in which action table Atb1*a* recorded on back end server 50 is updated on the basis of a rewriting operation performed by a user of back end client 70*a* (which may also be back end client 70*b*), and thus back end server 50 learns measured data used for detection of an action or a symptom which is a target of the rewriting operation.

Since a configuration of a wearable camera system of the modification example of Exemplary Embodiment 1 is the same as the configuration of wearable camera system 1000 of Exemplary Embodiment 1, description of the same content will be omitted by referring to the same reference numeral, and different from content will be described.

FIG. 20 is an explanatory diagram illustrating an example in which learning of measured data is started on the basis of rewriting of an action information name in action table Atb1*a*. In FIG. 20, action table Atb1*a* is an action table recorded on storage 58 before a rewriting operation performed by a user of back end client 70*a*. Action table Atb1*b* is an action table recorded on storage 58 after a rewriting operation performed by the user of back end client 70*a*.

Figure 21:
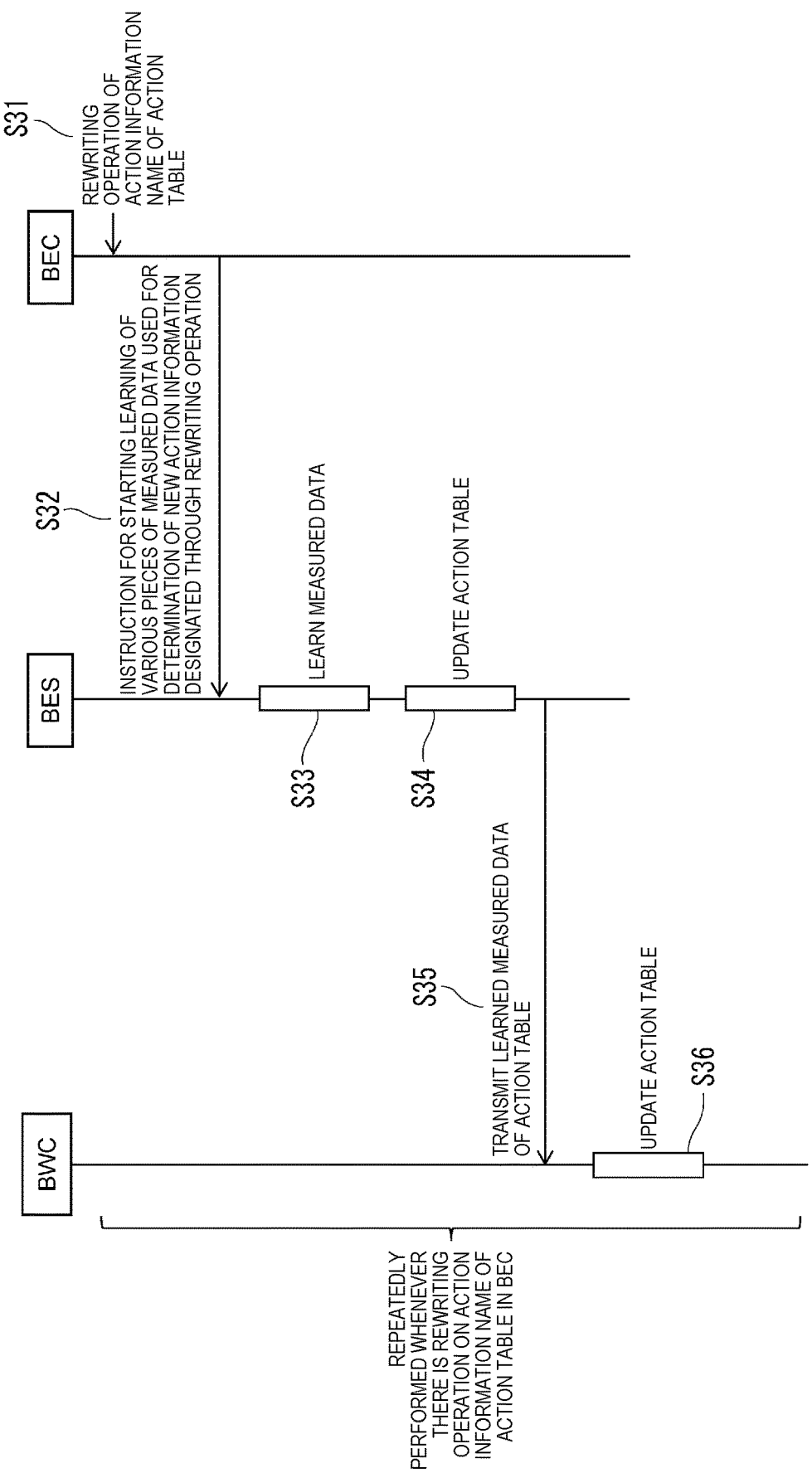
FIG. 21 is a sequence diagram illustrating a detailed example of an operation procedure regarding learning of measured data and update of a learning result, based on cooperation among a wearable camera, a back end server, and a back end client in a modification example of Exemplary Embodiment 1.

FIG. 21 is a sequence diagram illustrating a detailed example of an operation procedure regarding learning of measured data and update of a learning result, based on cooperation among wearable camera 10, back end server 50, and back end client 70*a* in the modification example of Exemplary Embodiment 1;

In FIGS. 20 and 21, it is assumed that the user of back end client 70*a* performs a rewriting operation, and thus the action information name "jostled" in action table Atb1*a* recorded on storage 58 of back end server 50 is rewritten into "pulled the gun" (S31). Back end client 70*a* transmits an instruction for starting learning of various pieces of measured data used to detect the designated new action "pulled the gun" to back end server 50 in response to the rewriting operation in step S31 (S32).

In a case where the instruction transmitted from back end client 70*a* in step S32 is received, back end server 50 starts to learn various of various pieces of measured data used to detect the designated new action "pulled the gun" through the rewriting operation performed by the user of back end client 70*a* (S33). Back end server 50 performs, for example, deep learning using action table Atb1*a* recorded on storage 58 as learning in step S33, and thus learns various pieces of measured data used to detect the designated new action "pulled the gun".

In a case where the learning in step S33 is completed, back end server 50 updates action table Atb1*b* by using results (that is, various pieces of measured data used to detect the designated new action "pulled the gun") of the learning in step S33 (S34). Back end server 50 transmits the results (that is, various pieces of measured data used to detect the designated new action "pulled the gun") of the learning in step S33 to wearable camera 10 (S35).

Wearable camera 10 receives the results (that is, various pieces of measured data used to detect the designated new action "pulled the gun") of the learning transmitted in step S35, and updates action table Atb1 recorded on memory 13 or recorder 15 (S36). Consequently, wearable camera 10 can reflect and record a learning result of measured data in back end server 50 having a higher performance specification than that of wearable camera 10, and can thus detect an action or a symptom (refer to FIG. 15) with high accuracy.

As mentioned above, in the modification example of Exemplary Embodiment 1, back end server 50 learns information regarding motion of a police officer used to detect a designated new default event in response to a rewriting operation on information regarding a default event in action table Atb1*a* (event table) which is recorded on storage 58 (second recorder) and is used to detect a default event. Back end server 50 transmits a learning result of the information regarding motion of the police officer to wearable camera 10. Wearable camera 10 receives the learning result of the information regarding motion of the police officer transmitted from back end server 50. Wearable camera 10 determines whether or not the designated new default event has occurred by using the received learning result of the information regarding motion of the police officer.

Consequently, wearable camera 10 can reflect and record a learning result of measured data in back end server 50 having a higher performance specification than that of wearable camera 10, and can thus detect an action or a symptom (refer to FIG. 15) with high accuracy.

History of Reaching Exemplary Embodiment 2

In the configuration disclosed in Japanese Patent Unexamined Publication No. 2016-122918, it is not taken into consideration that, in a case where a user (for example, a police officer) wearing or carrying a wearable camera is in an emergency situation in a case field, the wearable camera sends a support request to an investigation headquarter of the case provided in a police department. Regarding the emergency situation, for example, in a state a police officer is wounded in one hand, and levels a gun with the other hand, the police officer cannot send a support request via police wireless communication. As mentioned above, there may be a need for sending a support request to an investigation headquarter according to a body posture or a state of a police officer even in an emergency situation in which it is hard for the police officer to operate a wearable camera.

Therefore, in Exemplary Embodiment 2, in light of the circumstances, a description will be made of examples of a wearable camera and an information notification method in which, even in a situation in which it is hard for a user (for example, a police officer) to operate the wearable camera, a notification of a message such as a support request is sent to the outside (for example, an investigation headquarter) in response to a posture or a state of the police officer, and thus rescuing the police officer in early stage is efficiently supported.

Exemplary Embodiment 2

A configuration of a wearable camera system of Exemplary Embodiment 2 and an internal configuration of each apparatus forming the wearable camera system are the same as those in Exemplary Embodiment 1. Therefore, in Exemplary Embodiment 2, a constituent element having the same content as that of each constituent element forming the wearable camera system of Exemplary Embodiment 1 is given the same reference numeral, description thereof will be made briefly or omitted, and different content will be described.

In Exemplary Embodiment 2, an investigation headquarter which is a destination notified of a message by wearable camera 10 in a predetermined case (specifically, refer to step S8B in FIG. 22) is an organization called an investigation headquarter or a special investigation headquarter provided in police department PD, in a case where for example, a special event such as a case or a disaster has occurred. In Exemplary Embodiment 2, in a case where wearable camera 10 notifies an investigation headquarter of a message, the message is received by a data reception device (refer to the following description; for example, back end streaming server 60 or back end server 50) disposed in the investigation headquarter.

A data accumulation device such as back end server 50 or back end streaming server 60 connected to back end client 70a is generally disposed in the investigation headquarter or the special investigation headquarter. In a case where a message from wearable camera 10 is received by the data accumulation device, a police officer who is a user of back end clients 70a and 70b recognizes that there is a support request sent from police officer 3 in an emergency situation in a case field, and reports the content thereof to a superior officer or the like. Thereafter, under the order of the top (for example, a commanding officer) of the investigation headquarter or the special investigation headquarter, judgement to send more police officers to the case field is performed in order to rescue police officer 3 in an emergency situation in an early stage.

The concept of judgement to send police officers using a message from wearable camera 10 may be changed as appropriate depending on investigation policy or the like of an investigation headquarter or a special investigation headquarter in the police, and thus the concept is only an example. Hereinafter, an investigation headquarter and a special investigation headquarter are unified to an "investigation headquarter" without being particularly differentiated from each other.

Figure 22:
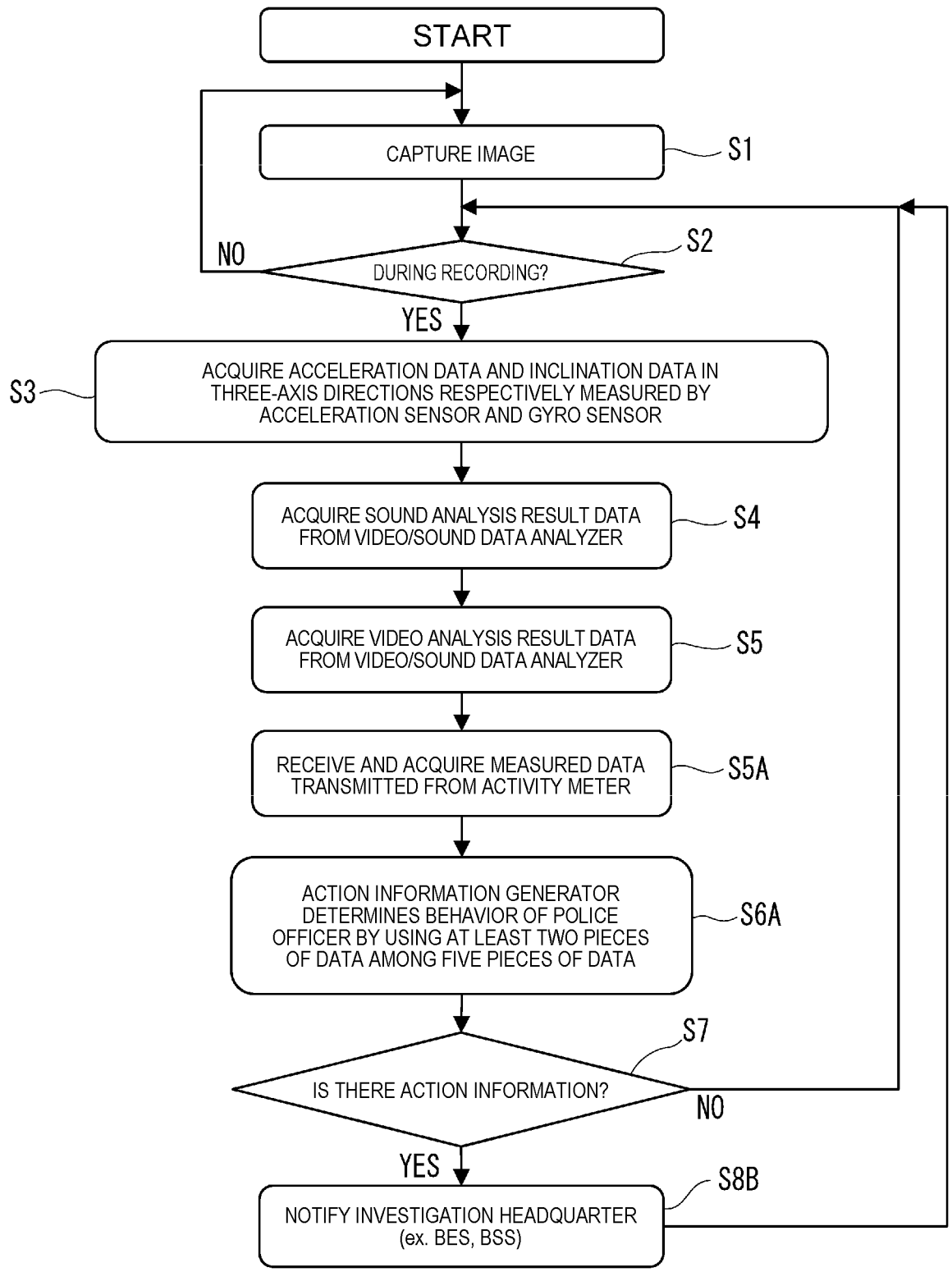
FIG. 22 is a flowchart illustrating a detailed example of an operation procedure of sending a notification to an investigation headquarter on the basis of detection of a default action in a wearable camera of Exemplary Embodiment 2.

FIG. 22 is a flowchart illustrating a detailed example of an operation procedure of sending a notification to an investigation headquarter on the basis of detection of a default action in wearable camera 10 of Exemplary Embodiment 2. In description of FIG. 22, the same content as that of the description of FIG. 6 or 16 will be made briefly or omitted, and different content will be described. FIG. 22 will be described assuming that the power sources of wearable camera 10 and activity meter 200 are in an ON state.

In FIG. 22, in wearable camera 10, after step SSA, action information generator 19D refers to action table Atb1 (refer to FIG. 7), and determines an action of police officer 3 by using at least two types of measured data among the five types of measured data (that is, the acceleration data and the inclination data in the three-axis directions of the orthogonal coordinate system, the sound analysis result data, the video analysis result data, and the measured data in activity meter 200) acquired in the respective processes in steps S3 to S5 and S5A (S6A). The processes from step S6A are the same as those in FIG. 6, and thus description thereof will be omitted.

Wearable camera 10 determines whether or not there is a default event (for example, an action corresponding to action information defined in action table Atb1 (refer to FIG. 7)) among behaviors of police officer 3 as a result of the determination in step S6A (S7).

In a case where it is determined that there is no default event (for example, an action corresponding to action information defined in action table Atb1 (refer to FIG. 7)) among behaviors of police officer 3 (S7: NO), the process in wearable camera 10 returns to step S2. In other words, in this case, wearable camera 10 does not notify the investigation headquarter of a message such as a support request assuming that police officer 3 wearing or carrying wearable camera 10 is not in an emergency situation in a case field, for example, and performs the respective processes in step S2 to step S7.

On the other hand, in a case where it is determined that there is a default event (for example, an action corresponding to action information defined in action table Atb1 (refer to FIG. 7)) among behaviors of police officer 3 (S7: YES), wearable camera 10 notifies the investigation headquarter of a message such as a support request assuming that police officer 3 wearing or carrying wearable camera 10 is in an emergency situation in a case field, for example (S8B).

In a case where wearable camera 10 notifies the investigation headquarter (for example, back end streaming server 60 or back end server 50) of the message, the message may be transmitted according to the following two transmission methods.

In a first transmission method, in a case where wearable camera 10 includes a communicator which can use a cellular network (mobile phone network) such as Long Term Evolution (LTE), wearable camera 10 may transmit the message to back end streaming server 60 or back end server 50 via the communicator by using, for example, an LTE line. Consequently, wearable camera 10 can omit control of communication with smart phone 40 or wireless LAN access point 45, and can thus directly and rapidly notify back end streaming server 60 or back end server 50 of a message.

In a second transmission method, wearable camera 10 may transmit a message to back end streaming server 60 or back end server 50 via smart phone 40 or wireless LAN access point 45 by using a wireless LAN (WLAN) such as WiFi (registered trademark). Consequently, wearable camera 10 can reduce power consumption of wearable camera 10 which is driven with the battery more than in a case of transmitting a message by using an LTE line. In the second method, a wireless LAN such as WiFi (registered trademark) is used between wearable camera 10 and smart phone 40 or wireless LAN access point 45, and a cellular network (mobile phone network) such as an LTE line is used between smart phone 40 or wireless LAN access point 45 and back end streaming server 60 or back end server 50.

Figure 23:
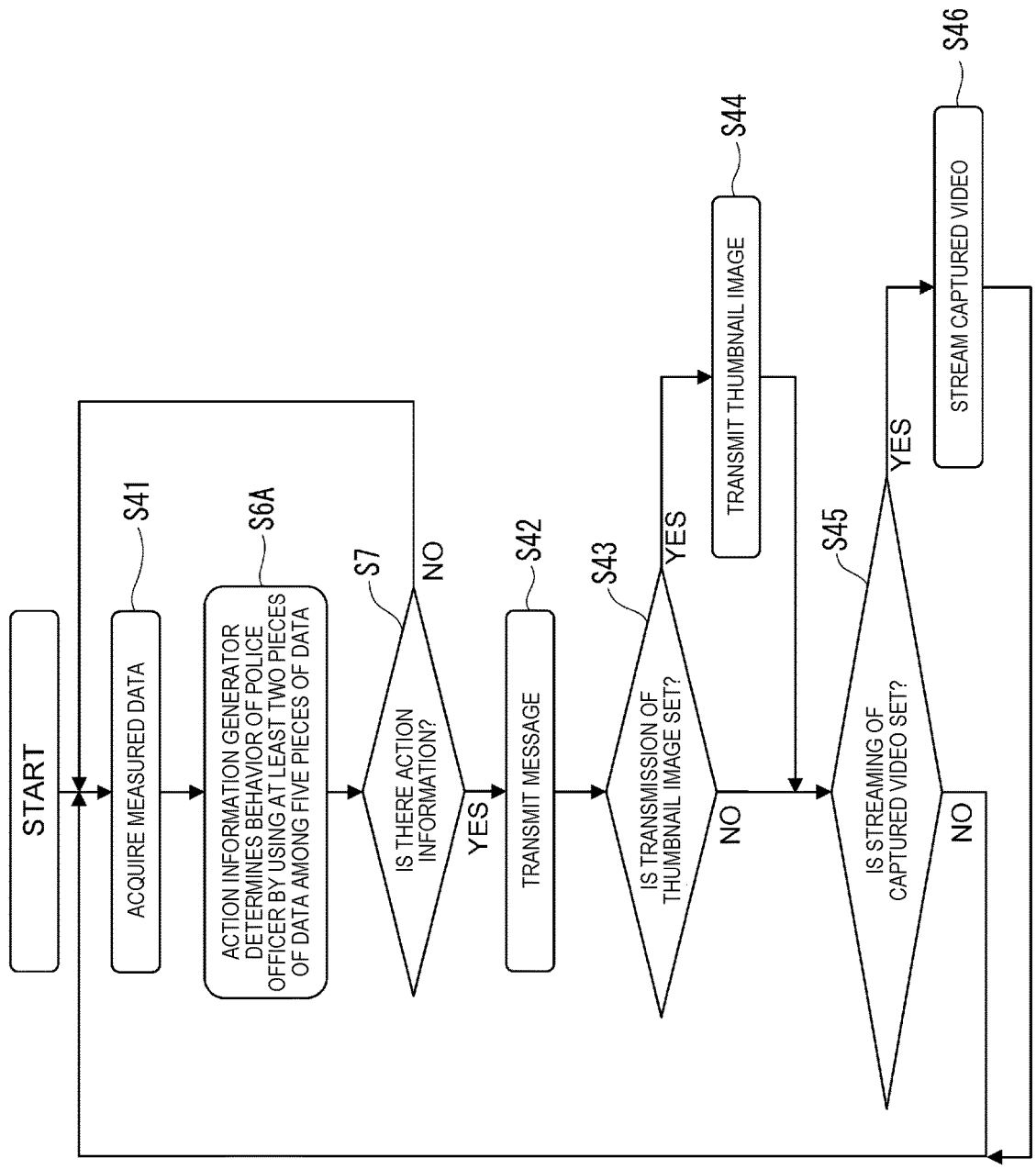
FIG. 23 is a flowchart illustrating a detailed example of a data transmission operation procedure after the notification is sent to the investigation headquarter in the wearable camera of Exemplary Embodiment 2.

FIG. 23 is a flowchart illustrating a detailed example of a data transmission operation procedure after a notification is sent to the investigation headquarter in wearable camera 10 of Exemplary Embodiment 2. In description of FIG. 23, the same content as that of the description of FIG. 22 will be made briefly or omitted, and different content will be described. FIG. 23 will be described assuming that the power sources of wearable camera 10 and activity meter 200 are in an ON state.

In FIG. 23, for example, as described with reference to steps S1 to S5 and S9 in FIG. 16, wearable camera 10 acquires the five types of measured data (that is, the acceleration data and the inclination data in the three-axis directions of the orthogonal coordinate system, the sound analysis result data, the video analysis result data, and the measured data in activity meter 200) (S41). After step S41, as described with reference to FIG. 22, in wearable camera 10, the respective processes are performed in an order of step S6A and step S7.

On the other hand, in a case where it is determined that there is a default event (for example, an action corresponding to action information defined in action table Atb1 (refer to FIG. 7)) among behaviors of police officer 3 (S7: YES), wearable camera 10 notifies (transmits) the investigation headquarter of a message such as a support request assuming that police officer 3 wearing or carrying wearable camera 10 is in an emergency situation in a case field, for example (S42).

After step S42, wearable camera 10 refers to, for example, the setting file recorded on memory 13 or recorder 15, and determines whether or not transmission of a thumbnail image is set (S43). The thumbnail image functions as an evidence image schematically showing a situation of the behavior (action) of police officer 3 at the detection point in step S7. In a case where it is determined that transmission of a thumbnail image is not set (S43: NO), the process in wearable camera 10 proceeds to step S45.

On the other hand, in a case where it is determined that transmission of a thumbnail image is set (S43: YES), wearable camera 10 generates a thumbnail image with a compressed still image format such as Joint Photographic Experts Group (JPEG) by using captured video data (for example, captured video data with a compressed moving image format such as Moving Picture Experts Group (MPEG) 4) generated by video/sound data generator 19A. Wearable camera 10 transmits data regarding the generated thumbnail image to the investigation headquarter (for example, back end streaming server 60 or back end server 50) (S44). Either one of the above-described two transmission methods is used for the transmission in step S44. After step S44, the process in wearable camera 10 proceeds to step S45.

Wearable camera 10 refers to, for example, the setting file recorded on memory 13 or recorder 15, and determines whether or not streaming of captured video data is set (S45). In a case where it is determined that streaming of captured video data is not set (S45: NO), the process in wearable camera 10 returns to step S41.

On the other hand, in a case where it is determined that streaming of captured video data is set (S45: YES), wearable camera 10 transmits captured video data (for example, captured video data with a compressed moving image format such as Moving Picture Experts Group (MPEG) 4) generated by video/sound data generator 19A to the investigation headquarter (for example, back end streaming server 60 or back end server 50) (S46). Either one of the above-described two transmission methods is used for the transmission in step S46. After step S46, the process in wearable camera 10 proceeds to step S45.

As mentioned above, in wearable camera system 1000 of Exemplary Embodiment 2, wearable camera 10 records captured videos of a subject on the front side of police officer 3 on recorder 15, and acquires information (for example, acceleration data or inclination data in the three-axis directions of the orthogonal coordinate system, and data regarding an activity amount acquired from activity meter 200) regarding motion of police officer 3. Wearable camera 10 determines whether or not at least one default event (for example, the actions or the symptoms illustrated in FIG. 15) has occurred on the basis of the information regarding motion of police officer 3 acquired (specifically, measured) during recording of captured videos of the subject. Wearable camera 10 notifies (transmits) an investigation headquarter of a message such as a support request according to determination that at least one default event (for example, the actions illustrated in FIG. 5) has occurred during recording of captured videos of the subject.

Consequently, for example, assuming that police officer 3 wearing or carrying wearable camera 10 is in an emergency situation in a case field, wearable camera 10 can notify the outside (for example, an investigation headquarter) of a message such as a support request according to a body posture or a state of police officer 3 even in a situation it is hard for police officer 3 to operate wearable camera 10. Therefore, wearable camera 10 can effectively support the investigation headquarter in rescuing police officer 3 in an early stage.

Wearable camera 10 of the present exemplary embodiment may notify an investigation headquarter of a message such as a support request, may generate event list information (for example, action index AL1) in which a detection time point of the default event is correlated with information regarding the default event, and may record the event list information on recorder 15 in correlation with the captured videos of the subject, in combination with above Exemplary Embodiment 1.

Wearable camera 10 may further record information indicating that a notification of a message such as a support request has been sent to an investigation headquarter and information regarding a notification time point on recorder 15 in correlation with each other. Consequently, wearable camera 10 can reliably store history that a message such as a support request has transmitted to an investigation headquarter in an emergency situation of police officer 3 in a case field, and can thus contribute to posterior examination of a behavior or a situation of police officer 3 during handling of a case.

In a case where wearable camera 10 notifies an investigation headquarter of a message such as a support request, a thumbnail image based on a captured video obtained at the time of transmitting the message may be transmitted to the investigation headquarter according to the content of the setting file recorded on memory 13 or recorder 15. Consequently, wearable camera 10 can provide the thumbnail image from which an emergency situation of police officer 3 can be roughly understood to an investigation headquarter, and can thus contribute to a prompt judgement of the investigation headquarter.

In a case where wearable camera 10 notifies an investigation headquarter of a message such as a support request, wearable camera 10 may subject captured videos obtained at the time of transmission of the message to streaming transmission to the investigation headquarter according to the content of the setting file recorded on memory 13 or recorder 15. Consequently, wearable camera 10 can provide captured video data from which an emergency situation of police officer 3 can be understood in detail to an investigation headquarter, and can thus contribute to a prompt and accurate judgement of the investigation headquarter.

History of Reaching Exemplary Embodiment 3

As a current business practice in the police, the following work is performed as follows. For example, if a case occurs, assuming that a criminal of the case makes a preliminary examination of a case field, a plurality of police officers watch and check the content of captured videos obtained and recorded by all of cameras within a few kilometers of the surroundings of the case field for a predetermined time before the case occurred, and narrow down captured videos related to the case. The number of captured videos of which the content is to be checked may be enormous depending on property or a scale of a case, and thus there is a problem in which a large amount of work man-hours is required until a plurality of police officers complete checking of the content.

However, in the configuration disclosed in Japanese Patent Unexamined Publication No. 2016-122918, it is not taken into consideration that a technical countermeasure for solving the problem is taken. In other words, in the related art such as Japanese Patent Unexamined Publication No. 2016-122918, video analysis for narrowing down captured videos related to a case cannot be performed by using captured videos obtained and recorded for a predetermined time before the case occurred.

Therefore, in Exemplary Embodiment 3, in light of the circumstances, a description will be made of examples of a server apparatus, a wearable camera, and a video analysis method in which video analysis for narrowing down captured videos related to an event such as a case is performed by using a recorded captured video, and thus the time and effort required to retrieve a target captured video are reduced.

Exemplary Embodiment 3

Figure 24:
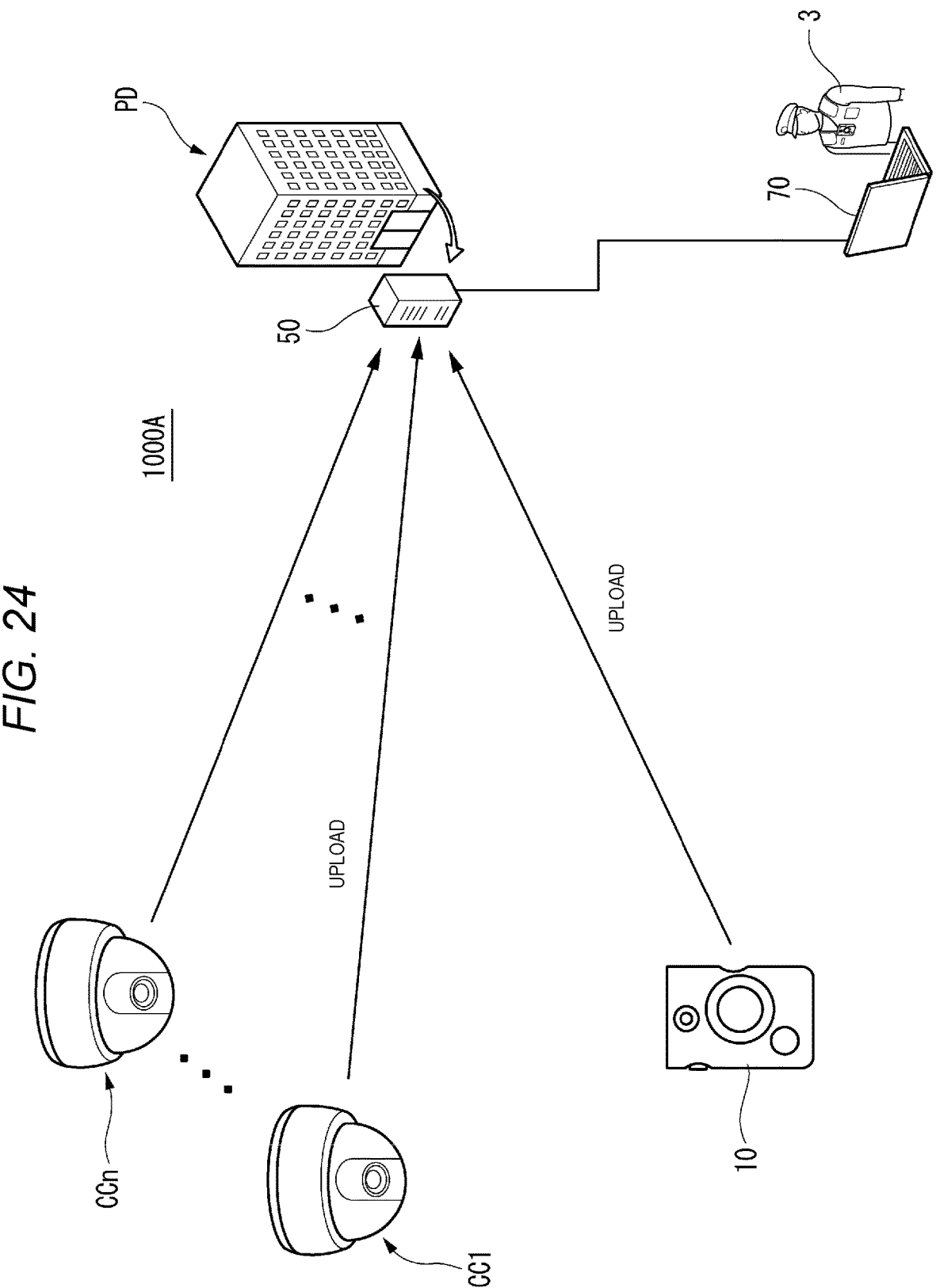
FIG. 24 is a schematic diagram illustrating a configuration example of a wearable camera system of Exemplary Embodiment 3.

FIG. 24 is a schematic diagram illustrating a configuration example of wearable camera system 1000A of Exemplary Embodiment 3. Wearable camera system 1000A of Exemplary Embodiment 3 has the same configuration as that of wearable camera system 1000 (refer to FIG. 1) of Exemplary Embodiment 1, and is configured to further include a plurality of monitoring cameras CC1 to CCn (where n is a natural number of 2 or greater). FIG. 24 illustrates wearable camera 10, monitoring cameras CC1 to CCn, back end server 50, and back end clients 70 related to description of Exemplary Embodiment 3 as representatives compared with wearable camera system 1000 in FIG. 1, but is not intended to exclude configurations of other respective apparatuses illustrated in FIG. 1. FIG. 24 illustrates only a single wearable camera 10, but the number of wearable cameras 10 forming wearable camera system 1000A is not limited to one, and may be plural.

An internal configuration of each apparatus forming wearable camera system 1000A of Exemplary Embodiment 3 is the same as that in Exemplary Embodiment 1. Therefore, in Exemplary Embodiment 3, a constituent element having the same content as that of each constituent element forming the wearable camera system of Exemplary Embodiment 1 is given the same reference numeral, description thereof will be made briefly or omitted, and different content will be described.

Internal configurations of respective monitoring cameras CC1 to CCn may or may not be the same as each other. For better understanding of the following description, intersection configurations of respective monitoring cameras CC1 to CCn are assumed to be the same as each other.

Each of monitoring cameras CC1 to CCn images subjects present in a location (for example, on a street, in front of a station, at a storefront, or in a store) where the monitoring camera is installed. Each of monitoring cameras CC1 to CCn writes (records) captured video data to a recorder (for example, a recorder corresponding to recorder 15 of wearable camera 10) built into the monitoring camera. Monitoring cameras CC1 to CCn transmit (upload) the captured video data to back end server 50 or back end streaming server 60 in police department PD at a predetermined timing (for example, in a periodic manner at a predetermined time interval, or a time point at which a request from back end server 50 or back end streaming server 60 in police department PD is received; the same applies hereinafter).

Wearable camera 10 similarly also transmits (uploads) the captured video data to back end server 50 or back end streaming server 60 in police department PD at a predetermined timing (for example, in a periodic manner at a predetermined time interval, or a time point at which a request from back end server 50 or back end streaming server 60 in police department PD is received).

Back end client 70 corresponds to back end clients 70a and 70b in FIG. 1, and is formed by using, for example, a personal computer (PC) used by police officer 3. Back end client 70 transmits an instruction for retrieving a captured video which is a retrieval operation target to back end server 50 in response to a retrieval operation (which will be described later) performed by police officer 3 who is a user. Back end client 70 displays captured video data as an extraction result (retrieval result) transmitted from back end server 50 on a monitor (not illustrated), and reproduces and outputs selected captured video data in a case where an instruction for reproduction is given through an operation performed by police officer 3.

Back end server 50 (server apparatus) receives captured video data transmitted (uploaded) from each of monitoring cameras CC1 to CCn, and performs a video analysis process for extracting meta-information (which will be described later). The video analysis process in back end server 50 is performed according to a well-known technique using, for example, captured video data CPD1. Back end server 50 generates video accumulation data DAT1 in which meta-information MTF1 extracted through the video analysis process is correlated with captured video data CPD1, and records video accumulation data DAT1 on storage 58 (refer to FIG. 11) and thus stores video accumulation data DAT1 (refer to FIG. 25). Back end server 50 searches storage 58 so as to retrieve and extract corresponding captured video data according to a retrieval instruction transmitted from back end client 70. Back end server 50 transmits captured video data as an extraction result (retrieval result) to back end client 70.

Figure 25:
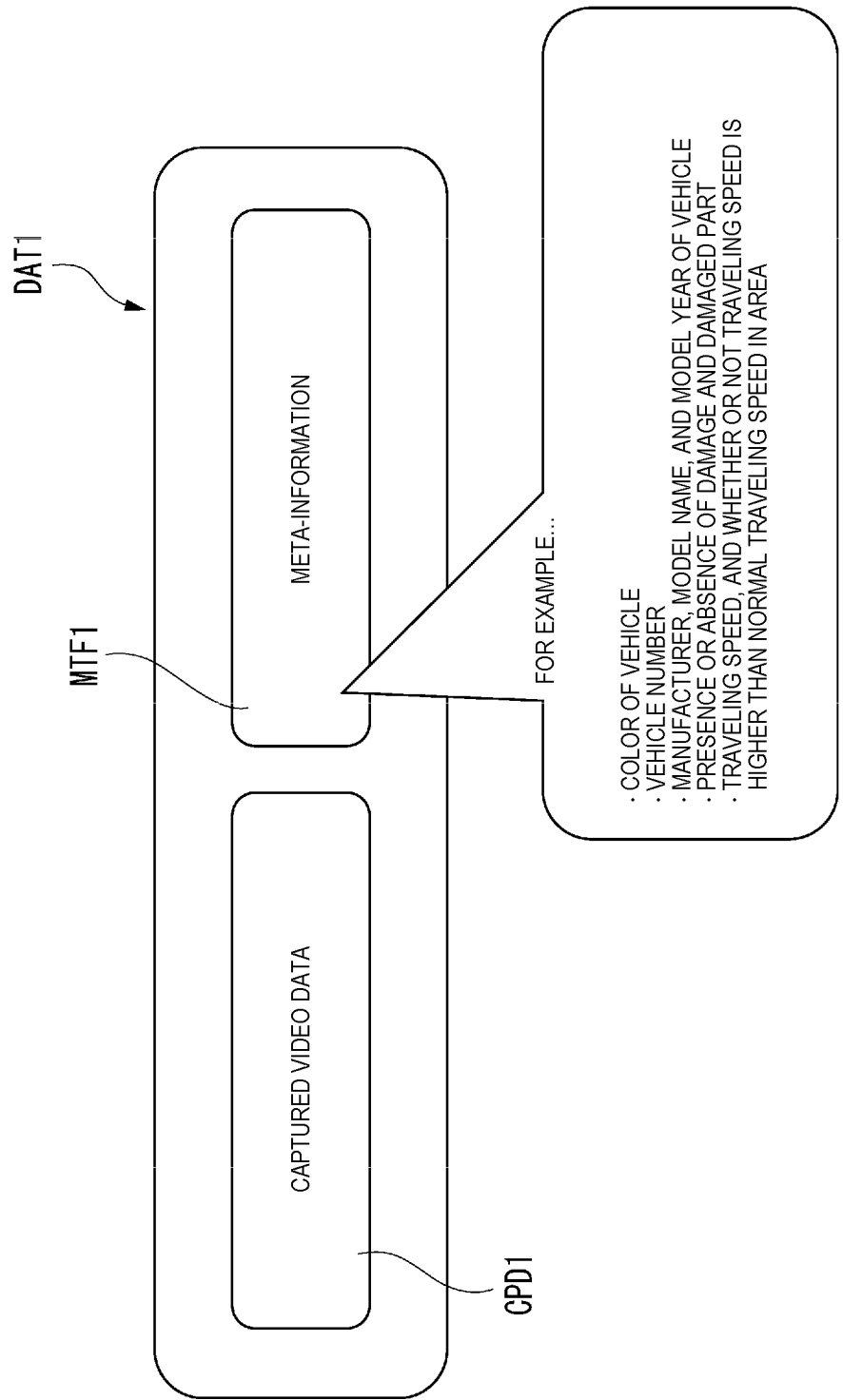
FIG. 25 is a diagram illustrating a configuration example of video accumulation data recorded in a back end server of Exemplary Embodiment 3.

FIG. 25 is a diagram illustrating a configuration example of video accumulation data DAT1 recorded on back end server 50 of Exemplary Embodiment 3. Video accumulation data DAT1 includes captured video data CPD1 which is uploaded from any camera (that is, any of monitoring cameras CC1 to CCn and wearable camera 10) and received, and meta-information MTF1 obtained through the video analysis process in back end server 50.

Here, meta-information MTF1 will be described. Meta-information MTF1 is used for back end server 50 to retrieve and extract a retrieval target captured video on the basis of a retrieval instruction from back end client 70. Meta-information MTF1 is attribute information used to track traces of a suspect or a criminal in order to extract captured video data in which the suspect or the criminal was reflected before a case occurred or when the case occurred.

Meta-information MTF1 is, for example, a color of a vehicle reflected in captured video data CPD1, a vehicle number reflected in captured video data CPD1, or a manufacturer, a model name, and a model year of a vehicle reflected in captured video data CPD1. On the basis of meta-information MTF1, back end server 50 can specifically specify, for example, a vehicle used by a suspect or a criminal when the suspect or the criminal made preliminary examination before a case occurred. Back end server 50 can specifically specify, for example, a vehicle used in escape of a suspect or a criminal when a case occurred.

Meta-information MTF1 is, for example, whether or not an article (for example, a vehicle) reflected in captured video data CPD1 is damaged, and a damaged part. On the basis of meta-information MTF1, for example, in a case where an article reflected in captured video data CPD1 is related to a case, back end server 50 can specify a damaged part of the article from residues reflected in captured video data CPD1. If a damaged part (for example, a certain component of a vehicle) can be specified by back end server 50, police officer 3 who is a user of back end client 70 can specifically specify, for example, a vehicle used when a suspect or a criminal escaped in a hurry.

Meta-information MTF1 is, for example, a traveling speed of a vehicle reflected in captured video data CPD1, or whether or not the traveling speed is higher than a normal traveling speed (for example, the legal limit) in an area including a location where any camera corresponding to captured video data CPD1 is installed. For example, in a case where a vehicle reflected captured video data CPD1 is related to a case, there is a high probability that a suspect or a criminal might drive the vehicle at a speed higher than a normal traveling speed for escape. On the basis of meta-information MTF1, back end server 50 can specifically specify that a vehicle traveled at a speed higher than a normal traveling speed might be used by a suspect or a criminal.

Figure 26:
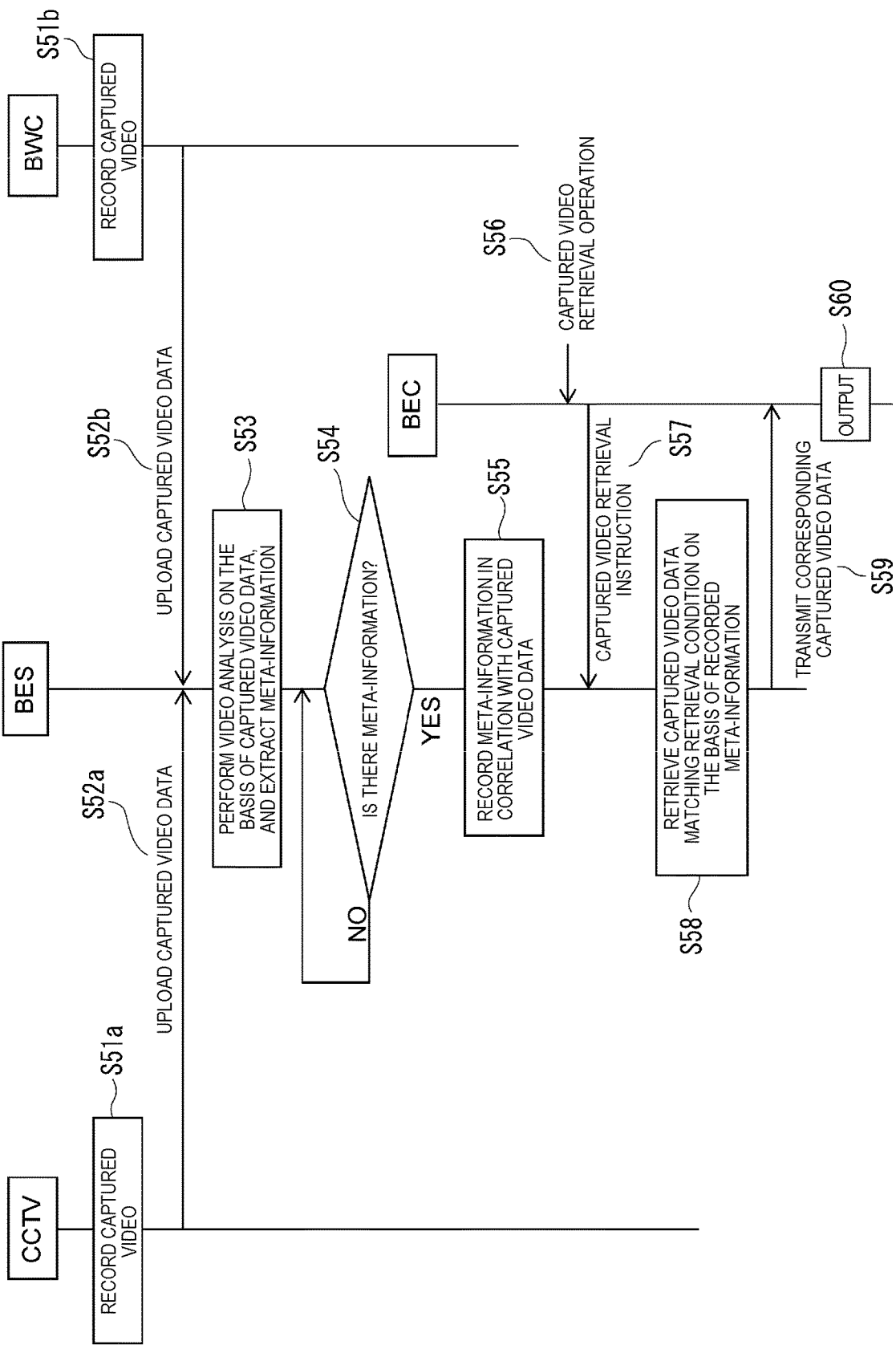
FIG. 26 is a sequence diagram illustrating a detailed example of an analysis operation procedure for captured video data transmitted from a wearable camera or a monitoring camera in the back end server of Exemplary Embodiment 3.

FIG. 26 is a sequence diagram illustrating a detailed example of an analysis operation procedure for captured video data transmitted from wearable camera 10 or a monitoring camera in back end server 50 of Exemplary Embodiment 3. For better understanding of description of FIG. 26, a single monitoring camera and a single wearable camera are illustrated, but the same procedure also applies in a case where a plurality of wearable cameras and monitoring cameras are provided. In FIG. 26, the monitoring camera is indicated by a closed-circuit television (CCTV), and monitoring camera CC1 will be described as an example.

In FIG. 26, monitoring camera CC1 records captured video data of subjects present in a location (for example, on a street, in front of a station, at a storefront, or in a store) where the monitoring camera is installed, on a recorder (not illustrated) built into monitoring camera CC1 (S51a). Monitoring camera CC1 transmits (uploads) the captured video data to back end server 50 or back end streaming server 60 in police department PD at a predetermined timing (refer to the above description) (S52a).

Wearable camera 10 records captured video data of subjects present in a location (for example, a case field or the periphery of the case field) where a user (for example, police officer 3) wearing or holding the wearable camera is present, on recorder 15 built into wearable camera 10 (S51b). Wearable camera 10 transmits (uploads) the captured video data to back end server 50 or back end streaming server 60 in police department PD at a predetermined timing (refer to the above description) (S52b).

Back end server 50 receives the captured video data transmitted from monitoring camera CC1 and wearable camera 10 in steps S51b and S52b. Back end server 50 performs a video analysis process on the basis of the captured video data, and determines whether or not there is meta-information of a captured video (S53).

Back end server 50 determines whether or not meta-information can be extracted as a result of the video analysis process in step S53 (S54). In a case where it is determined that meta-information cannot be extracted (that is, there is no meta-information) (S54: NO), the process in step S53 is repeatedly performed until meta-information can be extracted.

In a case where it is determined that meta-information can be extracted (S54: YES), back end server 50 records captured video data CPD1 which is a target of the video analysis process and extracted meta-information MTF1 on storage 58 in correlation with each other (S55).

Here, for example, a case is assumed in which a professional in police department PD who wants to retrieve captured video data related to a case operates back end client 70. Police officer 3 who has patrolled a case field may operate back end client 70 instead of the professional.

Back end client 70 detects that a retrieval operation for captured video data related to a case has been input by the professional (refer to the above description) or police officer 3 who is a user (S56). In the retrieval operation, it is assumed that, regarding meta-information, "red" is specifically input as a "color of a vehicle", and "ABC-1234" is specifically input as a "vehicle number". Back end client 70 transmits a retrieval instruction for a captured video which is a retrieval operation target to back end server 50 according to input of the retrieval operation (S57). The retrieval instruction includes the meta-information (that is, "red" as a "color of a vehicle", and "ABC-1234" as a "vehicle number") which is input during the retrieval operation.

In a case where the retrieval instruction transmitted in step S57 is received, back end server 50 retrieves and extracts captured video data matching a retrieval condition on the basis of the retrieval instruction and the meta-information recorded on storage 58 (S58). Back end server 50 returns the captured video data extracted in step S58 to back end client 70 (S59).

Back end client 70 displays the captured video data as an extraction result (retrieval result) transmitted from back end server 50 on a monitor (not illustrated), and reproduces and outputs selected captured video data in a case where an instruction for reproduction is given through an operation performed by the professional (refer to the above description) or police officer 3 who is a user (S60).

As mentioned above, in wearable camera system 1000A of Exemplary Embodiment 3, monitoring cameras CC1 to CCn or wearable camera 10 transmits (uploads) captured video data obtained through imaging therein to back end server 50 at a predetermined timing. Back end server 50 has been described as an example of a server apparatus which is an upload destination, but back end streaming server 60 may be an upload destination. In this case, captured video data which is uploaded is transmitted from back end streaming server 60 to back end server 50. Back end server 50 performs a video analysis process on the uploaded captured video data, so as to extract meta-information regarding the captured video data, and accumulates video accumulation data DAT1 in which captured video data CPD1 is correlated with meta-information MTF1 in storage 58.

Consequently, back end server 50 can perform video analysis for narrowing down captured video data related to an event such as a case by using captured video data recorded by each of monitoring cameras CC1 to CCn and wearable camera 10, and can thus accumulate meta-information which is helpful in verification of relevance between a video reflected in the captured video data and the case along with the captured video data. Therefore, back end server 50 can reduce the time and effort required to retrieve a target captured video.

Back end server 50 retrieves captured video data including meta-information from storage 58 in response to a retrieval operation including the meta-information which is input by a user of back end client 70, and returns the extracted captured video data to back end client 70. Consequently, back end server 50 can easily and efficiently retrieve captured video data related to a case desired to be retrieved by a user (for example, the professional (refer to the above description) or police officer 3) of back end client 70, and can thus contribute to reducing work man-hours of the user required to retrieve captured video data related to the case.

History of Reaching Exemplary Embodiment 4

The content of Exemplary Embodiment 4 relates to an information processing apparatus and an information processing method of displaying a desired captured video by using information regarding a behavior of a user in captured videos.

In the related art, a recording device which performs imaging or sound collecting in a state of being attached to a user's body has been proposed (for example, refer to Japanese Patent Unexamined Publication No. 2007-49592). The recording device is wearable, and an imaging visual field thereof is set to substantially match a visual field of a user. The recording device registers position information, movement speed change information, and biological signal change information every predetermined time corresponding to a period from the start of recording of video recording data or sound recording data to the end thereof in a database. The recording device compares the content of the database with a condition for adding a bookmark, a time to add a bookmark to the video recording data or sound recording data is specified, and the bookmark is added at the specified time, so that management during reproduction is performed.

However, in Japanese Patent Unexamined Publication No. 2007-49592, in a case where a plurality of users (for example, police officers) are related to a certain incident (for example, a case) occurred already, and a video which may serve as an evidence in the case or a video showing a situation at the time of the case is captured by a recording device worn or carried by each user, it is not taken into consideration that a video at a point at which a behavior gaining attention was performed is efficiently retrieved. Therefore, in a case where a captured video from each viewpoint of a plurality of police officers at the point at which the behavior getting attention in the case was performed is requested, in order to accurately extract the captured video, a lot of manual laborious work (for example, work of viewing and checking each captured video with the naked eyes) is required. This increases the number of work processes required to extract a necessary captured video, and thus there is a problem in that convenience during extraction is not sufficient.

Therefore, in Exemplary Embodiment 4, in light of the circumstances of the related art, a description will be made of examples of an information processing apparatus and an information processing method in which, in a case where a plurality of users are related to a certain incident occurred already, a captured video at a point at which a behavior gaining attention was performed is accurately extracted among captured videos in wearable cameras worn or carried by the respective users, and improvement of convenience during extraction of a captured video desired by a user is supported.

Exemplary Embodiment 4

A configuration of a wearable camera system of Exemplary Embodiment 4 and an internal configuration of each apparatus forming wearable camera system are the same as those in Exemplary Embodiment 1. Therefore, in Exemplary Embodiment 4, a constituent element having the same content as that of each constituent element forming the wearable camera system of Exemplary Embodiment 1 is given the same reference numeral, description thereof will be made briefly or omitted, and different content will be described.

First, with reference to FIG. 27, a description will be made of an internal configuration of back end client 70 (which is the same as back end clients 70a and 70b illustrated in FIG. 1) as an example of an information processing apparatus related to Exemplary Embodiment 4. The information processing apparatus related to Exemplary Embodiment 4 may be back end server 50 illustrated in FIGS. 1 and 11.

Figure 27:
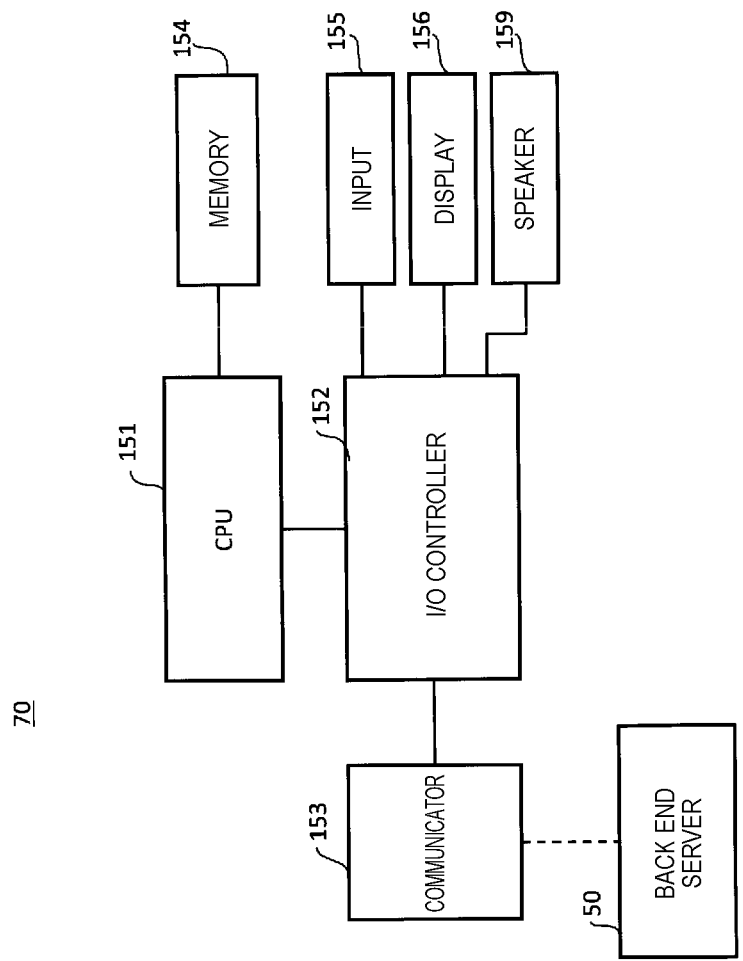
FIG. 27 is a block diagram illustrating a detailed example of an internal configuration of a back end client of Exemplary Embodiment 4.

FIG. 27 is a block diagram illustrating a detailed example of an internal configuration of the back end client of Exemplary Embodiment 4. Back end client 70 includes CPU 151, I/O controller 152, communicator 153, memory 154, input 155, display 156, and speaker 159.

CPU 151 performs a control process of integrating operations of the respective constituent elements of back end client 70 as a whole, a process of transmitting and receiving data to and from the other respective constituent elements, a data calculation (computation) process, and a data storage process. CPU 151 is operated according to a program and data stored in memory 154.

I/O controller 152 performs control on input and output of data between CPU 151 and the respective constituent elements (for example, communicator 153, input 155, and display 156) of back end client 70, and relays data from CPU 151 and data to CPU 151. I/O controller 152 may be formed integrally with CPU 151.

Communicator 153 performs wired communication with wearable camera 10 connected to a wired LAN in police department PD. Communicator 153 may perform wired or wireless communication with, for example, in-car recorder 33, in-car PC 32, smart phone 40, wearable camera 10 which can be worn or held by police officer 3, or back end server 50.

Memory 154 is formed by using, for example, a RAM, a ROM, and a nonvolatile or volatile semiconductor memory, functions as a work memory during an operation of CPU 151, and stores a predetermined program and data for operating CPU 151. Memory 154 (third recorder) records captured videos of a subject transmitted from wearable camera 10 and action index AL1 in correlation with each other in the same manner as storage 58 of back end server 50. In a case where an information processing apparatus related to Exemplary Embodiment 4 is back end server 50, storage 58 (third recorder) records captured videos of a subject transmitted from wearable camera 10 and action index AL1 in correlation with each other in the same manner as storage 58 of back end server 50.

Input 155 is a user interface (UI) which receives an input operation performed by a user (for example, police officer 3 or the above-described professional) of back end client 70 in police department PD, and notifies CPU 151 of the input operation via I/O controller 152, and is a pointing device such as a mouse or a keyboard. Input 155 may be formed by using a touch panel or a touch pad which is disposed to correspond to, for example, a screen of display 156, and in which an operation can be performed with the finger of a person in charge or a stylus pen.

Display 156 (monitor) is formed by using, for example, a liquid crystal display (LCD) or an organic EL display, and displays various pieces of information. For example, in a case where captured videos obtained or recorded by wearable camera 10 are input according to an input operation performed by a user, display 156 displays the captured videos on a screen under an instruction of CPU 151. For example, in a case where captured videos recorded by in-car cameras 31 are input according to an input operation performed by a user, display 156 displays the captured videos on a screen under an instruction of CPU 151.

For example, in a case where sounds collected by wearable camera 10 are input according to an input operation performed by a user, speaker 159 outputs the collected sounds under an instruction of CPU 151.

Next, a description will be made of an operation example after action index AL1 and captured videos generated by different wearable cameras 10 are recorded on back end client 70 of police department PD for backup. Here, a case is assumed in which, for example, in a case where a plurality of police officers are related to (participate in) a certain incident (for example, a case) occurred already, a captured video at a point at which a behavior getting attention was performed by a user (for example, police officer 3) as a party related to the case is retrieved and watched among captured videos in wearable cameras 10 worn or carried by the respective police officers. A plurality of captured videos at the point at which the behavior getting attention was performed are extracted, and thus it is possible to perform multilateral situation judgement based on viewpoints of a plurality of police officers. However, an operation example is not limited to the above-described assumed example.

Figure 28:
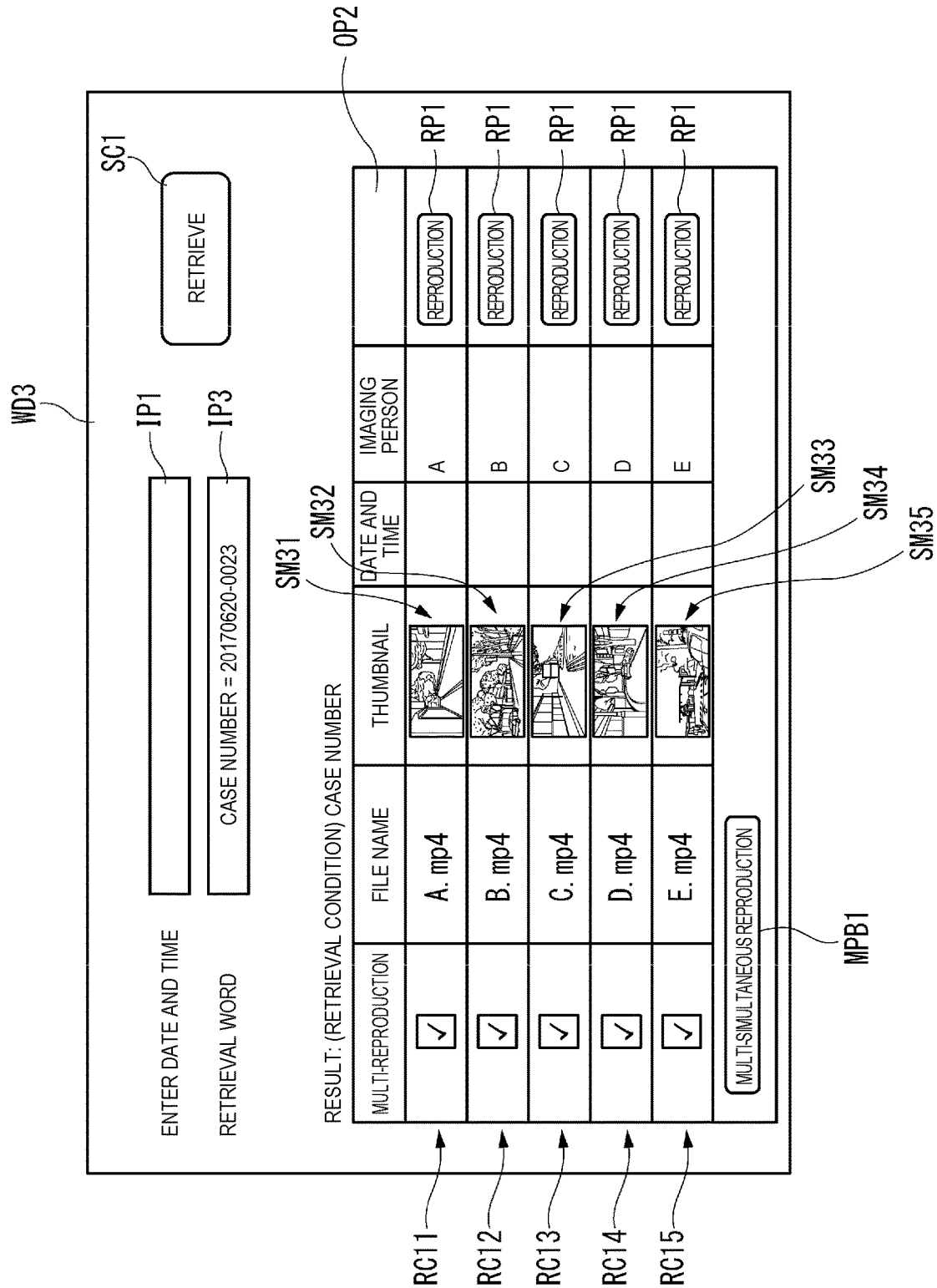
FIG. 28 is a diagram illustrating an example of a retrieval result screen displaying an entry field for a captured video retrieval condition and a retrieval result.

FIG. 28 is a diagram illustrating an example of retrieval result screen WD3 displaying an entry field for a captured video retrieval condition and a retrieval result. Retrieval result screen WD3 illustrated in FIG. 28 is an example of a screen displayed on display 156 as a processing result in a dedicated application (for example, a retrieval application (specifically, CPU 151) for a captured video) which is installed in advance to be executable in back end client 70. In a case where an information processing apparatus related to Exemplary Embodiment 4 is back end server 50, the retrieval application is formed of, for example, CPU 51, and, hereinafter, CPU 151 may be replaced with CPU 51. In the following description, police officer 3 described in each of the above-described exemplary embodiments will be referred to as police officer A. Police officer 3 may not be a party related to a case, and, in this case, police officer 3 and police officer A may be different persons. A description will be made assuming that police officer A is a party related to a case.

Retrieval result screen WD3 illustrated in FIG. 28 includes date and time entry field IP1, retrieval word entry field IP3, retrieval button SC1, and retrieval result list OP2 indicating a list of captured videos. The date and time which is a retrieval target is entered into date and time entry field IP1 through an operation performed by, for example, police officer 3 as a party related to a case in the retrieval application for a captured video. Various retrieval conditions for extracting a retrieval target captured video are entered into retrieval word entry field IP3. In the example illustrated in FIG. 28, the "case number 20170620-0023" is entered. In other words, a captured video (in other words, a captured video regarding a twenty-third case occurred on Jun. 20, 2017) having an attribute of the "case number 20170620-0023" as meta-information MTF1 (for example, refer to FIG. 25) of the captured video is retrieved.

For example, in a state in which retrieval result list OP2 is not displayed (in other words, a state before retrieval) on retrieval result screen WD3 illustrated in FIG. 28, if retrieval button SC1 is pressed according to entry of a retrieval condition from police officer 3, the retrieval application (specifically, CPU 151 as a retrieval processor) for a captured video retrieves one or more captured videos having metadata of the "case number 20170620-0023" by referring to memory 154 on which action index AL1 and captured video data are recorded in correlation with each other. The retrieval application (specifically, CPU 151 as a display controller) for a captured video displays retrieval result screen WD3 (refer to FIG. 28) including a list of a plurality of captured videos extracted through the retrieval and multi-simultaneous reproduction display button MPB1 (which will be described later) on display 156.

For example, in retrieval result list OP2, extracted records RC11, RC12, RC13, RC14, and RC15 of five captured videos are displayed, and multi-simultaneous reproduction display button MPB1 (predetermined icon) is displayed to be selectable. For example, in FIG. 28, multi-simultaneous reproduction display button MPB1 is provided as a button for displaying a screen on which the respective extracted five captured videos can be reproduced simultaneously in a single screen (so-called multi-simultaneous reproduction). In each of records RC11 to RC15, a checkbox for designating whether or not a target of the multi-simultaneous reproduction is set, a file name of captured video data, a thumbnail image, the date and time (not illustrated in FIG. 28), information regarding an imaging person (that is, a police officer wearing or holding wearable camera 10), and reproduction button RP1 for the captured video data are correlated with each other. The thumbnail image is an image (for example, a still image, or a moving image in an animation form) generated on the basis of a captured video at a detection point at which an action (refer to FIG. 15) was detected among captured videos corresponding to a file name.

According to record RC11 of retrieval result list OP2, with respect to police officer A, it can be seen that a file name of captured video data related to the case with the "case number 20170620-0023" is "A.mp4", and thumbnail image SM31 at a point at which an action of police officer A was detected among captured videos is displayed.

Similarly, according to record RC12 of retrieval result list OP2, with respect to police officer B, it can be seen that a file name of captured video data related to the case with the "case number 20170620-0023" is "B.mp4", and thumbnail image SM32 at a point at which an action of police officer B was detected among captured videos is displayed.

Similarly, according to record RC13 of retrieval result list OP2, with respect to police officer C, it can be seen that a file name of captured video data related to the case with the "case number 20170620-0023" is "C.mp4", and thumbnail image SM33 at a point at which an action of police officer C was detected among captured videos is displayed.

Similarly, according to record RC14 of retrieval result list OP2, with respect to police officer D, it can be seen that a file name of captured video data related to the case with the "case number 20170620-0023" is "D.mp4", and thumbnail image SM34 at a point at which an action of police officer D was detected among captured videos is displayed.

Similarly, according to record RC15 of retrieval result list OP2, with respect to police officer E, it can be seen that a file name of captured video data related to the case with the "case number 20170620-0023" is "E.mp4", and thumbnail image SM35 at a point at which an action of police officer E was detected among captured videos is displayed.

Here, it is assumed that, for example, all of the checkboxes for records RC11 and RC15 are selected, and then multi-simultaneous reproduction display button MPB1 is pressed (an operation of selecting a predetermined icon) through an operation performed by a user (for example, police officer 3 as a party who has participated in the "case number 20170620-0023"). In this case, the retrieval application (specifically, CPU 151 as a display controller) for a captured video displays a video reproduction screen (for example, multi-simultaneous reproduction screen WD4) including a captured video correlated with each wearable camera 10 and event list information (for example, action index AL1) corresponding to the captured video, on display 156 (refer to FIG. 29).

Figure 29:
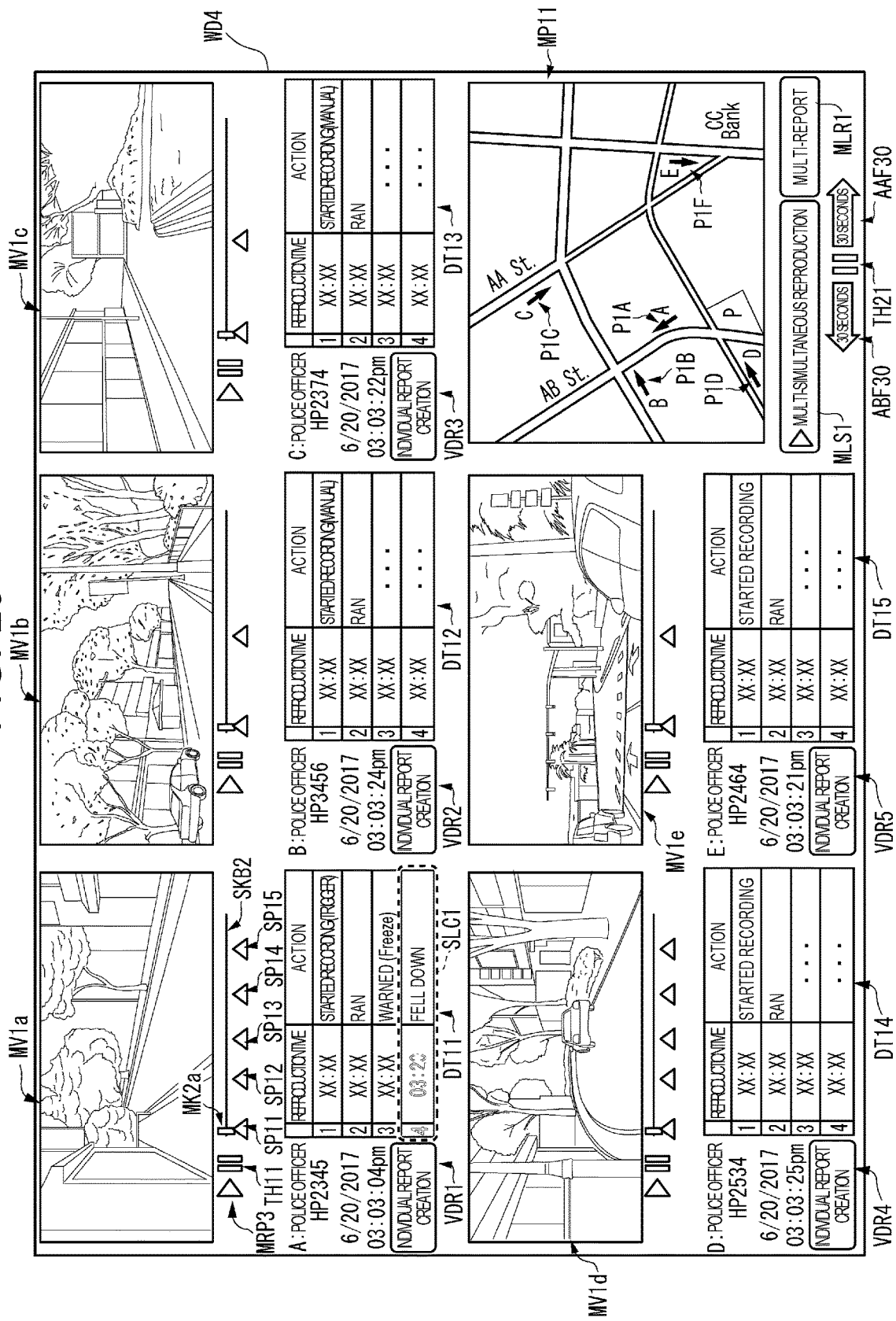
FIG. 29 is a diagram illustrating an example of a multi-simultaneous reproduction screen based on pressing of a multi-simultaneous reproduction button in the retrieval result screen in FIG. 28.

FIG. 29 is a diagram illustrating an example of multi-simultaneous reproduction screen WD4 based on pressing of multi-simultaneous reproduction display button MPB1 in retrieval result screen WD3 in FIG. 28. Multi-simultaneous reproduction screen WD4 (video reproduction screen) illustrated in FIG. 29 is an example of a screen displayed on display 156 as a processing result in the retrieval application (specifically, CPU 151) for a captured video which is installed in advance to be executable in back end client 70.

Multi-simultaneous reproduction screen WD4 illustrated in FIG. 29 displays that, for example, captured videos MV1a, MV1b, MV1c, MV1d and MV1e in respective wearable cameras 10 and correlation tables DT11, DT12, DT13, DT14 and DT15 are associated with respective wearable cameras 10 of five police officers. The five police officers are, for example, A with the identification number "HP2345", B with the identification number "HP3456", C with the identification number "HP2374", D with the identification number "HP2534", and E with the identification number "HP2464".

A reproduction button (for example, reproduction button MRP3), a pause button (for example, pause button TH11), a seek bar (for example, seek bar SKB2), a marker (for example, marker MK2a), and detection markers (for example, detection markers SP11, SP12, SP13, SP14 and SP15) are displayed in correlation with a display region of each other between each of captured videos MV1a to MV1e and each of correlation tables DT11 to DT15. The seek bar (for example, seek bar SKB2) indicates a reproducible period (that is, a recording period) of each of captured videos MV1a to MV1e. The marker (for example, marker MK2a) indicates a reproduction time point (that is, a reproduction position) of a captured video. The detection markers (for example, detection markers SP11 to SP15) indicate detection timings of an action or a symptom detected during recording of each captured video.

In FIG. 29, for simplification of description, in correlation tables DT11 to DT15, in a case where an action or a symptom of each police officer was actually detected, a specific action or symptom is written in the action field, and, in a case where an action or a symptom was not detected, " . . . " is written for convenience. In correlation table DT11, a total of five actions or symptoms of police officer A were actually detected, but, in order to avoid complexity of the drawing, a total of four actions or symptoms are illustrated, and a reproduction time field and an action field for the fifth action or symptom are not illustrated. Therefore, as illustrated in correlation tables DT11 to DT15, with respect to the case with the "case number 20170620-0023", it can be seen that a total of five actions or symptoms were detected for police officer A, and a total of two actions or symptoms were detected for each of police officers B, C, D and E.

A recording starting time (recording starting time point) of each corresponding captured video is displayed on the left side of each display region of correlation tables DT11 to DT15 in FIG. 29. In other words, it can be seen that wearable camera 10 of police officer A started recording at "03:03:04 p.m. on Jun. 20, 2017". Similarly, it can be seen that wearable camera 10 of police officer B started recording at "03:03:24 p.m. on Jun. 20, 2017". Similarly, it can be seen that wearable camera 10 of police officer C started recording at "03:03:22 p.m. on Jun. 20, 2017". Similarly, it can be seen that wearable camera 10 of police officer D started recording at "03:03:25 p.m. on Jun. 20, 2017". Similarly, it can be seen that wearable camera 10 of police officer E started recording at "03:03:21 p.m. on Jun. 20, 2017".

Individual report creation buttons VDR1, VDR2, VDR3, VDR4 and VDR5 for generating case basis event history lists (which will be described later) which are required for respective police officers A to E to individually create case reports are displayed on the left sides of the display regions of correlation tables DT11 to DT15 in FIG. 29. Details of individual report creation buttons VDR1 to VDR5 will be described later.

Multi-simultaneous reproduction screen WD4 displays, for example, action map MP11 (event map information) indicating position information of when a captured video is recorded by wearable camera 10 of each of the five police officers. Specifically, pieces of position information P1A, P1B, PIC, P1D and P1E of respective police officers A, B, C, D and E are displayed in action map MP11 illustrated in FIG. 29. For example, on the multi simultaneous reproduction screen WD 4, it is triggered that, among the five police officers, police officer A recorded a captured video related to the case. This is clear from the fact that a recording starting time of a captured video in wearable camera 10 of police officer A is earliest. It is illustrated that police officer A sent a support request to other police officers B, C, D and E, and other police officers B, C, D and E started recording in respective wearable cameras 10 according to the support request from police officer A.

Multi-simultaneous reproduction screen WD4 displays, for example, multi-simultaneous reproduction button MLS1 (simultaneous reproduction icon) for instructing captured videos in respective wearable cameras 10 of the five police officers to be reproduced simultaneously. In a case where it is detected that multi-simultaneous reproduction button MLS1 has been pressed through an operation performed by, for example, police officer 3, the retrieval application (specifically, CPU 151 as a display controller) for a captured video performs a simultaneous reproduction process on respective captured videos MV1a, MV1b, MV1c, MV and MV1e from the same reproduction time (a reproduction starting point) and displays the captured videos on multi-simultaneous reproduction screen WD4.

30-second simultaneous fast reversing button ABF30, simultaneous pause button TH21, 30-second simultaneous fast forwarding button AAF30 are displayed on the lower part of the display region of multi-simultaneous reproduction button MLS1 in FIG. 29. Here, "30 seconds" of 30-second simultaneous fast reversing button ABF30 or 30-second simultaneous fast forwarding button AAF30 is only an example, and a time is not limited to 30 seconds. 30-second simultaneous fast reversing button ABF30 is used to adjust simultaneous fast reversing of reproduction times (reproduction starting points) of five respective captured videos MV1a, MV1b, MV1c, MV1d and MV1e in multi-simultaneous reproduction screen WD4 in FIG. 29 by 30 seconds. Simultaneous pause button TH21 is used to simultaneously pause reproduction of five respective captured videos MV1a, MV1b, MV1c, MV1d and MV1e in multi-simultaneous reproduction screen WD4 in FIG. 29. 30-second simultaneous fast forwarding button AAF30 is used to adjust simultaneous fast forwarding of reproduction times (reproduction starting points) of five respective captured videos MV1a, MV1b, MV1c, MV and MV1e in multi-simultaneous reproduction screen WD4 in FIG. 29 by 30 seconds.

Multi-report button MLR1 is displayed on the right part of the display region of multi-simultaneous reproduction button MLS1 in FIG. 29. Multi-report button MLR1 (entire history output icon) is used to generate a case basis event history list (which will be described later) of two or more police officers (for example, police officers A and B) selected (refer to FIG. 34) by a user (for example, police officer 3) through merging. Details of multi-report button MLR1 will be described later.

Here, it is assumed that a user (for example, police officer 3) performs an operation using input 155, and thus a cursor (not illustrated) is disposed on the display region of the record of the fourth row of correlation table DT11 correlated with wearable camera 10 of police officer A on multi-simultaneous reproduction screen WD4 illustrated in FIG. 29. At this point, the record of the fourth row is not selected. In this case, the retrieval application (specifically, CPU 151) for a captured video displays the record of the fourth row on which the cursor is disposed to be able to be identified more than other records of correlation tables DT12, DT13, DT14 and DT15. For example, the record of the fourth row is displayed to be temporarily selected within dotted frame SLC1. In other words, it is assumed that, among detected actions of police officer A (that is, the user), the user (for example, police officer 3) temporarily selects the action "fell down" detected at the reproduction time "03:20" of captured video MV1a as an action which the user is concerned about (that is, which the user is to pay attention to).

Figure 30:
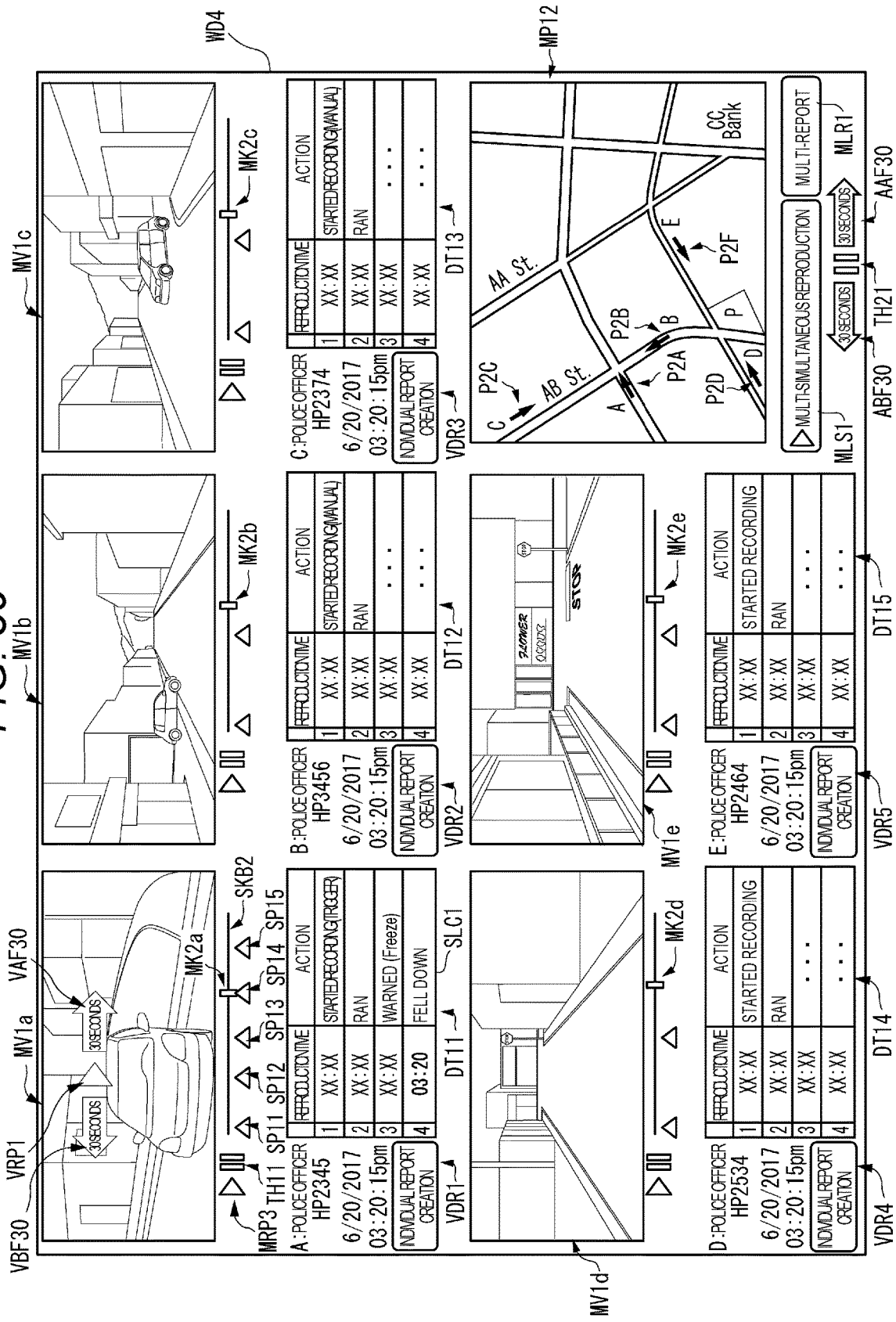
FIG. 30 is a diagram illustrating another example of a multi-simultaneous reproduction screen.

FIG. 30 is a diagram illustrating another example of multi-simultaneous reproduction screen WD4. Multi-simultaneous reproduction screen WD4 (video reproduction screen) illustrated in FIG. 30 is a screen displayed on display 156 in a case where the record of the fourth row of correlation table DT11 correlated with wearable camera 10 of police officer A, temporarily selected within dotted frame SLC1 in FIG. 29, is subjected to a formal selection operation through an operation performed by the user (for example, police officer 3) by using input 155. In description of FIG. 30, a constituent element having the same content as that in FIG. 29 is given the same reference numeral, description thereof will be made briefly or omitted, and different content will be described.

In a case where the record of the fourth row of correlation table DT11 is subjected to the formal selection operation, the retrieval application (specifically, CPU 151) for a captured video displays the record in a predetermined color (for example, yellow) from dotted frame SLC1. A state of being subjected to the formal selection state is indicated by yellow marker SLC2. The retrieval application (specifically, CPU 151) for a captured video performs a process of adjusting reproduction times of respective captured videos MV1a, MV1b, MV1c, MV1d and MV1e to the reproduction time (specifically, "03:20:15 p.m.") of the record which is a selection operation target according to the formal selection operation. In FIG. 30, the markers (for example, markers MK2a, MK2b, MK2c, MK2d and MK2e) on the seek bars respectively corresponding to respective captured videos MV1a, MV1b, MV1c, MV1d and MV1e are jumped to the position of the reproduction time "03:20:15 p.m." from the points (that is, recording starting points of the respective captured videos) illustrated in FIG. 29 and are displayed. Consequently, times displayed on the lower part of the display regions of the identification numbers of the respective police officers in FIG. 30 are simultaneously set to the reproduction time (specifically, "03:20:15 p.m.") of the record of the fourth row of correlation table DT11 subjected to the formal selection operation.

In a case where the record of the fourth row of correlation table DT11 is subjected to the formal selection operation, retrieval application (specifically, CPU 151) for a captured video displays updated position information of each wearable camera 10 in action map MP12 (event map information) at the reproduction time (specifically, "03:20:15 p.m.") of the record which is a selection operation target. In FIG. 30, it can be seen that pieces of position information P2A, P2B, P2C, P2D and P2E are changed (moved) of police officers A, B, C, D and E compared with action map MP11 illustrated in FIG. 29.

Figure 31:
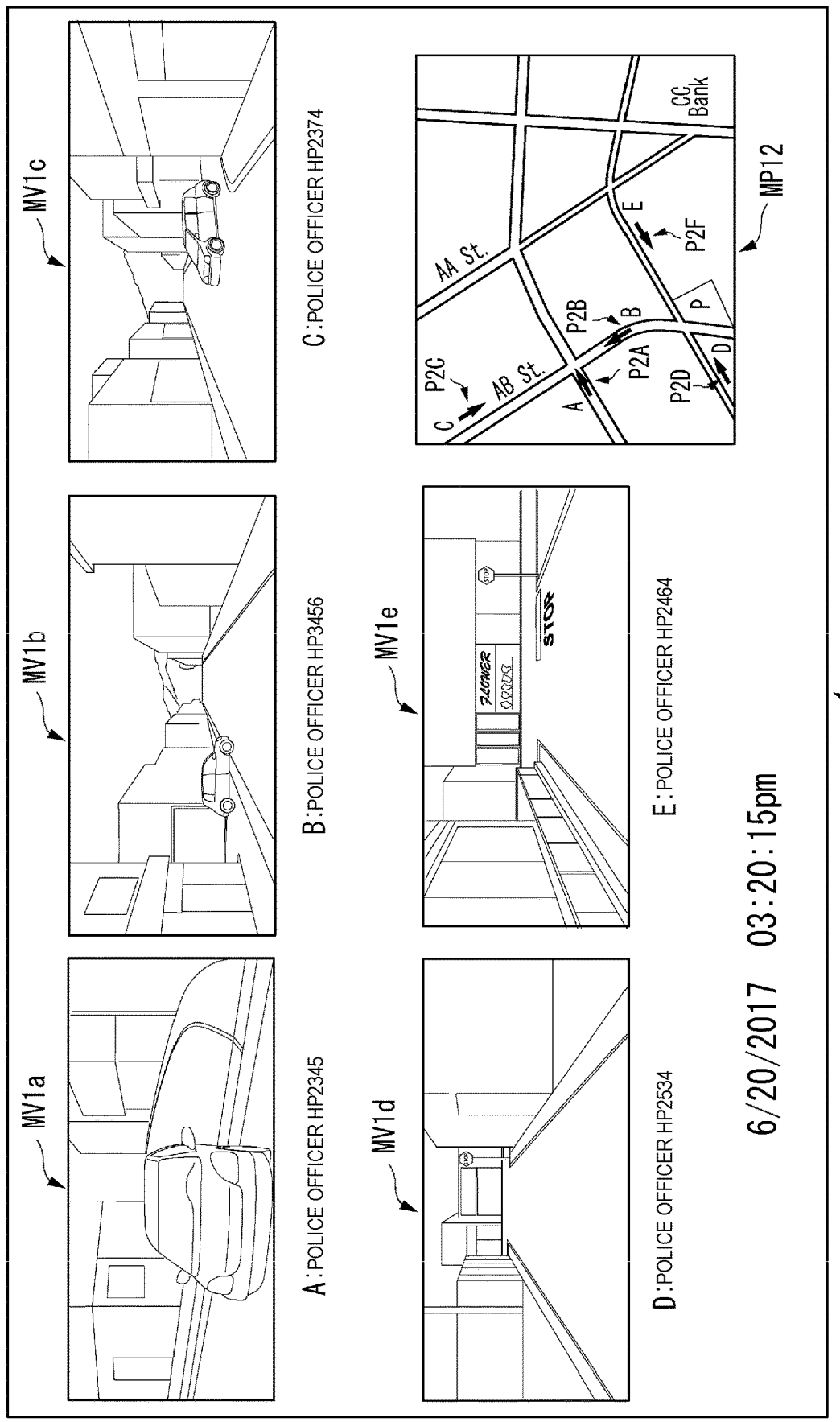
FIG. 31 is a diagram illustrating examples of output videos based on a predetermined format.

FIG. 31 is a diagram illustrating an example of an output video based on a predetermined format. The retrieval application (specifically, CPU 151) for a captured video generates, for example, a data file of an output video based on a predetermined format to be submitted to an institution such as a court or a public prosecutor's office according to an operation performed by a user (for example, police officer 3). In the example illustrated in FIG. 31, output video OPT1 includes respective captured videos MV1a, MV1b, MV1c, MV1d and MV1e at the point at which the record of the fourth row of correlation table DT11 was subjected to the formal selection operation, information regarding the reproduction time thereof (specifically, "03:20:15 p.m. on Jun. 29, 2017"), and action map MP12 at the reproduction time (specifically, "03:20:15 p.m. on Jun. 29, 2017"). According to multi-simultaneous reproduction screen WD4 or output video OPT1 illustrated in FIG. 30, in a case where a plurality of parties (for example, police officers) are related to a single incident (for example, a case), it is possible to obtain a captured video from which peripheral situations of a case field can be accurately understood in a multilateral manner.

FIG. 32 is a flowchart illustrating a detailed example of a display operation procedure corresponding to a captured video retrieval instruction in back end client 70 of Exemplary Embodiment 4. In description of FIG. 32, a case is exemplified in which the above-described retrieval application for a captured video is installed to be executable in back end client 70, but, as described above, the application may be installed to be executable in back end server 50. In this case, in description of FIG. 32, each process is CPU 51 of back end server 50 as described above.

In FIG. 32, CPU 151 of back end client 70 acquires, for example, a case number retrieval instruction as a result of a user (for example, police officer 3) performing an operation on a screen of the retrieval application for a captured video (S61). As the case number retrieval instruction, for example, the "case number 20170620-0023" is assumed to be entered.

CPU 151 displays retrieval result screen WD3 (refer to FIG. 28) for videos captured by a plurality of police officers, corresponding to the same case number acquired in step S61, on display 156 (S62).

Here, CPU 151 determines whether or not multi-simultaneous reproduction display button MPB1 has been pressed according to an operation performed by the user (for example, police officer 3) (S63). In a case where multi-simultaneous reproduction display button MPB1 has been pressed (S63: YES), CPU 151 displays multi-simultaneous reproduction screen WD4 (refer to FIG. 29) on display 156 (S64). In a case where multi-simultaneous reproduction display button MPB1 has not been pressed (S63: NO), the process in step S63 is repeatedly performed until multi-simultaneous reproduction display button MPB1 is pressed.

Here, CPU 151 determines whether or not the cursor (not illustrated) has been moved to an action or a symptom on any correlation table according to an operation performed by the user (for example, police officer 3) (S65). In a case where the cursor has been moved to an action or a symptom on any correlation table (S65: YES), CPU 151 displays the action or the symptom which is a movement destination to be able to be identified by attaching dotted frame SLC1 thereto. After step S66, in a case where the action or the symptom is subjected to a formal selection operation (S67: YES), CPU 151 displays the selected action or system in a color, displays a marker (for example, MK2a) jumped to a detection time point thereof, and further similarly displays markers (for example, MK2b, MK2c, MK2d, and MK2e) of other captured videos jumped to the same detection time point (S68).

On the other hand, in a case where the action or the symptom is not subjected to a formal selection operation (S67: NO), or in a case where the cursor has not been moved to any action or symptom (S65: NO), the respective processes in steps S65 to S67 are repeatedly performed until any action or symptom is subjected to a formal selection operation.

Here, CPU 151 determines whether or not multi-simultaneous reproduction button MLS1 has been pressed according to an operation performed by the user (for example, police officer 3) (S69). In a case where multi-simultaneous reproduction button MLS1 has been pressed (S69: YES), CPU 151 performs a process of simultaneously reproducing all captured videos displayed on multi-simultaneous reproduction screen WD4 with the detection time point of the action or the symptom subjected to the formal selection operation in step S67 in multi-simultaneous reproduction screen WD4 (refer to FIG. 30) (S70). In a case where multi-simultaneous reproduction button MLS1 has not been pressed (S69: NO), the process in step S69 is repeatedly performed until multi-simultaneous reproduction display button MPB1 is pressed.

As mentioned above, in Exemplary Embodiment 4, back end client 70 records captured videos in wearable cameras 10 respectively worn or carried by a plurality of users (for example, police officers), and action index AL1 (event list information) including respective detection time points of a plurality of types of actions or symptoms (default events) detected during recording of the captured videos and information regarding each action or symptom (event) on memory 154 (third recorder) in correlation with wearable cameras 10. Back end client 70 retrieves a captured video of an incident (for example, a case) gaining attention from captured videos recorded on memory 154 according to entry of a retrieval condition, and displays retrieval result screen WD3 including a list of a plurality of captured videos extracted through the retrieval and multi-simultaneous reproduction display button MPB1 (predetermined icon) on display 156 (monitor). Back end client 70 displays multi-simultaneous reproduction screen WD4 (video reproduction screen) including a captured video correlated with each wearable camera 10 and action index AL1 corresponding to the captured video on display 156 according to an operation of selecting multi-simultaneous reproduction display button MPB1.

Consequently, in a case where a plurality of police officers are related to a certain incident occurred already, back end client 70 can accurately extract a captured video at a point at which a behavior gaining attention was performed is accurately extracted among captured videos in wearable cameras worn or carried by the respective police officers, and can thus to support improvement of convenience during extraction of a captured video desired by a user.

Back end client 70 displays all captured videos on multi-simultaneous reproduction screen WD4 switched to a captured video at a detection time point of an action or a symptom (selected event) based on a selection operation according to an operation of selecting the action or the symptom (event) included in any correlation table (event list information) of multi-simultaneous reproduction screen WD4. Consequently, in a case where a user (for example, police officer 3) of back end client 70 finds an action or a symptom which the user is concerned about (which the user is to pay attention to) from each correlation table (event list information) displayed on multi-simultaneous reproduction screen WD4, the user can view a list of captured videos at a destination time point of the action or the symptom in multilateral visual fields, and can thus efficiently grasp or summarize situations of a case or the like, by performing an operation of selecting the action or the symptom.

Back end client 70 displays multi-simultaneous reproduction button MLS1 (simultaneous reproduction icon) for simultaneously reproducing all captured videos of multi-simultaneous reproduction screen WD4 on multi-simultaneous reproduction screen WD4, and simultaneously reproduces and displays captured videos at a detection time point of a selected action or symptom according to a selection operation on multi-simultaneous reproduction button MLS1. Consequently, a user (for example, police officer 3) of back end client 70 can understand the specific content of captured videos after a detection time point of an action or a system which the user is concerned about (which the user is to pay attention to) from a plurality of captured videos in detail.

On the basis of a selection operation on any captured video of multi-simultaneous reproduction screen WD4, back end client 70 displays 30-second fast reversing icon VBF30 (first icon) for displaying the captured video (selected captured video) based on the selection operation switched to a captured video at a time point going back by a predetermined period (for example, 30 seconds), and 30-second fast forwarding icon VAF30 (second icon) for displaying the captured video (selected captured video) switched to a captured video at a time point at which a predetermined period (for example, 30 seconds) elapses, to be superimposed on the captured video (selected captured video) (refer to FIG. 30). In a case where back end client 70 detects pressing of 30-second fast reversing icon VBF30 or 30-second fast forwarding icon VAF30, and then detects selection of reproduction button VRP1, back end client 70 performs a process of reproducing the captured video (selected captured video). Consequently, a user (for example, police officer 3) of back end client 70 can understand the specific content of captured videos before or after a detection time point of an action or a system which the user is concerned about (which the user is to pay attention to) individually in detail, for example, in a single captured video (for example, captured video MV1a).

Back end client 70 displays an action or a symptom (selected event) based on a selection operation of a user (for example, police officer 3) to be able to be identified compared with other actions or symptoms (default events) which are not targets of the selection operation (refer to FIG. 30). Consequently, a user (for example, police officer 3) of back end client 70 can easily check an action or a system which the user is concerned about (which the user is to pay attention to).

The correlation table (event list information) may further include position information of wearable camera 10 in the same manner as action index AL1. In this case, back end client 70 displays action map MP11 (event map information) displaying respective pieces of position information of a plurality of wearable cameras 10 at a detection time point of an action or a symptom (selected event) based on a selection operation of a user (for example, police officer 3) on multi-simultaneous reproduction screen WD4. Consequently, a user (for example, police officer 3) of back end client 70 can geographically understand position information of the user or other police officers at a detection time point of an action or a system which the user is concerned about (which the user is to pay attention to), and can thus remember the situation at that time, and this can contribute to supporting creation of a case report or the like.

Modification Example of Exemplary Embodiment 4

In a modification example of Exemplary Embodiment 4, a description will be made of an example of an information processing apparatus (for example, back end client 70) which supports creation of a time-series progress report for actions or symptoms to be attached to a case report in a case where a party (for example, police officer 3) related to a certain incident (for example, a case) is required to create the case report as business thereof. However, in the same manner as in Exemplary Embodiment 4, an information processing apparatus related to the modification example of Exemplary Embodiment 4 may be back end client 70, and may be back end server 50. In the following description, a case type of the case with the "case number 20170620-0023" in Exemplary Embodiment 4 is assumed to be a "firearm" which will be described later.

Figure 33B:
FIG. 33B is a diagram illustrating a second example of a case basis event history list corresponding to a case basis unique event list in a modification example of Exemplary Embodiment 4.

FIG. 33A is a diagram illustrating a first example of case basis event history list ALLT1 corresponding to case basis unique event list CStb1 in the modification example of Exemplary Embodiment 4. FIG. 33B is a diagram illustrating a second example of case basis event history list ALLT2 corresponding to case basis unique event list CStb2 in the modification example of Exemplary Embodiment 4.

Case basis unique event list CStb1 is, for example, a table defining a list of actions or systems which are more likely to be performed by a police officer in a case in which the police officer used a gun with a case type as a "firearm", and is registered in, for example, memory 154 in advance. Case basis unique event list CStb1 includes actions or systems such as "dangerous falling", "dashed", "hit", "pulled the gun", "stop order", "leveled the gun", and "shot the gun".

For example, in a case where pressing of the individual report creation button (for example, individual report creation button VDR1) in FIG. 29 or 30 is detected, CPU 151 of back end client 70 refers to case basis unique event list CStb1 in memory 154, and generates and outputs case basis event history list ALLT1 in which the various actions or symptoms defined in case basis unique event list CStb1 are correlated with detection time points thereof. An output destination of case basis event history list ALLT1 may be, for example, display 156, and may be memory 154 as a data storage destination.

There may be an action or a system which is registered in case basis unique event list CStb1 but was not detected in wearable camera 10. The example in FIG. 33A shows that the actions "dangerous falling" and "hit" were not detected in wearable camera 10. Police officer 3 can remember the actions "dangerous falling" and "hit", and can complementarily report time points at which the actions occurred.

Case basis unique event list CStb2 is, for example, a table defining a list of actions or systems which are more likely to be performed by a police officer in a case of having cracked down on drunken driving or driving under the use of drugs with a case type as "DUI", and is registered in, for example, memory 154 in advance. Case basis unique event list CStb2 includes, for example, actions or symptoms such as "started recording", "got off the car", "started walking", "started interview", and "got on the car".

In a case where pressing of the individual report creation button of the multi-simultaneous reproduction screen (refer to FIG. 29 or 30) regarding the case with "DUI" as a case type is detected, CPU 151 of back end client 70 refers to case basis unique event list CStb2 in memory 154, and generates and outputs case basis event history list ALLT2 in which the various actions or symptoms defined in case basis unique event list CStb2 are correlated with detection time points thereof. An output destination of case basis event history list ALLT2 may be, for example, display 156, and may be memory 154 as a data storage destination.

As mentioned above, in the modification example of Exemplary Embodiment 4, back end client 70 further records the case basis unique event list (unique event list) in which a plurality of actions or symptoms uniquely detected for each incident (for example, a case) are registered in advance for each incident (for example, a case). Back end client 70 displays the individual report creation button (individual history output icon) in correlation with each captured video of multi-simultaneous reproduction screen WD4, and outputs case basis event history list ALLT1 including an action or a system detected from a captured video (selected captured video) based on a selection operation and a detection time point on the basis of the case basis unique event list corresponding to an incident in multi-simultaneous reproduction screen WD4 according to the selection operation on any individual report creation button. Consequently, in a case where police officer 3 as a party directly related to a case is required to create a case report of the case associated with business thereof, police officer 3 can easily create a time-series progress report for actions or symptoms to be attached to the case report.

In the modification example of Exemplary Embodiment 4, in a case where a plurality of police officers are related to the same case, back end client 70 may generate merged history of actions or symptoms detected in the plurality of police officers.

Figure 34:
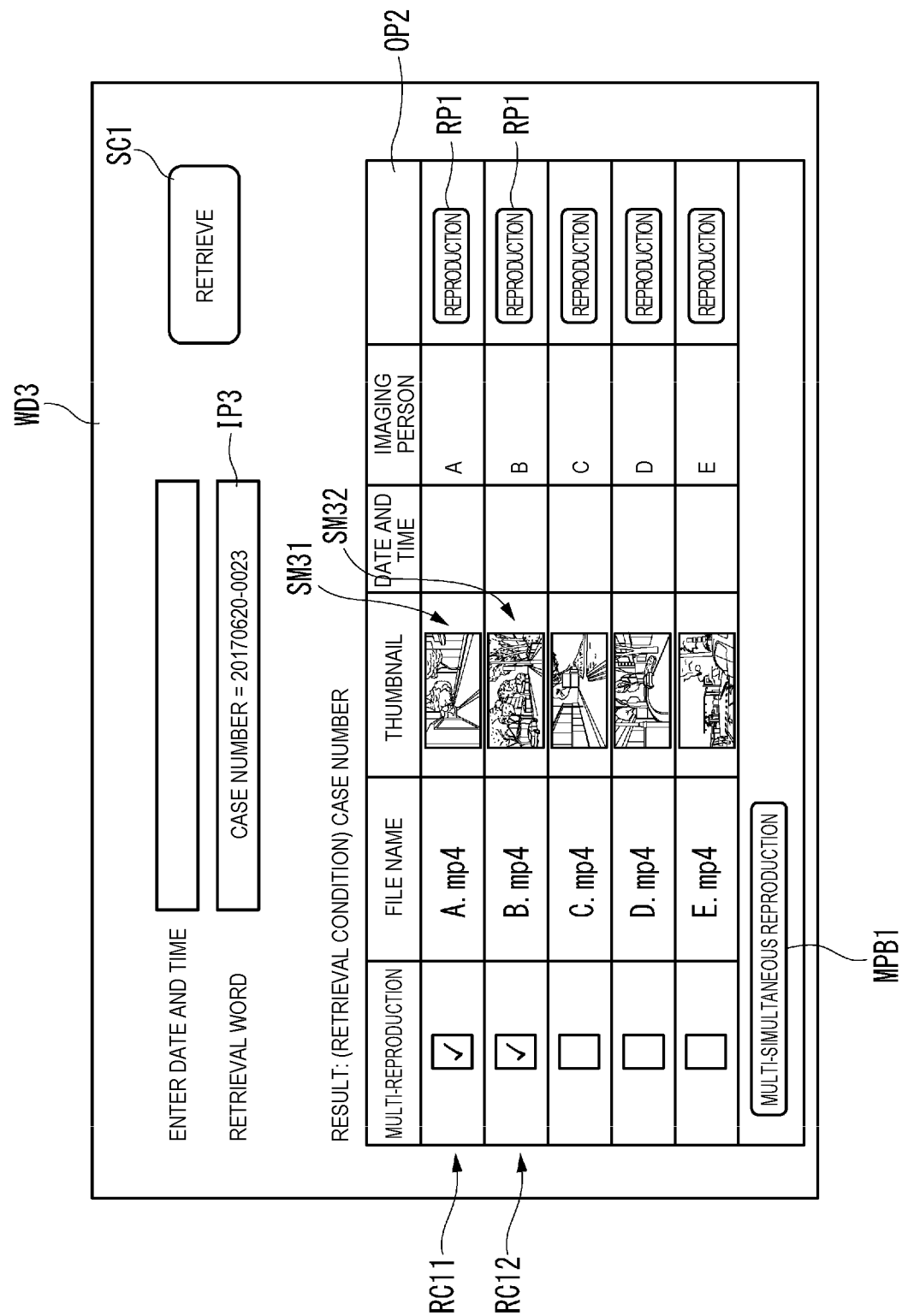
FIG. 34 is a diagram illustrating another example of a retrieval result screen displaying an entry field for a captured video retrieval condition and a retrieval result.
Figure 35:
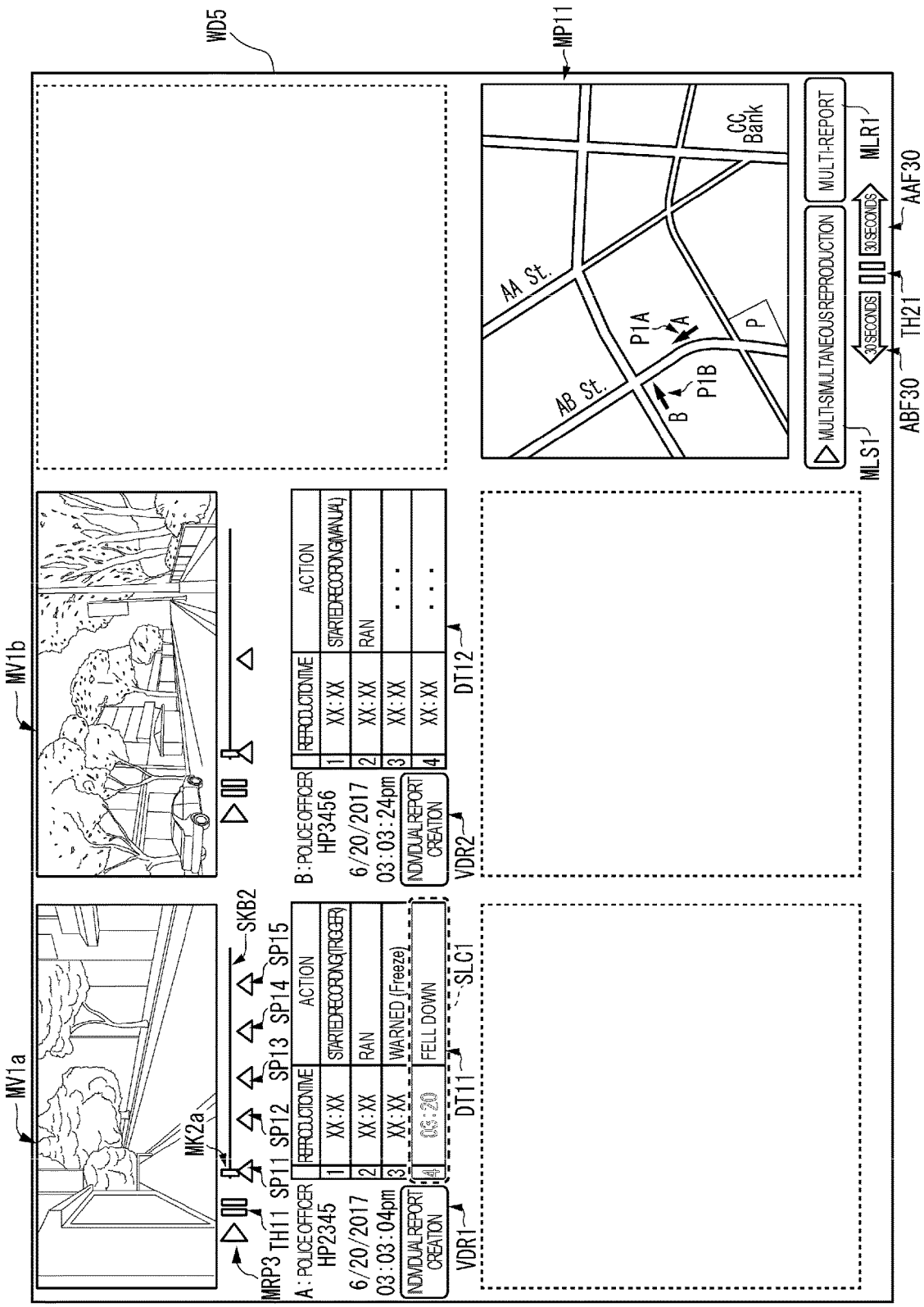
FIG. 35 is a diagram illustrating a first example of a multi-simultaneous reproduction screen based on pressing of a multi-simultaneous reproduction button in the retrieval result screen in FIG. 34.

FIG. 34 is a diagram illustrating another example of retrieval result screen WD3 displaying an entry field for a captured video retrieval condition and a retrieval result. FIG. 35 is a diagram illustrating a first example of multi-simultaneous reproduction screen WD4 based on pressing of multi-simultaneous reproduction display button MPB1 in retrieval result screen WD3 in FIG. 34.

In description of FIG. 34, a constituent element having the same content as that in FIG. 28 is given the same reference numeral, description thereof will be made briefly or omitted, and different content will be described. In FIG. 34, two records RC11 and RC12 are selected in order to generate a case basis event history list by merging actions or symptoms of, for example, police officers A and B with each other.

In back end client 70, in a case where pressing of multi-simultaneous reproduction display button MPB1 in FIG. 34 is detected, the retrieval application for a captured video displays multi-simultaneous reproduction screen WD5 illustrated in FIG. 35 on display 156. In multi-simultaneous reproduction screen WD5 illustrated in FIG. 35, unlike multi-simultaneous reproduction screen WD4 illustrated in FIG. 29, captured videos MV1$a$ and MV1$b$ in wearable cameras 10 corresponding to records RC11 and RC12 selected by a user (for example, police officer 3), correlation tables DT11 and DT12, and the like are displayed. In description of FIG. 35, a constituent element having the same content as that in FIG. 29 is given the same reference numeral, description thereof will be made briefly or omitted, and different content will be described.

FIG. 36A is a diagram illustrating an example of case basis event history list ALLT3 of police officer A with the identification number "HP2345". FIG. 36B is a diagram illustrating an example of case basis event history list ALLT4 of police officer B with the identification number "HP3456".

Case basis event history list ALLT3 illustrated in FIG. 36A is generated by the retrieval application (specifically, CPU 151) for a captured video by using case basis unique event list CStb1 (refer to FIG. 33A) on the basis of pressing of individual report creation button VDR1 in multi-simultaneous reproduction screen WD5 illustrated in FIG. 35. Similarly, case basis event history list ALLT4 illustrated in FIG. 36B is generated by the retrieval application for a captured video by using case basis unique event list CStb1 (refer to FIG. 33A) on the basis of pressing of individual report creation button VDR2 in multi-simultaneous reproduction screen WD5 illustrated in FIG. 35.

FIG. 37A is a diagram illustrating an example of case basis event history list ALLT5 into which case basis event history lists ALLT3 and ALLT4 of police officers A and B with the identification numbers "HP2345" and "HP3456" are merged.

As mentioned above, back end client 70 further records the unique event list in which a plurality of actions or symptoms detected in an incident (for example, a case) are registered in advance for each incident, on memory 154. Back end client 70 displays the individual report creation button (individual history output icon) in correlation with each captured video of multi-simultaneous reproduction screen WD5, and generates and outputs the case basis event history list including an action or a system detected from a captured video (selected captured video) based on a selection operation and a detection time point on the basis of the case basis unique event list corresponding to an incident in multi-simultaneous reproduction screen WD5 according to the selection operation on any individual report creation button. An output destination may be, for example, display 156, and may be memory 154 as a data storage destination.

As mentioned above, the retrieval application (specifically, CPU 151) for a captured video generates the case basis event history list by using case basis unique event list CStb1 (refer to FIG. 33A) on the basis of pressing of multi-report button MLR1 in multi-simultaneous reproduction screen WD5 illustrated in FIG. 35. Specifically, in a case where pressing of multi-report button MLR1 in multi-simultaneous reproduction screen WD5 illustrated in FIG. 35 is detected, CPU 151 generates case basis event history lists ALLT3 and ALLT4 of police officers A and B illustrated in FIGS. 36A and 36B, and merges the lists together. Consequently, police officer 3 as a party directly related to a case can easily create a case report representing a time-series progress report for actions or symptoms detected in each police officer in a case where there are a plurality of police officers in the case associated with business thereof.

Figure 37B:
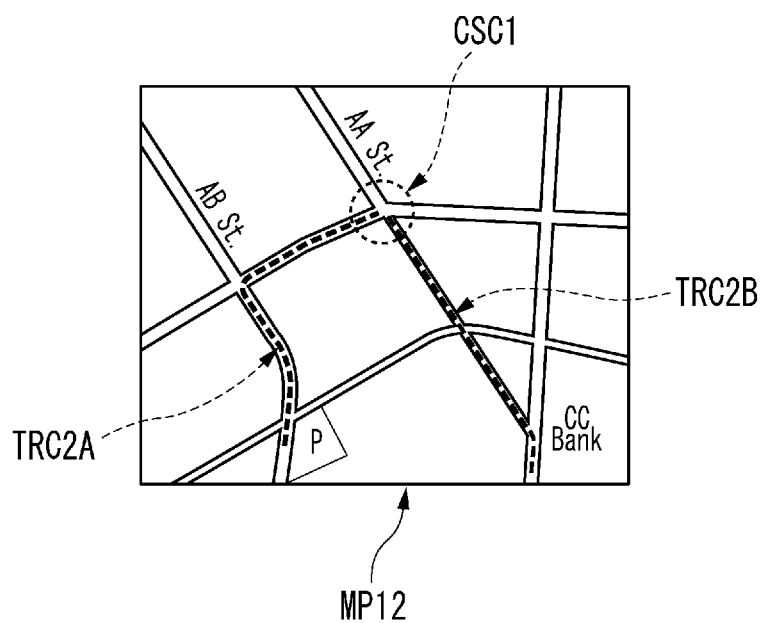
FIG. 37B is a diagram illustrating an example of an action map in which information regarding positions where actions in the case basis event history lists in FIGS. 36A and 36B are detected is displayed to be superimposed on map data.

FIG. 37B is a diagram illustrating an example of action map MP12 in which information regarding positions where actions in case basis event history lists ALLT3 and ALLT4 in FIGS. 36A and 36B are detected is displayed to be superimposed on map data.

The correlation table (event list information) in the multi-simultaneous reproduction screen may further include position information of wearable camera 10 in the same manner as action index AL1. The retrieval application (specifically, CPU 151) for a captured video superimposes position information at a detection time point of each action or symptom on the map data so as to generate and output action map MP12 illustrated in FIG. 37 by using case basis event history list ALLT5 illustrated in FIG. 37A according to an operation of a user (for example, police officer 3). In other words, back end client 70 outputs action map MP12 (event map information) indicating position information of each of a plurality of wearable cameras 10 at determination time points of all events in a plurality of selected captured videos (captured videos corresponding to records RC11 and RC12). Consequently, back end client 70 can geographically and intuitively make it easy to understand interim progress or interim behaviors until two police officers A and B go to case field CSC1.

In Exemplary Embodiment 4 and the modification example of Exemplary Embodiment 4, back end client 70 may perform a process in which a user (for example, police officer 3) enters a retrieval condition (for example, the date and time or a case number), and back end server 50 may perform each process of retrieval based on the entered retrieval condition and display of retrieval result screen WD3, so that the respective processes are shared by back end client 70 and back end server 50. Of course, the opposite case may also be employed. In other words, back end server 50 may perform a process in which a user (for example, police officer 3) enters a retrieval condition (for example, the date and time or a case number), and back end client 70 may perform each process of retrieval based on the entered retrieval condition and display of retrieval result screen WD3. In this case, in retrieval result screen WD3 for captured videos extracted through the retrieval process in back end server 50 or back end client 70, display of multi-simultaneous reproduction screens WD4 and WD5 based on pressing of multi-simultaneous reproduction display button MPB1, and a process of reproducing various captured videos after the display or a process of displaying various pieces of information or data is performed in back end client 70 or back end server 50. In other words, retrieval of a captured video is performed in back end client 70 including memory 154 on which a captured video of a subject and action index AL1 are recorded in correlation with each other, or back end server 50 including storage 58 on which a captured video of a subject and action index AL1 are recorded in correlation with each other. Consequently, a retrieval process with a great processing load is distributed to another apparatus, and thus it is possible to reduce a processing load on back end client 70 or back end server 50 which does not perform a retrieval process.

As mentioned above, various exemplary embodiments have been described with reference to the drawings, but it is needless to say that the present disclosure is not limited to the examples. It is clear that a person skilled in the art can conceive of various alterations or modifications within the category recited in the claims, and it is understood that they are naturally included in the technical scope of the present disclosure. The respective constituent elements in the exemplary embodiments may be arbitrarily combined within the scope without departing from the scope of the invention.

The present disclosure is useful as a wearable camera, a wearable camera system, and an information recording method, in which, even if a user does not independently reproduce or watch a recorded captured video, each of various behaviors of the user performed in a time series is determined from a captured video recorded by the wearable camera, and is recorded as information, and business of the user is efficiently supported.

What is claimed is:

1. A method for a wearable device performing information notification, the method comprising:
   capturing video of a subject on a front side of a user of the wearable device and recording the captured video on a recorder;
   acquiring, by a motion sensor during the recording of the captured video, information regarding motion of the user in association with the captured video, wherein the motion sensor includes an acceleration sensor and a gyro sensor, and the motion sensor outputs acceleration data of the acceleration sensor in three-dimensions of an orthogonal coordinate system and inclination data of the gyro sensor in three-dimensions of the orthogonal coordinate system;
   determining, during the recording of the captured video and based on the acceleration data and the inclination data output by the motion sensor, whether at least one default event has occurred during capture of the video of the subject, determining whether the at least one default event has occurred including:
      accessing a database associating a plurality of default events, including the at least one default event, with a plurality of three-dimensional acceleration data sets, respectively, and a plurality of three-dimensional inclination data sets, respectively; and
      determining that the acceleration data output by the motion sensor corresponds a three-dimensional acceleration data set, of the plurality of three-dimensional acceleration data sets, associated with the at least one default event and determining that the inclination data output by the motion sensor corresponds a three-dimensional inclination data set, of the plurality of three-dimensional inclination data sets, associated with the at least one default event; and
   transmitting, during the recording of the captured video, the captured video to an external terminal in response to determining that the at least one default event has occurred during the recording of the captured video of the subject.

2. The method of claim 1, comprising:
   determining that streaming the captured video is set; and
   in response to determining that streaming the captured video is set, transmitting, during the recording of the captured video, the captured video to the external terminal.

3. A wearable device, comprising:
   a motion sensor configured to acquire information regarding motion of a user, wherein the motion sensor includes an acceleration sensor and a gyro sensor, and the motion sensor outputs acceleration data of the acceleration sensor in three-dimensions of an orthogonal coordinate system and inclination data of the gyro sensor in three-dimensions of the orthogonal coordinate system; and
   a controller configured to:
      determine, during recording of a video of a subject captured by a video camera, whether at least one default event occurred during capture of the video, determining whether the at least one default event occurred during the capture of the video being based on the acceleration data and the inclination data output by the motion sensor, wherein the controller is configured to determine whether the at least one default event occurred by:
         accessing a database associating a plurality of default events, including the at least one default event, with a plurality of three-dimensional acceleration data sets, respectively, and a plurality of three-dimensional inclination data sets, respectively; and
         determining that the acceleration data output by the motion sensor corresponds a three-dimensional acceleration data set, of the plurality of three-dimensional acceleration data sets, associated with the at least one default event and determining that the inclination data output by the motion sensor corresponds a three-dimensional inclination data set, of the plurality of three-dimensional inclination data sets, associated with the at least one default event; and
      in response to determining that the at least one default event occurred, transmitting, during the recording of the captured video, the captured video to an external terminal.

4. The wearable device of claim 3, wherein controller is configured to:
   determine that streaming the captured video is set; and
   in response to determining that streaming the captured video is set, transmit, during the recording of the captured video, the captured video to the external terminal.

5. A wearable device, comprising:
   a video camera that captures video of a subject on a front side of a user of the wearable device and records the captured video on a recorder;
   a motion sensor that acquires, during the recording of the captured video, information regarding motion of the user in association with the captured video, wherein the motion sensor includes an acceleration sensor and a gyro sensor, and the motion sensor outputs acceleration data of the acceleration sensor in three-dimensions of an orthogonal coordinate system and inclination data of the gyro sensor in three-dimensions of the orthogonal coordinate system; and a controller that:
- determines, during the recording of the captured video and based on the acceleration data and the inclination data output by the motion sensor, whether the at least one default event has occurred during capture of the video of the subject, determining whether the at least one default event has occurred including:
  - accessing a database associating a plurality of default events, including the at least one default event, with a plurality of three-dimensional acceleration data sets, respectively, and a plurality of three-dimensional inclination data sets, respectively; and
  - determining that the acceleration data output by the motion sensor corresponds a three-dimensional acceleration data set, of the plurality of three-dimensional acceleration data sets, associated with the at least one default event and determining that the inclination data output by the motion sensor corresponds a three-dimensional inclination data set, of the plurality of three-dimensional inclination data sets, associated with the at least one default event; and
- in response to determining that the at least one default event has occurred during the recording of the captured video of the subject, transmits, during the recording of the captured video, the captured video to an external terminal.

6. The wearable device of claim 5, wherein the external terminal is a server of an investigation headquarters.

7. The wearable device of claim 5, wherein in response to determining that the at least one default event has occurred during the recording of the captured video of the subject, the controller transmits a message to the external terminal.

8. The wearable device of claim 7, wherein the controller has an action table registering a plurality of actions, and transmits the message when the at least one default event shows an action of the plurality of actions registered in the action table.

9. The wearable device of claim 7, further comprising:
- a position information acquirer that acquires position information of the wearable device,
- wherein the controller acquires the position information of the wearable device corresponding to a detection time of the at least one default event, and transmits the position information of the wearable device to the external terminal.

10. The wearable device of claim 5, wherein controller:
- determines that streaming the captured video is set; and
- in response to determining that streaming the captured video is set, transmits, during the recording of the captured video, the captured video to the external terminal.

* * * * *